US011922006B2

(12) United States Patent
Purevdorj

(10) Patent No.: US 11,922,006 B2
(45) Date of Patent: Mar. 5, 2024

(54) MEDIA CONTROL FOR SCREENSAVERS ON AN ELECTRONIC DEVICE

(71) Applicant: Apple Inc., Cupertino, CA (US)

(72) Inventor: Tergel Purevdorj, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 157 days.

(21) Appl. No.: 16/143,426

(22) Filed: Sep. 26, 2018

(65) Prior Publication Data
US 2019/0369860 A1 Dec. 5, 2019

Related U.S. Application Data

(60) Provisional application No. 62/679,929, filed on Jun. 3, 2018.

(51) Int. Cl.
*G06F 3/04883* (2022.01)
*G06F 3/04845* (2022.01)
(Continued)

(52) U.S. Cl.
CPC ...... *G06F 3/04883* (2013.01); *G06F 3/04845* (2013.01); *G06F 3/165* (2013.01);
(Continued)

(58) Field of Classification Search
CPC .. G06F 3/04883; G06F 3/04845; G06F 3/165; G06F 3/04886; G09G 5/377;
(Continued)

(56) References Cited

U.S. PATENT DOCUMENTS 5,367,631 A 11/1994 Levy
5,483,261 A 1/1996 Yasutake
(Continued)

FOREIGN PATENT DOCUMENTS

AU 2015101204 A4 10/2015
CN 1956516 A 5/2007
(Continued)

OTHER PUBLICATIONS

Ipsearch16143426.pdf, Apr. 8, 2020, ip.com search (Year: 2020).*
(Continued)

*Primary Examiner* — Angie Badawi
(74) *Attorney, Agent, or Firm* — Kubota & Basol LLP

(57) ABSTRACT

In some embodiments, an electronic device displays, on a display, a screensaver. In some embodiments, while displaying the screensaver, the electronic device receives an input detected on a touch-sensitive surface of one or more input devices. In some embodiments, in response to the input, if the electronic device is in a music playback mode when the input is received and if the input is a click input at a first region of a plurality of regions of the touch-sensitive surface, then the electronic device displays, on the display, a representation of the music playing in response to the input overlaid on the screensaver. In some embodiments, in response to the input, if the input is a click input at a second region of a plurality of regions of the touch-sensitive surface, then the electronic device ceases displaying the screensaver.

69 Claims, 54 Drawing Sheets

(51) Int. Cl.
*G06F 3/16* (2006.01)
*G09G 5/377* (2006.01)

(52) U.S. Cl.
CPC ....... *G09G 5/377* (2013.01); *G09G 2320/046* (2013.01); *G09G 2354/00* (2013.01)

(58) Field of Classification Search
CPC ......... G09G 2320/046; G09G 2354/00; G09G 2330/022; G09G 3/20; G09G 5/14; G11B 27/34; G11B 27/102
See application file for complete search history.

(56) References Cited

U.S. PATENT DOCUMENTS

| | | | |
|---|---|---|---|
| 5,488,204 A | 1/1996 | Mead et al. | |
| 5,687,331 A | 11/1997 | Volk et al. | |
| 5,738,527 A | 4/1998 | Lundberg | |
| 5,825,352 A | 10/1998 | Bisset et al. | |
| 5,835,079 A | 11/1998 | Shieh | |
| 5,880,411 A | 3/1999 | Gillespie et al. | |
| 5,973,694 A | 10/1999 | Steele et al. | |
| 5,999,895 A | 12/1999 | Forest | |
| 6,005,549 A | 12/1999 | Forest | |
| 6,160,536 A | 12/2000 | Forest | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,570,557 B1 | 5/2003 | Westerman et al. | |
| 6,677,932 B1 | 1/2004 | Westerman | |
| 6,690,387 B2 | 2/2004 | Zimmerman et al. | |
| 6,903,723 B1 | 6/2005 | Forest | |
| 7,015,894 B2 | 3/2006 | Morohoshi | |
| 7,109,975 B2 | 9/2006 | Fedorak et al. | |
| 7,184,064 B2 | 2/2007 | Zimmerman et al. | |
| 7,331,869 B2 | 2/2008 | Blanco | |
| 7,466,340 B1 | 12/2008 | Herz | |
| 7,508,419 B2 | 3/2009 | Toyama et al. | |
| 7,552,396 B1 | 6/2009 | Bicheno et al. | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,689,931 B2 | 3/2010 | Koga et al. | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,239,784 B2 | 8/2012 | Hotelling et al. | |
| 8,266,690 B2 | 9/2012 | Carvajal et al. | |
| 8,279,180 B2 | 10/2012 | Hotelling et al. | |
| 8,381,135 B2 | 2/2013 | Hotelling et al. | |
| 8,479,122 B2 | 7/2013 | Hotelling et al. | |
| 8,538,459 B2 | 9/2013 | Lee et al. | |
| 8,943,036 B1 | 1/2015 | Coudron | |
| 8,963,847 B2 | 2/2015 | Hunt | |
| 8,984,436 B1 | 3/2015 | Tseng et al. | |
| 9,189,094 B2 | 11/2015 | Morikawa et al. | |
| 9,348,458 B2 | 5/2016 | Hotelling et al. | |
| 9,383,904 B2 | 7/2016 | Lee et al. | |
| 9,535,594 B1 | 1/2017 | Alonso Ruiz et al. | |
| 9,652,125 B2 | 2/2017 | Tracht et al. | |
| 9,591,224 B2 | 3/2017 | Jung et al. | |
| 9,639,241 B2 | 5/2017 | Penha et al. | |
| 9,710,136 B2 | 7/2017 | Roh et al. | |
| 9,778,766 B2 | 10/2017 | Choi et al. | |
| 9,928,029 B2 | 3/2018 | Brown et al. | |
| 9,933,937 B2 | 4/2018 | Lemay et al. | |
| 10,073,592 B2 | 9/2018 | Penha et al. | |
| 2001/0030667 A1 | 10/2001 | Kelts | |
| 2001/0035881 A1 | 11/2001 | Stoakley et al. | |
| 2002/0015024 A1 | 2/2002 | Westerman et al. | |
| 2002/0055986 A1 | 5/2002 | King et al. | |
| 2002/0120934 A1 | 8/2002 | Abrahams | |
| 2003/0004638 A1 | 1/2003 | Villers et al. | |
| 2004/0041849 A1 | 3/2004 | Mock et al. | |
| 2004/0210851 A1 | 10/2004 | Premchandran et al. | |
| 2004/0263472 A1 | 12/2004 | Tachikawa | |
| 2005/0190059 A1 | 9/2005 | Wehrenberg | |
| 2005/0204138 A1 | 9/2005 | Chiu | |
| 2005/0212757 A1 | 9/2005 | Marvit et al. | |
| 2006/0017692 A1 | 1/2006 | Wehrenberg et al. | |
| 2006/0033724 A1 | 2/2006 | Chaudhri et al. | |
| 2006/0048071 A1 | 3/2006 | Jarrett et al. | |
| 2006/0074753 A1 | 4/2006 | Schuh et al. | |
| 2006/0197753 A1 | 9/2006 | Hotelling | |
| 2006/0236251 A1 | 10/2006 | Kataoka et al. | |
| 2006/0268100 A1 | 11/2006 | Karukka et al. | |
| 2007/0014541 A1 | 1/2007 | Im | |
| 2007/0021108 A1 | 1/2007 | Booking et al. | |
| 2007/0055947 A1 | 3/2007 | Ostojic et al. | |
| 2007/0192734 A1 | 8/2007 | Berstis et al. | |
| 2008/0062128 A1 | 3/2008 | Brodersen et al. | |
| 2008/0089667 A1 | 4/2008 | Grady et al. | |
| 2008/0104537 A1 | 5/2008 | Scott | |
| 2008/0229206 A1 | 9/2008 | Seymour et al. | |
| 2009/0007016 A1 | 1/2009 | Lindberg et al. | |
| 2009/0013254 A1 | 1/2009 | Walker et al. | |
| 2009/0121903 A1 | 5/2009 | Misage | |
| 2009/0158222 A1 | 6/2009 | Kerr et al. | |
| 2009/0167701 A1 | 7/2009 | Ronkainen | |
| 2009/0177989 A1 | 7/2009 | Ma et al. | |
| 2009/0282372 A1 | 11/2009 | Jerding et al. | |
| 2010/0042947 A1 | 2/2010 | Ostojic et al. | |
| 2010/0060789 A1 | 3/2010 | Aoki et al. | |
| 2010/0079498 A1 | 4/2010 | Zaman et al. | |
| 2010/0090971 A1 | 4/2010 | Choi et al. | |
| 2010/0194682 A1 | 8/2010 | Orr et al. | |
| 2010/0231534 A1 | 9/2010 | Chaudhri et al. | |
| 2011/0148774 A1 | 6/2011 | Pihlaja | |
| 2011/0185309 A1 | 7/2011 | Challinor et al. | |
| 2011/0231798 A1 | 9/2011 | Cok | |
| 2011/0289455 A1 | 11/2011 | Reville et al. | |
| 2011/0294467 A1 | 12/2011 | Kim et al. | |
| 2011/0302532 A1 | 12/2011 | Missig | |
| 2012/0015693 A1 | 1/2012 | Choi et al. | |
| 2012/0019732 A1 | 1/2012 | Lee et al. | |
| 2012/0030569 A1 | 2/2012 | Migos et al. | |
| 2012/0038571 A1 | 2/2012 | Susani | |
| 2012/0047462 A1 | 2/2012 | Moon et al. | |
| 2012/0050185 A1* | 3/2012 | Davydov | G06F 3/04883 345/173 |
| 2012/0066593 A1 | 3/2012 | Schneider | |
| 2012/0070129 A1 | 3/2012 | Lin et al. | |
| 2012/0105367 A1 | 5/2012 | Son et al. | |
| 2012/0151341 A1 | 6/2012 | Ko et al. | |
| 2012/0233640 A1 | 9/2012 | Odryna et al. | |
| 2012/0331506 A1 | 12/2012 | Arriola et al. | |
| 2013/0055119 A1 | 2/2013 | Luong | |
| 2013/0097564 A1 | 4/2013 | Morikawa et al. | |
| 2013/0147721 A1 | 6/2013 | McGeever et al. | |
| 2013/0151967 A1 | 6/2013 | Kerr et al. | |
| 2013/0215021 A1 | 8/2013 | Morikawa et al. | |
| 2013/0246932 A1 | 9/2013 | Zaveri et al. | |
| 2013/0263251 A1 | 10/2013 | Fleizach et al. | |
| 2013/0298024 A1* | 11/2013 | Rhee | G06F 21/31 715/716 |
| 2013/0300682 A1 | 11/2013 | Choi et al. | |
| 2013/0307792 A1 | 11/2013 | Andres et al. | |
| 2014/0002580 A1 | 1/2014 | Bear et al. | |
| 2014/0022192 A1 | 1/2014 | Hatanaka | |
| 2014/0053113 A1 | 2/2014 | Zoon et al. | |
| 2014/0115522 A1 | 4/2014 | Kataoka et al. | |
| 2014/0118251 A1 | 5/2014 | Liang et al. | |
| 2014/0143733 A1 | 5/2014 | Jung et al. | |
| 2014/0176479 A1 | 6/2014 | Wardenaar | |
| 2014/0191954 A1 | 7/2014 | Marvit et al. | |
| 2014/0191983 A1 | 7/2014 | Choi et al. | |
| 2014/0240239 A1 | 8/2014 | Takahashi et al. | |
| 2014/0270708 A1 | 9/2014 | Girgensohn et al. | |
| 2014/0289683 A1 | 9/2014 | Park | |
| 2014/0292685 A1 | 10/2014 | Meegan et al. | |
| 2014/0292706 A1 | 10/2014 | Hunt et al. | |
| 2014/0325368 A1 | 10/2014 | Cragun et al. | |

(56) References Cited

U.S. PATENT DOCUMENTS

| | | | |
|---|---|---|---|
| 2015/0007025 A1 | 1/2015 | Sassi et al. | |
| 2015/0026613 A1* | 1/2015 | Kwon | G06F 3/04886 |
| | | | 715/764 |
| 2015/0035753 A1 | 2/2015 | Bystrov et al. | |
| 2015/0045001 A1* | 2/2015 | Song | G06F 21/36 |
| | | | 455/411 |
| 2015/0046884 A1* | 2/2015 | Moore | G06F 3/0481 |
| | | | 715/863 |
| 2015/0058796 A1 | 2/2015 | Thakur et al. | |
| 2015/0074603 A1 | 3/2015 | Abe et al. | |
| 2015/0077326 A1 | 3/2015 | Kramer et al. | |
| 2015/0078634 A1 | 3/2015 | Mankowski | |
| 2015/0106722 A1* | 4/2015 | Ubillos | G06F 3/0488 |
| | | | 715/731 |
| 2015/0138259 A1* | 5/2015 | Nakayama | G06F 1/3265 |
| | | | 345/691 |
| 2015/0185877 A1 | 7/2015 | Watanabe et al. | |
| 2015/0189215 A1 | 7/2015 | Kameoka | |
| 2015/0195335 A1 | 7/2015 | Park | |
| 2015/0256763 A1* | 9/2015 | Niemi | G06F 3/0485 |
| | | | 348/700 |
| 2015/0334219 A1* | 11/2015 | Soundararajan | H04M 1/72403 |
| | | | 455/414.1 |
| 2015/0346984 A1 | 12/2015 | Flint et al. | |
| 2015/0358685 A1 | 12/2015 | Adjesson | |
| 2015/0370425 A1 | 12/2015 | Chen et al. | |
| 2016/0062567 A1 | 3/2016 | Yang et al. | |
| 2016/0193502 A1* | 7/2016 | Kim | G06F 3/0488 |
| | | | 715/728 |
| 2016/0224235 A1 | 8/2016 | Forsstrom et al. | |
| 2016/0259412 A1 | 9/2016 | Flint et al. | |
| 2016/0370956 A1 | 12/2016 | Penha et al. | |
| 2016/0370957 A1 | 12/2016 | Penha et al. | |
| 2016/0370976 A1 | 12/2016 | Penha et al. | |
| 2016/0370982 A1 | 12/2016 | Penha et al. | |
| 2017/0055039 A1 | 2/2017 | Earle | |
| 2017/0060485 A1* | 3/2017 | Krilivsky | H04N 5/23216 |
| 2017/0068402 A1 | 3/2017 | Lochhead et al. | |
| 2017/0068410 A1 | 3/2017 | Alonso Ruiz et al. | |
| 2017/0068430 A1 | 3/2017 | Brown et al. | |
| 2017/0068511 A1 | 3/2017 | Brown et al. | |
| 2017/0277373 A1 | 9/2017 | Jeong et al. | |
| 2018/0088896 A1 | 3/2018 | Olson | |
| 2018/0188950 A1* | 7/2018 | Choi | G06F 3/04886 |
| 2018/0284963 A1 | 10/2018 | Alonso Ruiz et al. | |
| 2018/0364877 A1 | 12/2018 | Penha et al. | |
| 2018/0364878 A1 | 12/2018 | Penha et al. | |
| 2019/0102458 A1* | 4/2019 | Roblek | G06F 3/165 |
| 2019/0138273 A1 | 5/2019 | Brown et al. | |
| 2020/0150836 A1 | 5/2020 | Penha et al. | |

FOREIGN PATENT DOCUMENTS

| | | |
|---|---|---|
| CN | 101484869 A | 7/2009 |
| CN | 102253796 A | 11/2011 |
| CN | 102262438 A | 11/2011 |
| CN | 102934066 A | 2/2013 |
| CN | 103164152 A | 6/2013 |
| CN | 103390124 A | 11/2013 |
| CN | 103455237 A | 12/2013 |
| CN | 104007924 A | 8/2014 |
| CN | 104618788 A | 5/2015 |
| CN | 104954848 A | 9/2015 |
| CN | 105260096 A | 1/2016 |
| CN | 105824550 A | 8/2016 |
| CN | 105955520 A | 9/2016 |
| CN | 106257392 A | 12/2016 |
| CN | 106502520 A | 3/2017 |
| CN | 106502638 A | 3/2017 |
| CN | 106959831 A | 7/2017 |
| CN | 206341211 U | 7/2017 |
| CN | 107248392 A | 10/2017 |
| CN | 107682724 A | 2/2018 |
| EP | 0609819 A1 | 8/1994 |
| EP | 0890910 A2 | 1/1999 |
| EP | 0890910 A3 | 12/2005 |
| EP | 1956601 A2 | 8/2008 |
| EP | 2209311 A1 | 7/2010 |
| EP | 3244413 A1 | 11/2017 |
| EP | 3547316 A1 | 10/2019 |
| GB | 2409017 A | 6/2005 |
| JP | H11-32301 A | 2/1999 |
| JP | H11-352949 A | 12/1999 |
| JP | 2000-163031 A | 6/2000 |
| JP | 2002-342033 A | 11/2002 |
| JP | 2005128164 A | 5/2005 |
| JP | 2007-108805 A | 4/2007 |
| JP | 2007-257336 A | 10/2007 |
| JP | 2009-141895 A | 6/2009 |
| JP | 2010186281 A | 8/2010 |
| JP | 2011-524108 A | 8/2011 |
| JP | 2012-113600 A | 6/2012 |
| JP | 2012-521049 A | 9/2012 |
| JP | 2013-54470 A | 3/2013 |
| JP | 2013-529802 A | 7/2013 |
| JP | 2015-11725 A | 1/2015 |
| JP | 2016-81216 A | 5/2016 |
| KR | 10-2005-0091423 A | 9/2005 |
| KR | 10-2011-0013001 A | 2/2011 |
| KR | 10-2011-0080351 A | 7/2011 |
| KR | 10-2011-0089403 A | 8/2011 |
| KR | 10-2011-0118802 A | 11/2011 |
| KR | 10-2013-0000652 A | 1/2013 |
| KR | 10-2014-0002034 A | 1/2014 |
| KR | 10-2014-0083300 A | 7/2014 |
| KR | 10-2015-0049900 A | 5/2015 |
| WO | 1998/021645 A1 | 5/1998 |
| WO | 2003/075258 A1 | 9/2003 |
| WO | 2004/021691 A2 | 3/2004 |
| WO | 2005/103863 A2 | 11/2005 |
| WO | 2009/062109 A1 | 5/2009 |
| WO | 2009/136236 A1 | 11/2009 |
| WO | 2010/078523 A1 | 7/2010 |
| WO | 2011/100623 A2 | 8/2011 |
| WO | 2011/149357 A1 | 12/2011 |
| WO | 2011/156161 A2 | 12/2011 |
| WO | 2013/094991 A1 | 6/2013 |
| WO | 2013/169842 A2 | 11/2013 |
| WO | 2013/169849 A2 | 11/2013 |
| WO | 2013/169865 A2 | 11/2013 |
| WO | 2013/169875 A2 | 11/2013 |
| WO | 2014/105276 A1 | 7/2014 |
| WO | 2014/105278 A1 | 7/2014 |
| WO | 2014/105279 A1 | 7/2014 |
| WO | 2014/143633 A1 | 9/2014 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Corrected Notice of Allowance received for U.S. Appl. No. 14/867,004, dated Apr. 6, 2016, 2 Pages.

Corrected Notice of Allowance received for U.S. Appl. No. 14/867,004, dated Apr. 17, 2017, 2 pages.

Corrected Notice of Allowance received for U.S. Appl. No. 14/867,004, dated Mar. 22, 2017, 2 Pages.

Corrected Notice of Allowance received for U.S. Appl. No. 14/868,298, dated Jul. 31, 2018, 2 Pages.

(56) References Cited

OTHER PUBLICATIONS

Corrected Notice of Allowance received for U.S. Appl. No. 14/868,298, dated Jun. 15, 2018, 2 pages.
Corrected Notice of Allowance received for U.S. Appl. No. 14/872,011, dated Jul. 31, 2018, 2 Pages.
Corrected Notice of Allowance received for U.S. Appl. No. 16/112,616, dated Dec. 11, 2019, 2 Pages.
Corrected Notice of Allowance received for U.S. Appl. No. 16/112,629, dated Nov. 1, 2019, 2 Pages.
Corrected Notice of Allowance received for U.S. Appl. No. 14/872,042, dated Jan. 4, 2017, 2 Page.
Corrected Notice of Allowance received for U.S. Appl. No. 14/872,042, dated Mar. 30, 2017, 2 Pages.
Extended European Search Report received for European Patent Application No. 17175448.4, dated Oct. 13, 2017, 9 pages.
Extended European Search Report received for European Patent Application No. 19156493.9, dated Jul. 2, 2019, 9 Pages.
Extended European Search Report received for European Patent Application No. 19174117.2, dated Aug. 29, 2019, 8 Pages.
"Focus (Computing)—Wikipedia", The Free Encyclopedia, Available online at: <https://en.wikipedia.org.wiki/Focus_(computing)>, Mar. 22, 2016, 4 Pages.
International Search Report received for PCT Patent Application No. PCT/US2016/033641, dated Nov. 3, 2016, 6 pages.
International Search Report received for PCT Patent Application No. PCT/US2016/046409, dated Jan. 19, 2017, 4 Pages.
International Search Report received for PCT Patent Application No. PCT/US2016/046412, dated Dec. 21, 2016, 6 Pages.
Non-Final Office Action received for U.S. Appl. No. 14/866,986, dated Mar. 11, 2016, 10 Pages.
Non-Final Office Action received for U.S. Appl. No. 14/867,004, dated Nov. 18, 2016, 12 Pages.
Non-Final Office Action received for U.S. Appl. No. 14/868,298, dated Oct. 4, 2017, 12 Pages.
Non-Final Office Action received for U.S. Appl. No. 14/872,011, dated Sep. 29, 2017, 16 Pages.
Non-Final Office Action received for U.S. Appl. No. 16/112,616, dated Aug. 12, 2019, 8 Pages.
Notice of Allowance received for U.S. Appl. No. 14/866,525, dated Mar. 19, 2018, 10 Pages.
Notice of Allowance received for U.S. Appl. No. 14/866,525, dated Oct. 19, 2017, 9 Pages.
Notice of Allowance received for U.S. Appl. No. 14/866,570, dated Jan. 4, 2018, 8 Pages.
Notice of Allowance received for U.S. Appl. No. 14/866,570, dated Sep. 21, 2017, 9 Pages.
Notice of Allowance received for U.S. Appl. No. 14/866,986, dated Jul. 29, 2016, 6 Pages.
Notice of Allowance received for U.S. Appl. No. 14/867,004, dated Jul. 26, 2016, 5 Pages.
Notice of Allowance received for U.S. Appl. No. 14/867,004, dated Mar. 10, 2017, 5 Pages.
Notice of Allowance received for U.S. Appl. No. 14/867,004, dated Mar. 28, 2016, 12 Pages.
Notice of Allowance received for U.S. Appl. No. 14/868,298, dated Jun. 5, 2018, 5 Pages.
Notice of Allowance received for U.S. Appl. No. 14/869,755, dated Apr. 11, 2018, 9 Pages.
Notice of Allowance received for U.S. Appl. No. 14/869,755, dated Aug. 1, 2018, 8 Pages.
Notice of Allowance received for U.S. Appl. No. 14/872,011, dated Jun. 6, 2018, 5 Pages.
Notice of Allowance received for U.S. Appl. No. 15/997,618, dated Jul. 23, 2019, 9 Pages.
Notice of Allowance received for U.S. Appl. No. 15/997,618, dated Sep. 5, 2019, 7 Pages.
Notice of Allowance received for U.S. Appl. No. 16/112,616, dated Oct. 21, 2019, 5 pages.
Notice of Allowance received for U.S. Appl. No. 16/112,629, dated Sep. 12, 2019, 8 pages.
Notice of Allowance received for U.S. Appl. No. 14/872,042, dated Dec. 16, 2016, 11 pages.
Wikipedia, "Metadata", Available online at <https://web.archive.org/web/20150613205842/https://en.wikipedia.org/wiki/Metadata>, published on Jun. 13, 2015 as per Wayback Machine.
Apple, "Final Cut Pro X: Pan Audio", Available online at: <https://support.apple.com/kb/PH12578?locale=en_US>, Apr. 17, 2017, 4 Pages.
Christie et al., "Remote/TV User Interface Interactions", U.S. Appl. No. 14/262,435, filed Apr. 25, 2014, 155 Pages.
Dolby Laboratories, "Kogan KALED39SMTWA User Manual", Available online at: <https://assets.kogan.com/files/usernamemanuals/KALED39SMTWA-A>, Oct. 12, 2012, 38 Pages.
Mehrvarz et al., "WICD Core 1.0", W3C Working Group Note, Aug. 19, 2010, 31 Pages.
Reddit, "I Made an Intelligent SMS Notification App that Vibrates Differently Based on the Contents", Available online at: <http://www.reddit.com/r/Android/comments/1uksxi/i_made_an_intelligent_sms_notification_app_that/>, Jan. 6, 2014, 8 Pages.
Webster, "Customize Vibration Alert with Mumble", Available online at: <http://www.androidguys.com/2014/01/21/customize-vibration-alerts-mumble-app-review>, Jan. 21, 2014, 5 Pages.
Woods, "11 Android Apps to Make Notifications More Interesting", Available online at: <http://www.thenextweb.com>, Apr. 19, 2014, 6 Pages.
Youtube, "Hands-on With Immersion HD Integrator Hi-Fi Haptics HD", Available online at: <http://www.engadget.com>, Feb. 23, 2012, 9 Pages.
International Search Report and Written Opinion received for PCT Patent Application No. PCT/US2019/030674, dated Jul. 17, 2019, 11 pages.
Search Report received for Chinese Patent Application No. 201980037597.8, dated Jun. 11, 2021, 6 pages (3 page of English Translation and 3 page of Official Copy).
Search Report received for Chinese Patent Application No. 201910829598.8, dated Aug. 8, 2022, 4 pages (2 Pages of English Translation and 2 Pages of Official Copy).
Search Report received for Chinese Patent Application No. 201980037597.8, dated Oct. 9, 2022, 6 pages (3 page of English Translation and 3 page of Official Copy).
"Control system screen saver according to needs", Personal Computer Magazine China [online]. Web page <https://caod.oriprobe.com/>, vol. 12, Dec. 2017 [retrieved on May 26, 2023]. Retrieved from the Internet: <https://caod.briprobe.com/articles/52523979/yin_xu_zhi_yi_kong_zhi_xi_tong_ping_bao_.htm>.

* cited by examiner

MEDIA CONTROL FOR SCREENSAVERS ON AN ELECTRONIC DEVICE

CROSS-REFERENCE TO RELATED APPLICATIONS

This application claims benefit of U.S. Provisional Patent Application No. 62/679,929, filed Jun. 3, 2018, which is hereby incorporated by reference in its entirety.

FIELD OF THE DISCLOSURE

This relates generally to electronic devices that allow for browsing and playing content and screensavers, and user interactions with such devices.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, a user may be playing media such as music on the device when the device begins displaying a screensaver, or while the device is displaying a screensaver, and user interaction with such a device entails controlling the music playback and display of the screensaver without exiting the screensaver. Enhancing these interactions improves the user's experience with the device and decreases user interaction time, which is particularly important where input devices are battery-operated.

SUMMARY OF THE DISCLOSURE

Some embodiments described in this disclosure are directed to one or more electronic devices that facilitate music playback and screensaver control while displaying screensavers and one or more operations related to the above that the electronic devices optionally perform. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
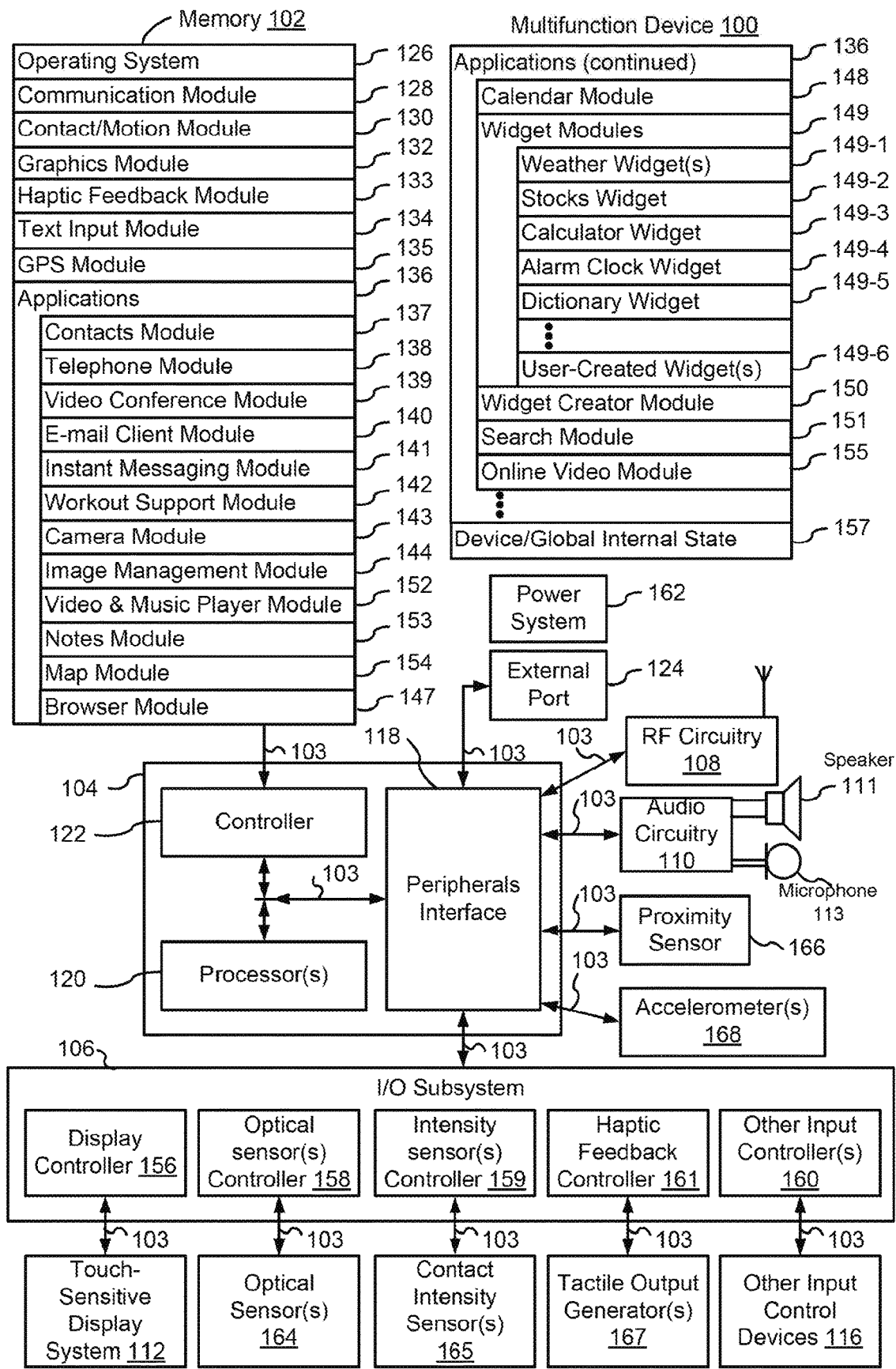
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments. Further, although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
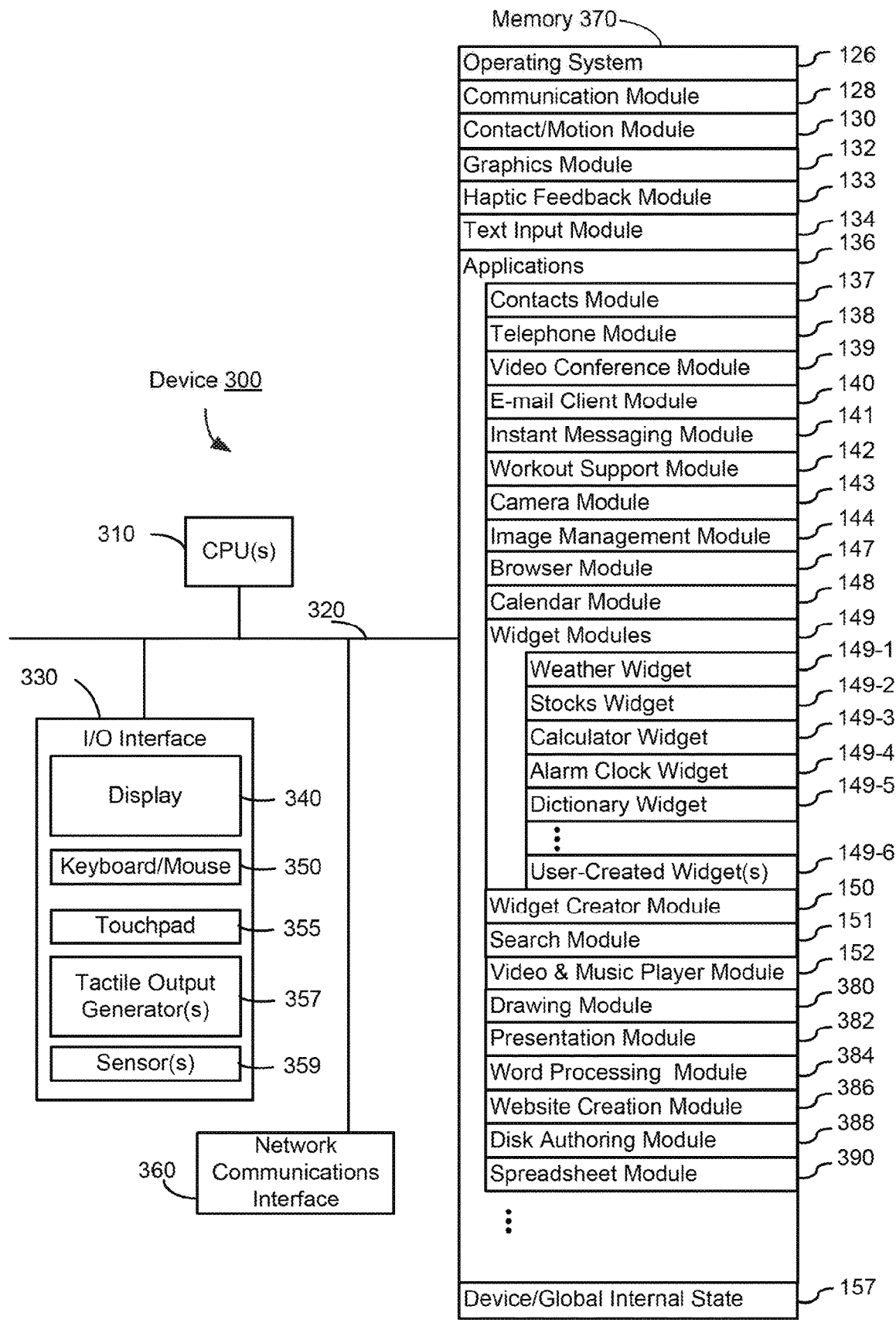
FIG. 3 is a block diagram of an exemplary multifunction device with a display and a touch-sensitive surface in accordance with some embodiments of the disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  video player module;
  music player module;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which merges video player module and music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
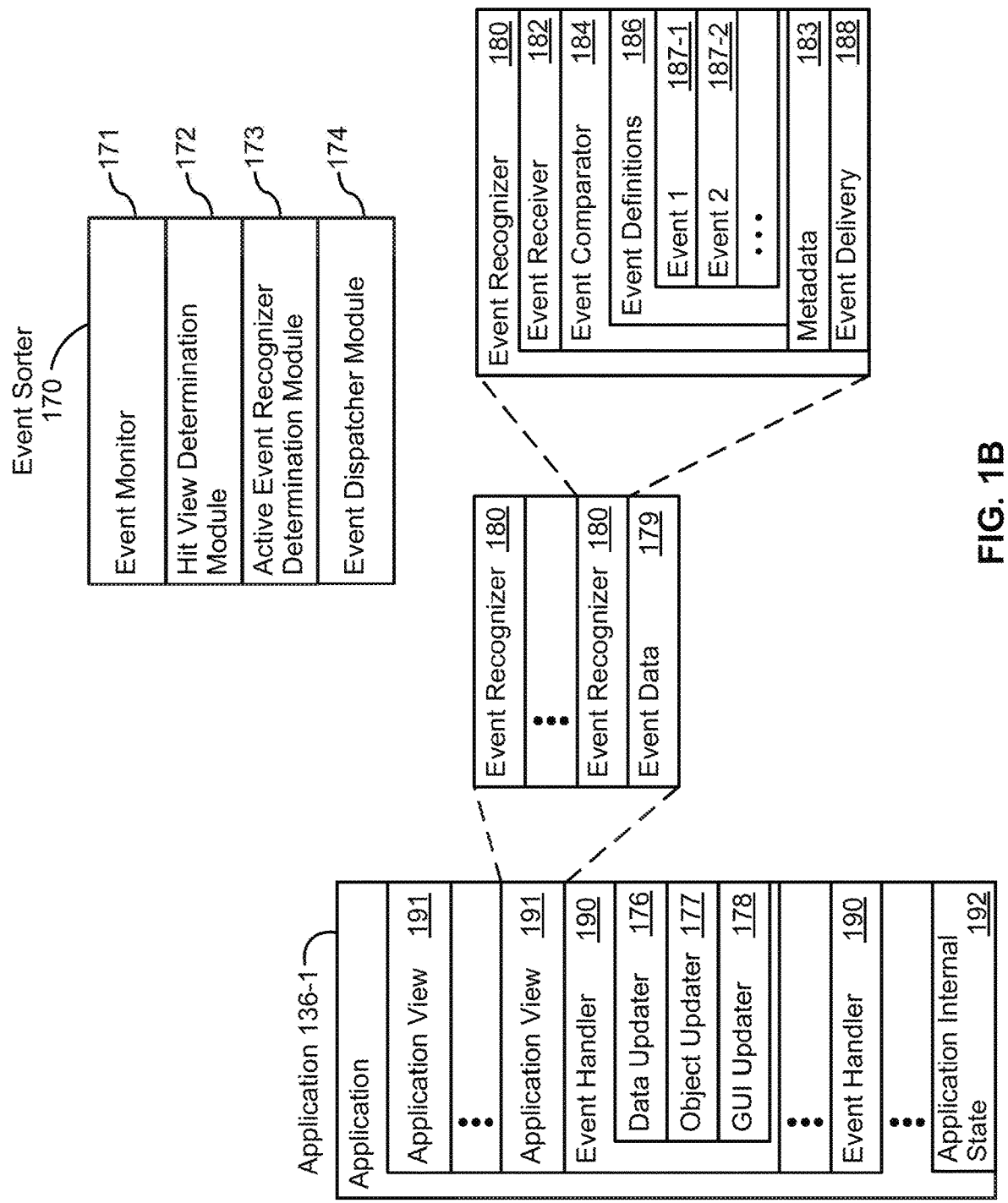
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
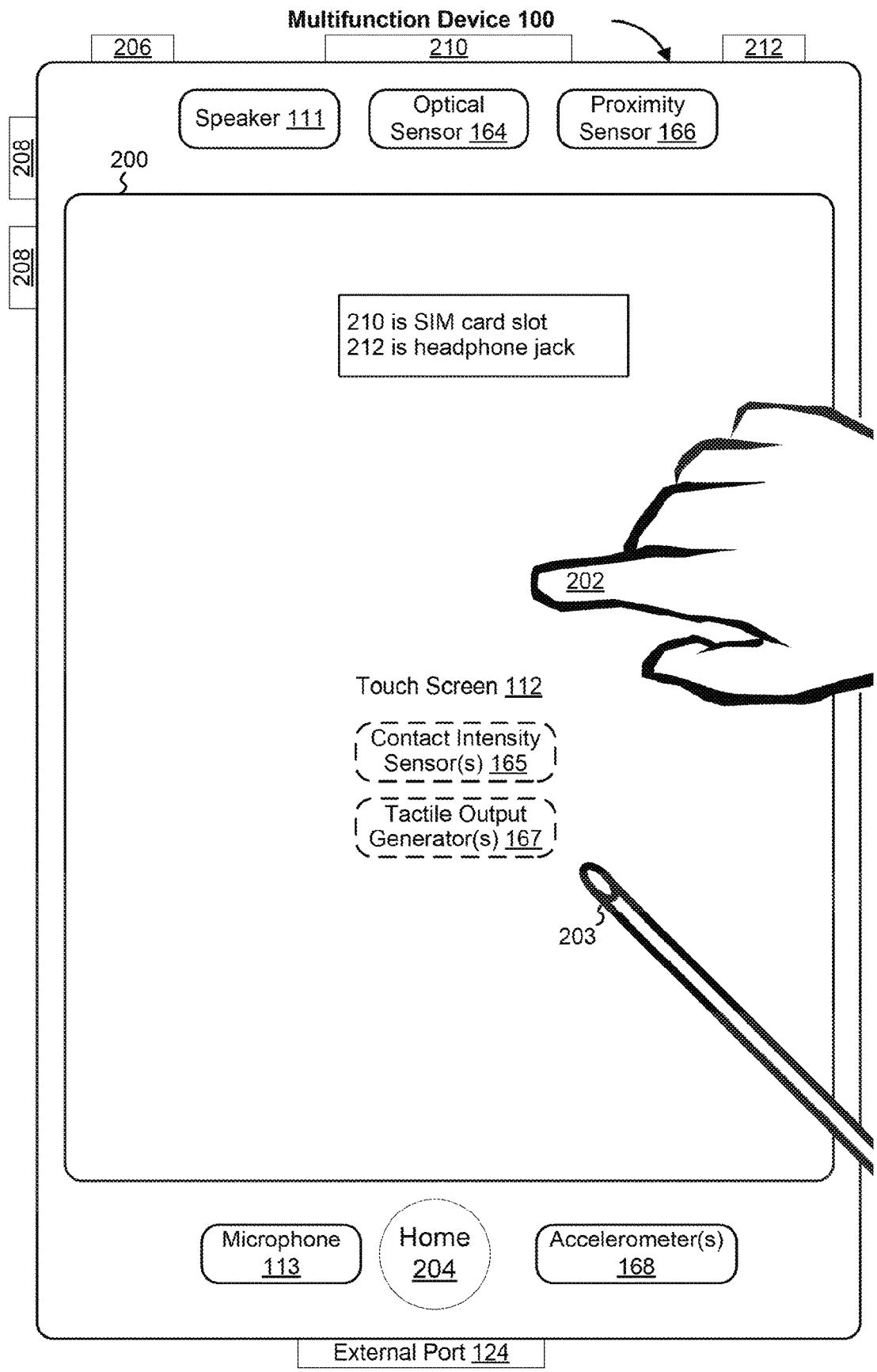
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally, executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4:
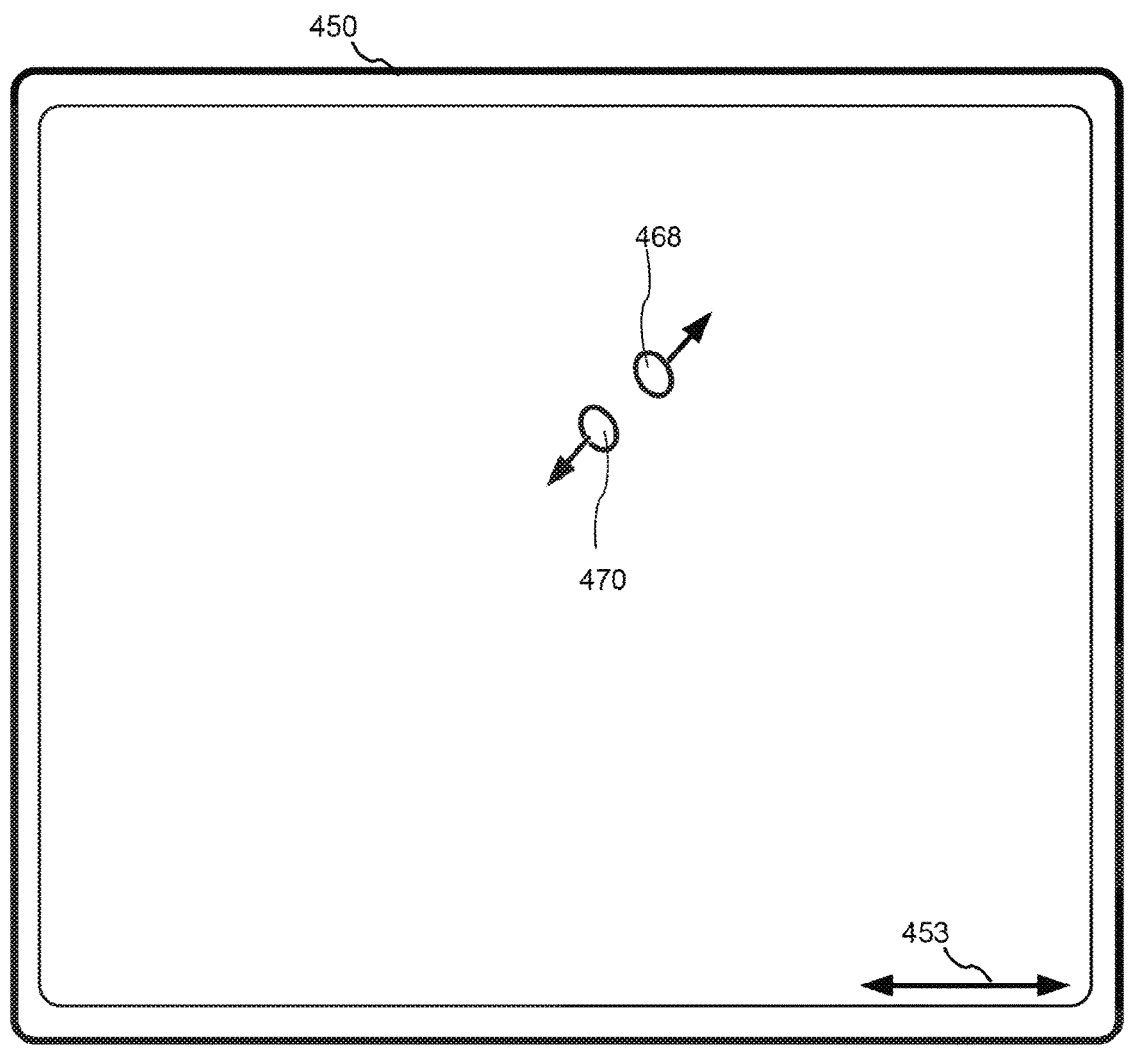
FIG. 4 illustrates an exemplary user interface for a multifunction device with a touch-sensitive surface that is separate from the display in accordance with some embodiments of the disclosure.
Figure 4:
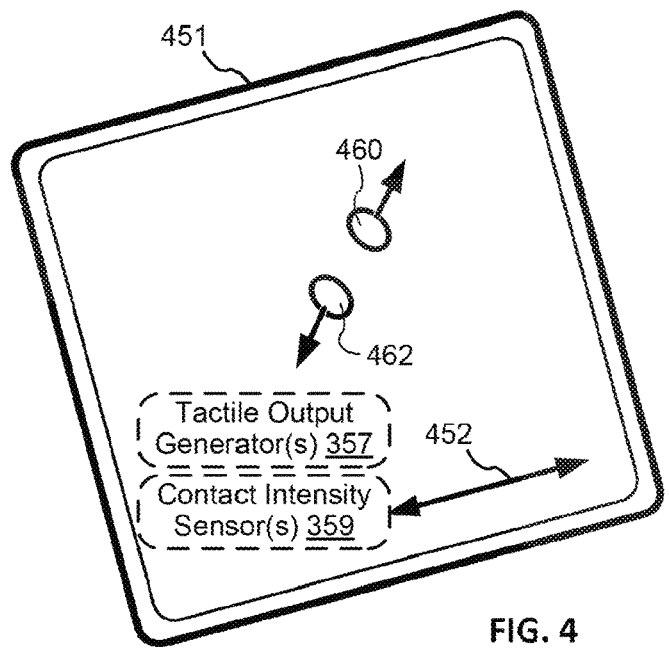

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples that follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
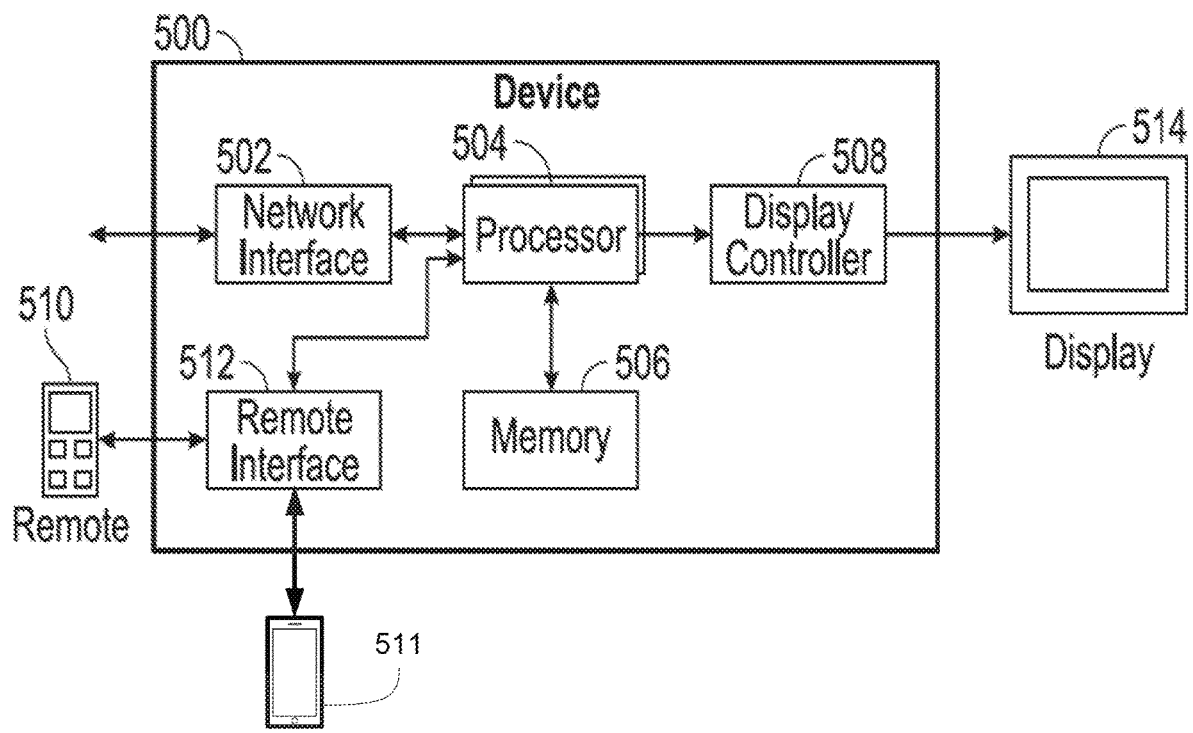
FIGS. 5A-5B illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., method 700).

In some embodiments, display controller 508 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multifunction device 511 (e.g., a smartphone) on which a remote control application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 514 optionally corresponds to one or more of touch-sensitive display system 112 in FIGS. 1A and 2, and display 340 in FIG. 3.

Figure 5B:
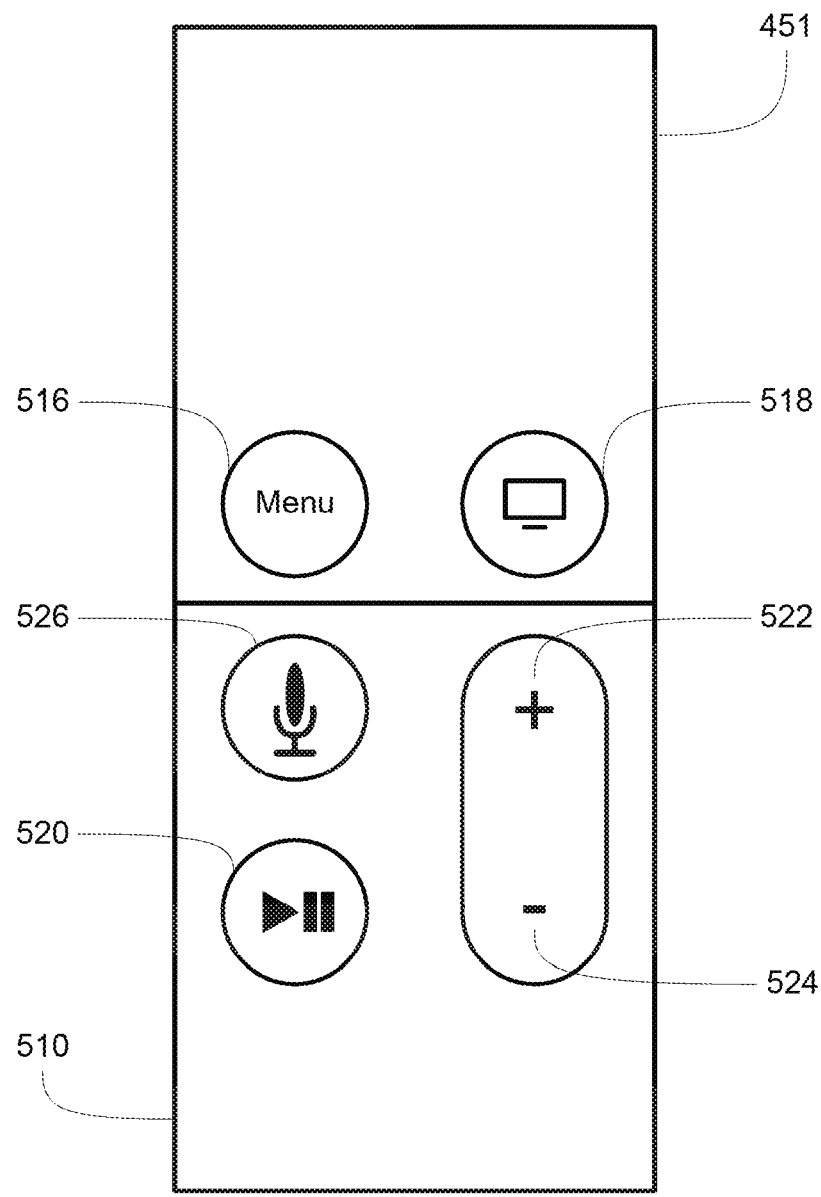

FIG. 5B illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. In some embodiments, touch-sensitive surface 451 is edge-to-edge (e.g., it extends to the edges of remote 510, such that little or no surface of remote 510 exists between the touch-sensitive surface 451 and one or more edges of remote 510, as illustrated in FIG. 5B). Touch-sensitive surface 451 is optionally able to sense contacts as well as contact intensities (e.g., clicks of touch-sensitive surface 451), as previously described in this disclosure. Further, touch-sensitive surface 451 optionally includes a mechanical actuator for providing physical button click functionality (e.g., touch-sensitive surface 451 is "clickable" to provide corresponding input to device 500). Remote 510 also optionally includes buttons 516, 518, 520, 522, 524 and 526. Buttons 516, 518, 520, 522, 524 and 526 are optionally mechanical buttons or mechanical button alternatives that are able to sense contact with, or depression of, such buttons to initiate corresponding action(s) on, for example, device 500. In some embodiments, selection of "menu" button 516 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "home" button 518 by a user navigates device 500 to a main, home, or root user interface from any user interface that is displayed on device 500 (e.g., to a home screen of device 500 that optionally includes one or more applications accessible on device 500). In some embodiments, selection of "play/pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/pause" button 520 is selected, the content item is optionally played). In some embodiments, selection of "+" 522 or "−" 524 buttons by a user increases or decreases, respectively, the volume of audio reproduced by device 500 (e.g., the volume of a content item currently-playing on device 500). In some embodiments, selection of "audio input" button 526 by a user allows the user to provide audio input (e.g., voice input) to device 500, optionally, to a voice assistant on the device. In some embodiments, remote 510 includes a microphone via which the user provides audio input to device 500 upon selection of "audio input" button 526. In some embodiments, remote 510 includes one or more accelerometers for detecting information about the motion of the remote.

User Interfaces and Associated Processes

Music Playback and Screensaver Control

Users interact with electronic devices in many different manners, including interacting with media (e.g., music, movies, etc.) that may be available (e.g., stored or otherwise accessible) on the electronic devices. For example, a user may browse and play media that is accessible on an electronic device. However, in some circumstances, a user may be playing media such as music on the electronic device when the electronic device begins displaying a screensaver, or while the device is displaying a screensaver (e.g., the device is playing music from a playlist and the user has not interacted with the device for a certain amount of time such that the device begins displaying a screensaver). Once the screensaver has been activated, the user may desire to control the music playback (e.g., skip a song, replay a song, or play a previous song) without exiting the screensaver and browsing to the appropriate music control interface or application (e.g., a music app) in order to perform such control. In some circumstances, the user may desire to control the display of the screensaver (e.g., skip to the next screensaver, display a previous screensaver, or learn about the location depicted on the screensaver) without exiting the screensaver. The embodiments described below provide ways in which an electronic device facilitates music playback and screensaver control while the device is displaying a screensaver, thereby enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 6A-6DD illustrate exemplary ways in which an electronic device facilitates music playback and screensaver control while displaying screensavers in accordance with some embodiments of the disclosure. The embodiments in these figures are used to illustrate the processes described below, including the processes described with reference to FIGS. 7A-7Q.

Figure 6A:
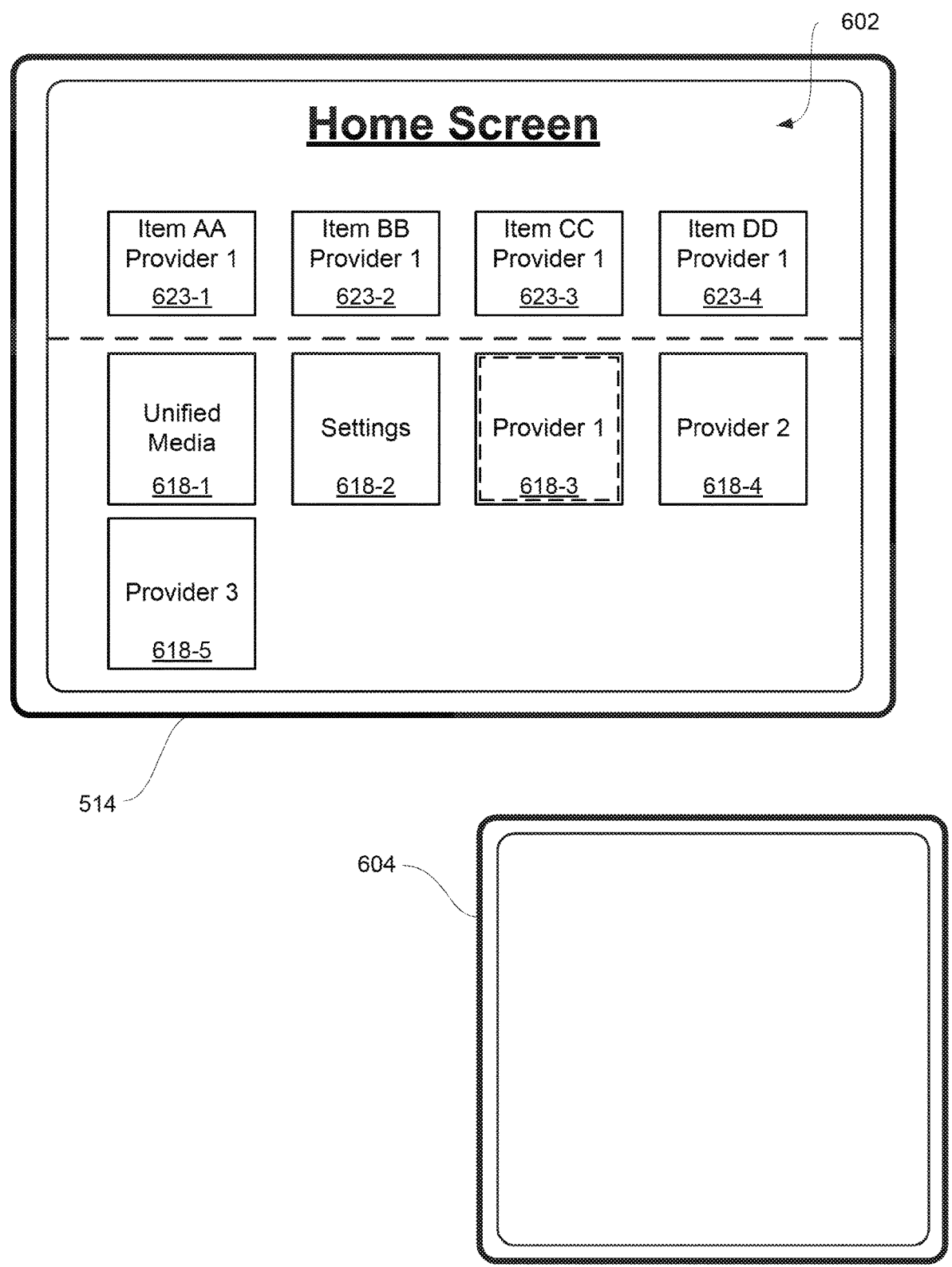
FIGS. 6A-6DD illustrate exemplary ways in which an electronic device facilitates music playback and screensaver control while displaying screensavers in accordance with some embodiments of the disclosure.

FIG. 6A illustrates exemplary display 514. Display 514 optionally displays one or more user interfaces that include various content. In the example illustrated in FIG. 6A, display 514 displays a home screen user interface 602 of an electronic device (e.g., electronic device 500 of FIG. 5A) of which display 514 is a part, or to which display 514 is connected. User interface 602 is optionally an application-browsing user interface of the operating system of the electronic device that includes icons for different applications installed on the electronic device, the icons selectable to launch their corresponding applications on the electronic device. For example, user interface 602 includes icons 618-1 to 618-5 that are selectable to launch different applications on the electronic device. Icon 618-1 is selectable to launch a unified media browsing application, icon 618-2 is selectable to launch a settings application, icon 618-3 is selectable to launch a media application corresponding to media provider 1, icon 618-4 is selectable to launch a media application corresponding to media provider 2, and icon 618-5 is selectable to launch a media application corresponding to media provider 3. In FIG. 6A, icon 618-3 has the current focus, as indicated by the dashed-line box within icon 618-3. In some embodiments, icons 618-1 to 618-5 are arranged in a scrollable grid pattern and user interface 602 is scrollable to display more rows of icons beyond 618-5.

User interface 602 also includes a region above icons 618 (e.g., a "top shelf" region) that optionally displays one or more user interface elements corresponding to the application whose icon 618 has the current focus (in some embodiments, only current focus of icons in the top row of icons 618 in user interface 602 have a corresponding user interface elements in the "top shelf" region). For example, in FIG. 6A, icon 618-3 corresponding to media provider 1 has the current focus. As a result, the electronic device displays representations 623-1 to 623-4 of media items accessible from media provider 1 in the "top shelf" region of user interface 602. Representations 623 optionally include information identifying each media item (e.g., textual information) and/or information about the content of each media item (e.g., video previews of the media items, still images of the media items, etc.). The "top shelf" region is, in some embodiments, a scrollable region that includes representations of suggested media items for the currently highlighted application in the home screen, and an upward swipe causes the current focus to move to a representation of one of the suggested media items that, upon selection (e.g., with a tap or click input on a remote control), will cause the device to start playing a media item that corresponds to the representation of a suggested media item that has current focus.

Figure 6B:
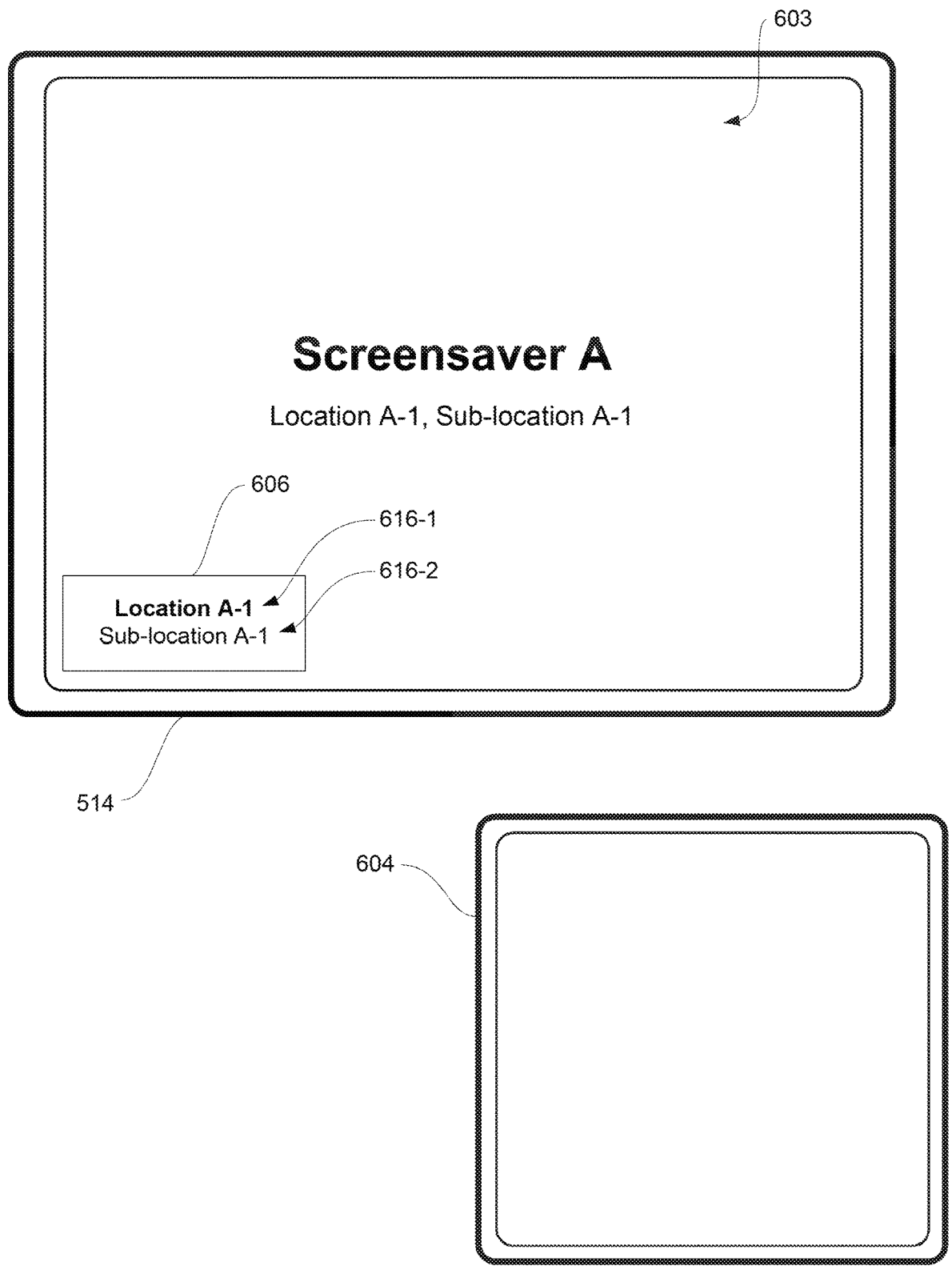

In some embodiments, device 500 displays one or more screensavers on display 514. For example, in FIG. 6B, device 500 enters screensaver mode and display 514 displays a screensaver interface 603 (e.g., in response to the device having been idle or not receiving a user input for a certain amount of time, such as 3, 5 or 10 minutes). In FIG. 6B, screensaver A is displayed in the screensaver interface 603. Screensaver A optionally is an animated video that displays an aerial view of landmarks, cities, or other geographic locations (e.g., Aerial Screensavers by Apple Inc. of Cupertino, Calif.), and in some embodiments, transitions from one of the above to the other in a continuous manner (e.g., displays continuous aerial views from one location to another without skipping any portions of the geography between those two locations). In FIG. 6B, screensaver A is displaying video or images from location A-1 (e.g., a state or country) and sub-location A-1 (e.g., a city or landmark). As display of screensaver A progresses (e.g., playback of the video), screensaver A optionally displays different locations and sub-locations. For example, in some embodiments, screensaver A is a continuous flyover video from San Francisco, Calif. to Los Angeles, Calif. The screensaver optionally begins by displaying aerial views of the Golden Gate Bridge, Lombard Street, Painted Ladies, and other landmarks in San Francisco. Screensaver A then optionally "flies over" the California coast (thus displaying scenes and landmarks along the way) before arriving in Los Angeles, Calif., and displays landmarks in Los Angeles, such as the Griffith Observatory, the Hollywood Sign, and the Santa Monica Pier, amongst others. Thus, a single screensaver optionally displays multiple locations and sub-locations without changing to a different screensaver. After display of screensaver A has concluded (e.g. playback of the aerial video reaches the end or a user requests to display a different screensaver), device 500 optionally displays another screensaver in the screensaver queue. The screensavers in the screensaver queue optionally contain similar flyover aerial videos of different geographic locations.

In FIG. 6B, while screensaver A is displaying location A-1 and sub-location A-1, a location label 606 is displayed overlaid on top of the screensaver in the bottom-left corner of screensaver interface 603. In some embodiments, location label 606 is displayed for a predetermined time period (e.g., 3, 5, or 10 seconds) after device 500 initially begins displaying a screensaver (e.g., screensaver A). Although location label 606 is displayed in the bottom-left corner of screensaver interface 603, this is not meant to be limiting and location label 606 is optionally displayed anywhere on screensaver interface 603 without departing from the scope of the disclosure. The location label 606 provides the user with information about the location that is currently being displayed by screensaver A. In some embodiments, location label 606 includes a primary label 616-1 and secondary label 616-2, corresponding to the primary and secondary locations depicted by the screensaver. In FIG. 6B, the location label 606 includes primary label 616-1 and secondary label 616-2 corresponding to the location A-1 and sub-location A-1 (e.g., text descriptions/names of location A-1 and sub-location A-1), respectively. In some embodiments, when the screensaver transitions from displaying one location to another, device 500 updates location label 606 accordingly.

Figure 6C:
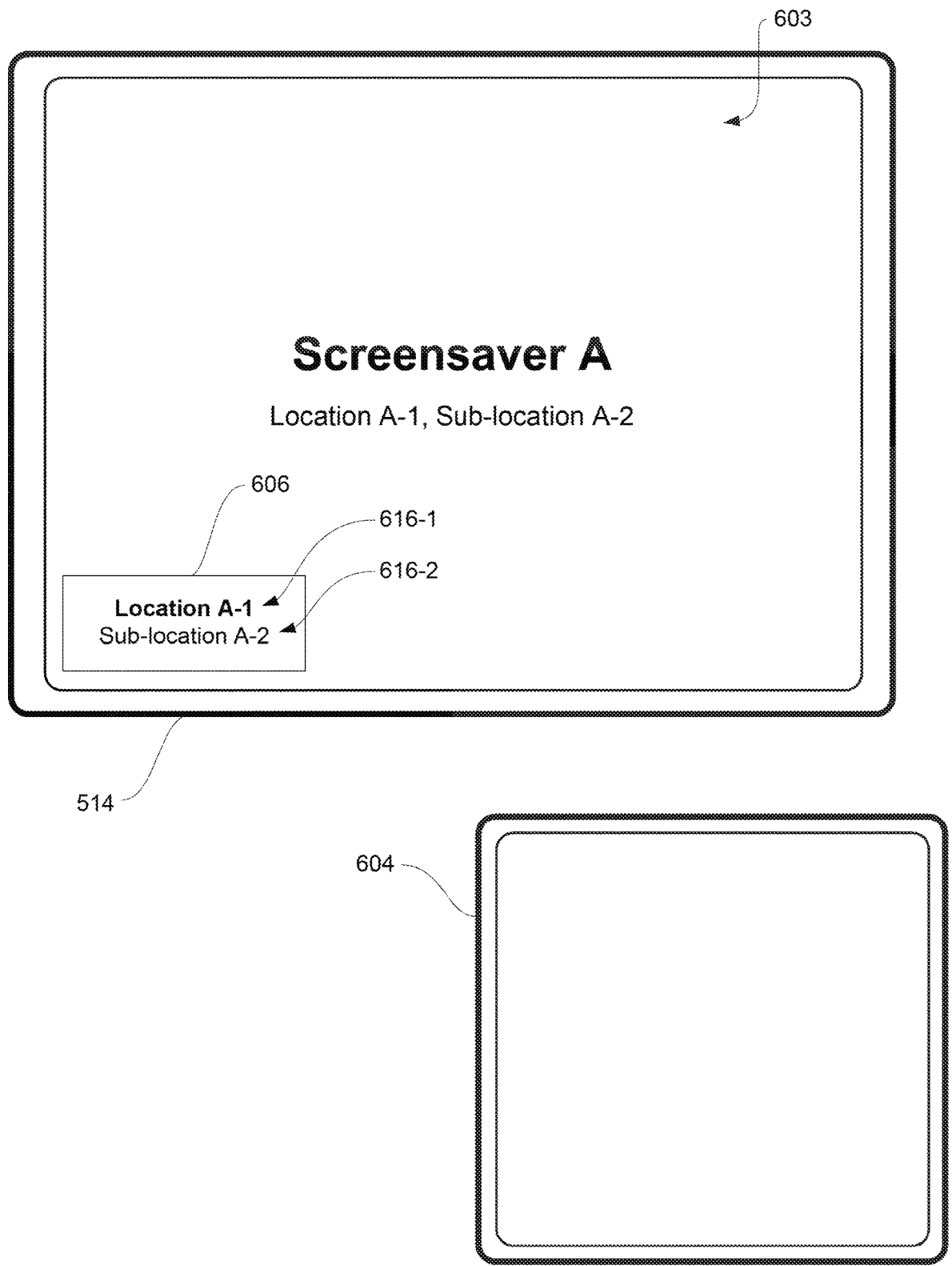

In FIG. 6C, screensaver A transitions to displaying sub-location A-2 within location A-1 (e.g., the animated video has progressed to displaying an aerial view of another landmark, still within location A) while location label 606 is displayed on interface 603 (e.g., transitioning from displaying the Golden Gate Bridge in San Francisco to Lombard Street in San Francisco). As a result, location label 606 is updated to reflect the new location. In particular, in FIG. 6C, primary label 616-1 still displays location A-1 (e.g., San Francisco), but secondary label 616-2 has changed to display sub-location A-2 (e.g., Lombard Street), reflecting the new location displayed by screensaver A.

Figure 6D:
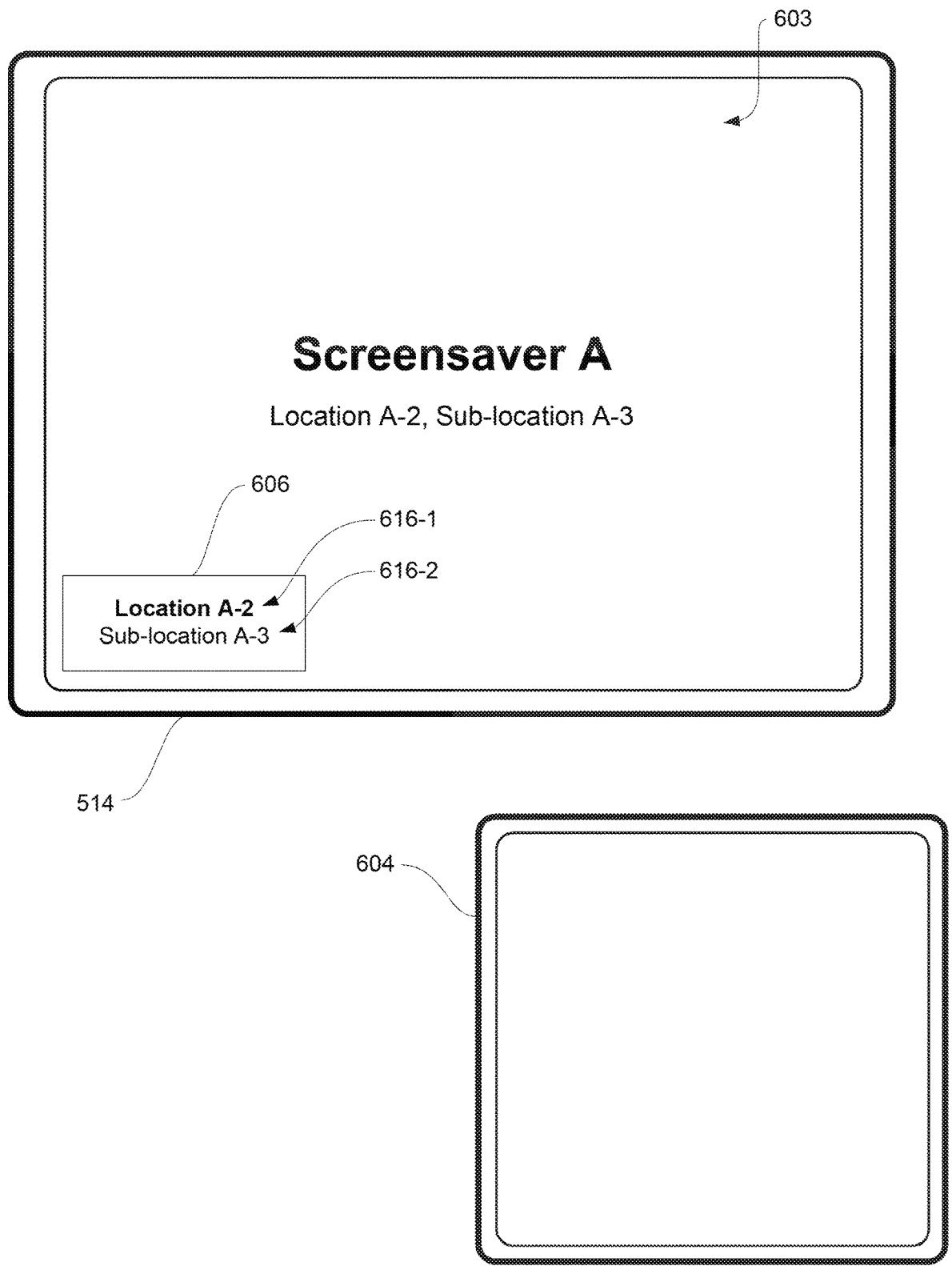

In FIG. 6D, screensaver A transitions to displaying location A-2 and sub-location A-3 (e.g., the animated video progresses to display a new location, no longer within location A-1) while location label 606 is displayed on interface 603 (e.g., transitioning from displaying Lombard Street in San Francisco to Griffith Observatory in Los Angeles). As a result, location label 606 is updated to reflect the new location. In particular, in FIG. 6D, primary label 616-1 has changed to display location A-2 (e.g., Los Angeles), and secondary label 616-2 has changed to display sub-location A-3 (e.g., Griffith Observatory), reflecting the new location displayed by screensaver A.

Figure 6E:
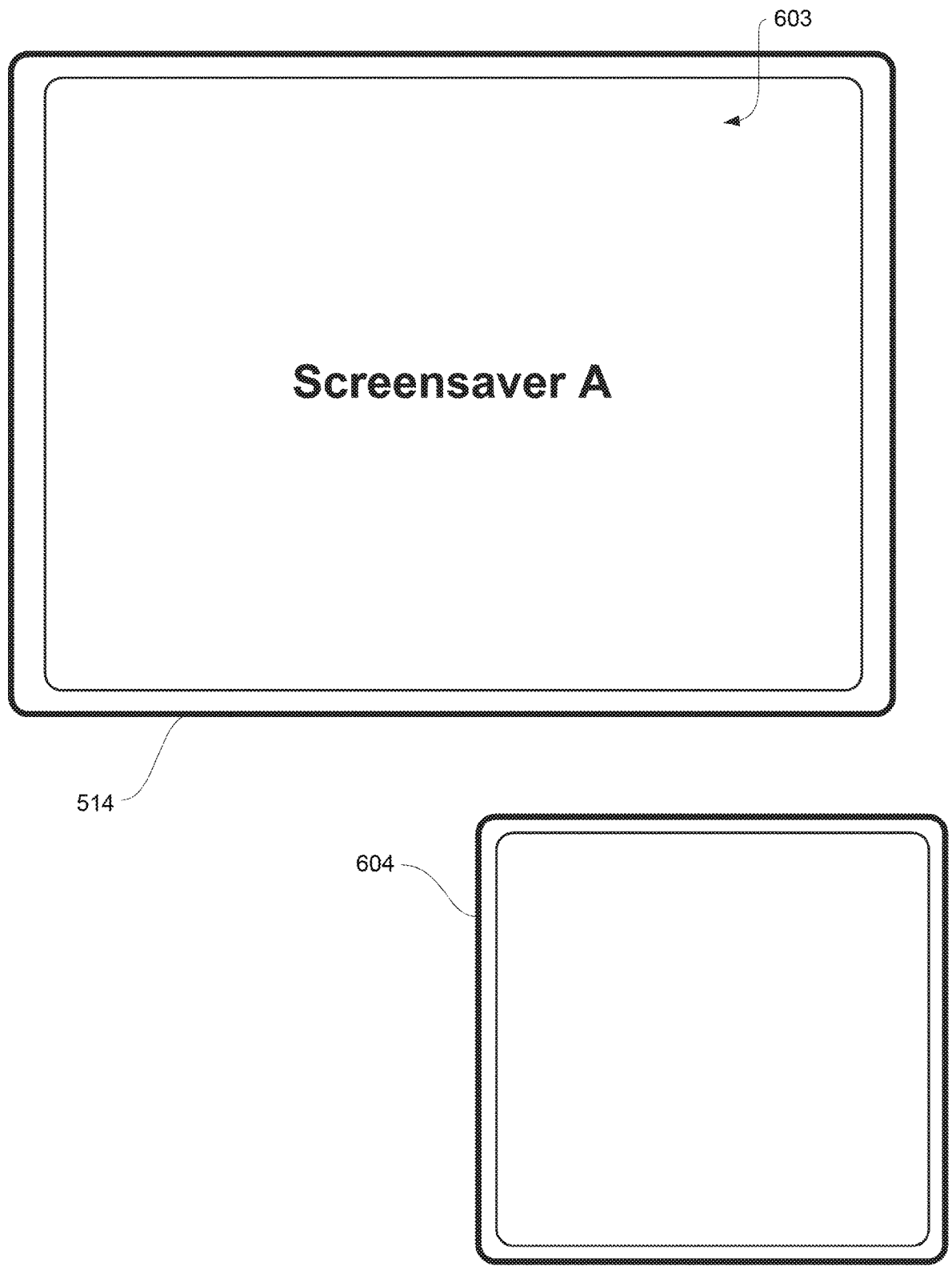

In FIG. 6D, after the location label 606 has been displayed for a certain amount of time, the location label 606 will fade out, leaving only the screensaver (e.g., screensaver A) displayed on interface 603, as illustrated by FIG. 6E. The amount of time before location label 606 fades away is optionally the amount of time since the location label 606 was initially displayed (e.g., the location label will only be displayed for a certain amount of time irrespective of the frequency or number of location transitions that have occurred or are displayed by the location label).

Figure 6F:
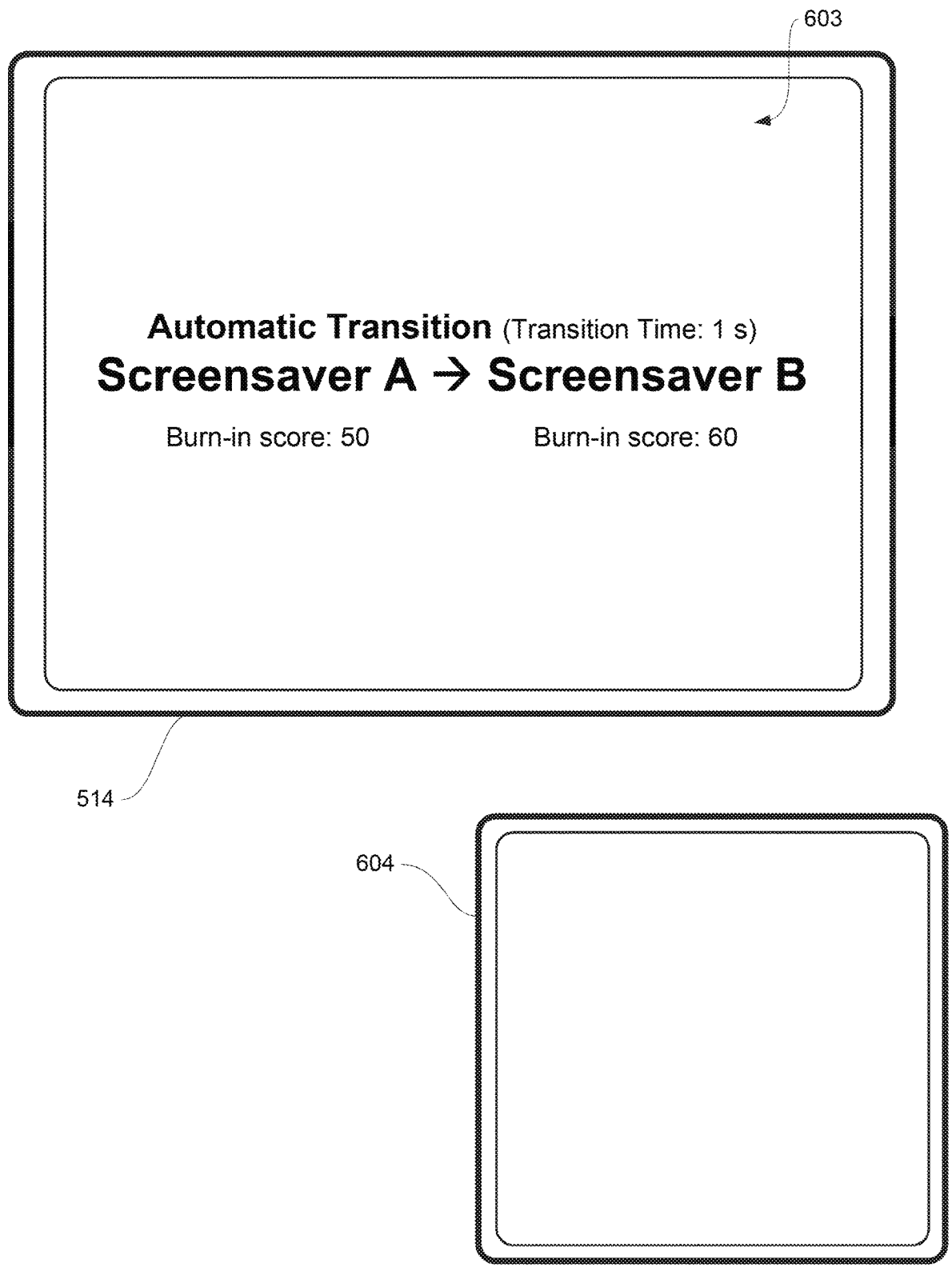

In some embodiments, screensaver interface 603 transitions from one screensaver to another screensaver. The transition is optionally an automatic transition to the next screensaver in the screensaver queue or a manual transition based on the user's input, as will be discussed later. Automatic transition occurs when the previous screensaver completes (e.g., after the screensaver has been displayed for a fixed amount of time or after the playback of the aerial video has reached the end of the video). For example, as shown in FIGS. 6E-6F, device 500 automatically transitions from displaying screensaver A to screensaver B. In particular, after playback of screensaver A ends, screensaver interface 603 automatically transitions to displaying screensaver B, the next screensaver in the screensaver queue. The transition is optionally a fade-in animation that spans 1 second.

In some embodiments, if a display is driven by the same or similar display signal over an extended period of time, the display can exhibit temporary or permanent physical damage to the pixels or panels of the display. This effect is known as screen burn-in and creates visual discolorations of the pixels on the display (e.g., ghost images). Screensavers, as their name implies, optionally prevent screen burn-in and extend the life of a display. Based on their displayed content, screensavers have varying levels of effectiveness in preventing screen burn-in. The effectiveness of screensavers optionally depends on the screensaver's color palette, brightness, pattern of movement of objects on the screen, and overall diversification of the drive signal. In some embodiments, to improve a device's ability to prevent burn-in, discrete screensavers, each with their own individual screen burn-in prevention ability, can be arranged in a manner to improve the overall device's ability to prevent screen burn-in. For example, the device optionally arranges the screensavers in order of increasing ability to prevent screen burn-in. For example, in FIG. 6F, screensaver A has a burn-in prevention score of 50 and screensaver B, the next screensaver in the screensaver queue, has a burn-in prevention score of 60. Thus, screensaver B, which is after screensaver A in the screensaver queue, has better burn-in prevention characteristics than screensaver A. Although FIG. 6F illustrates a screen burn-in prevention score of 50 and 60 for screensavers A and B, respectively, this is merely illustrative and not meant to be limiting. Screen burn-in prevention scores are optionally any number on any arbitrary scale (e.g., a scale of 0-10, 0-100, or 0-200).

In some embodiments, the transition between screensavers is smooth and is substantially invisible to the user. Thus, location labels are optionally only displayed when the user requests to view location information (e.g., by performing a tap gesture on the touch-sensitive surface, as will be described later) and screensaver transitions optionally do not trigger display of the location label. For example, in FIG. 6F, during or after the screensaver transition from screensaver A to screensaver B, the location label is not displayed in interface 603 (e.g., automatic transition from screensaver A to screensaver B does not trigger display of the location label).

Figure 6G:
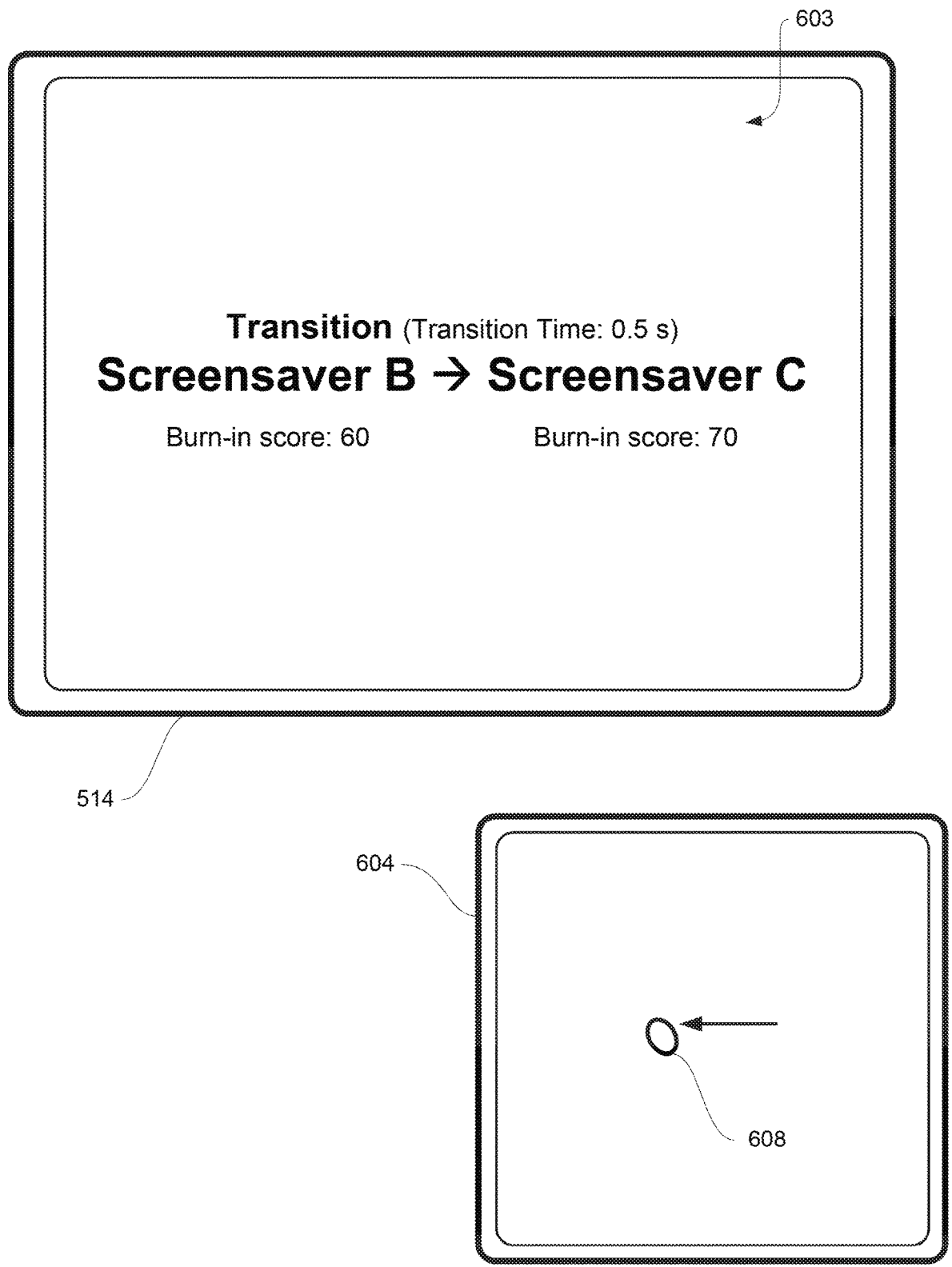

As mentioned above, in addition to automatic transitions, device 500 is able to manually transition between screensavers in response to a user input to do so. Device 500 optionally manually transitions to the next screensaver in the screensaver queue or the previous screensaver in the screensaver queue. For example, in FIG. 6G, a right-to-left swipe of contact 608 is detected on touch-sensitive surface 604, which causes screensaver interface 603 to transition from displaying screensaver B to displaying screensaver C, the next screensaver in the screensaver queue. The transition as a result of the user input optionally spans 0.5 seconds (e.g., the transition is a faster transition than an automatic transition, such as that illustrated in FIG. 6F). In FIG. 6G, screensaver B has a burn-in prevention score of 60 and screensaver C has a burn-in prevention score of 70. Thus, screensaver C optionally has a better burn-in prevention characteristic than screensaver D because it is the next screensaver in the screensaver queue. The manual transition of the screensaver from screensaver B to screensaver C optionally does not display the location label to ensure smooth visual transition between the screensavers (as described above).

Figure 6H:
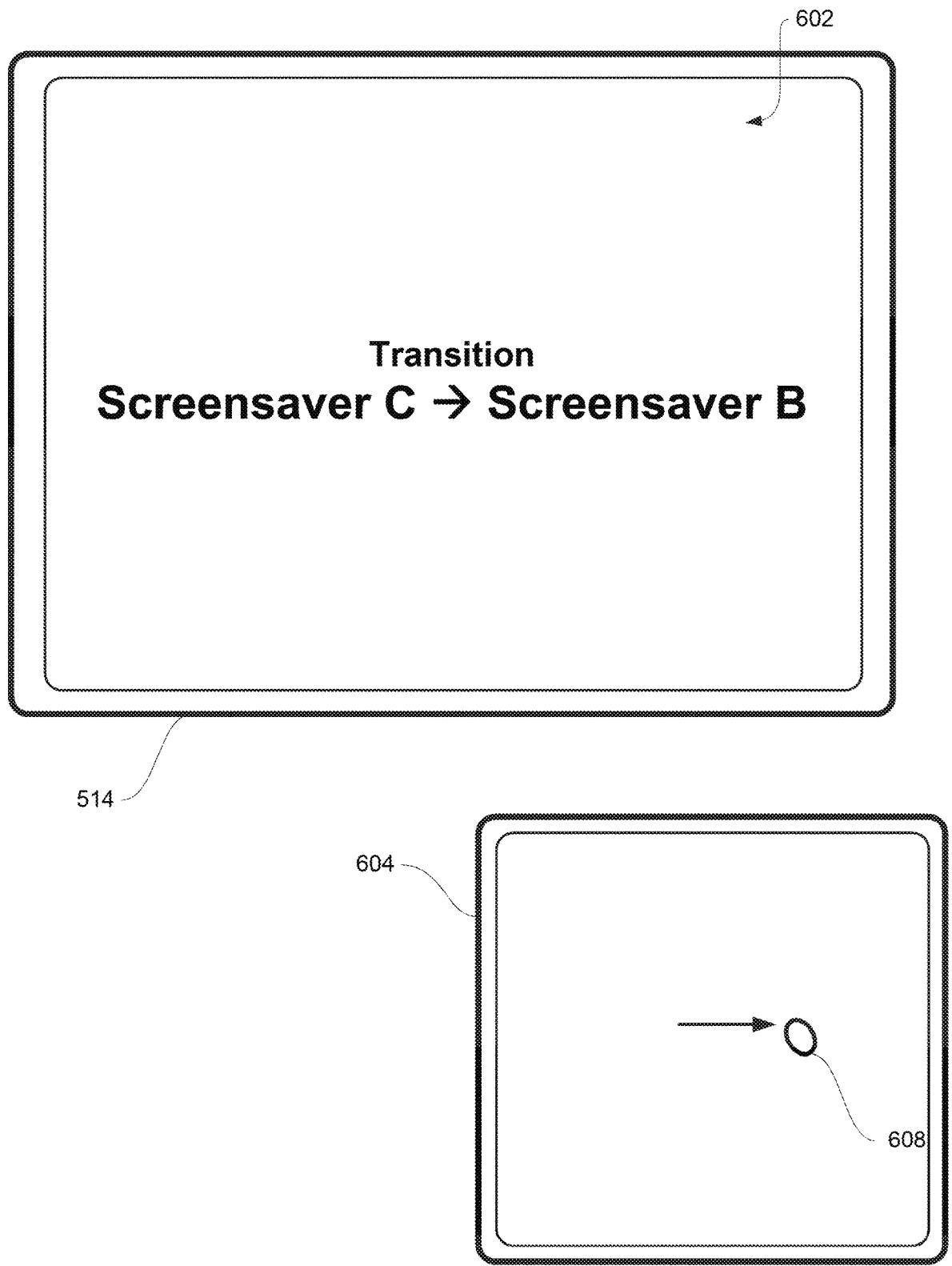

As mentioned above, device 500 is optionally able to manually transition to previous screensavers in the screensaver queue. For instance, in FIG. 6H, a left-to-right swipe of contact 608 is detected on touch-sensitive surface 604, which causes interface 603 to transition from displaying screensaver C back to displaying screensaver B, the previous screensaver in the screensaver queue. The manual transition of the screensaver from screensaver C to screensaver B optionally does not display the location label to ensure a smooth visual transition between the screensavers (as described above).

As described above, a user optionally is able to request information about the location depicted by the screensaver B at any time and cause location label 606 to be displayed. For example, in FIG. 6I, a tap of contact 608 is detected on touch-sensitive surface 604 while screensaver B is being displayed in interface 603 and while no location label is being displayed. As a result, the electronic device displays location label 606 on the screensaver interface 603, as shown in FIG. 6J. The location label (as previously described with respect to FIGS. 6B-6D) includes a primary label 616-1 and a secondary label 616-2 corresponding to location B and sub-location B that is currently being displayed by screensaver B, respectively (e.g., at the time of receiving the tap contact 608 and/or at the time the location label 606 is displayed, the animated video screensaver is displaying location B and sub-location B).

As described previously, in some embodiments, if the screensaver transitions to displaying a different location or if the screensaver interface 603 transitions to displaying a different screensaver while the location label is displayed, the location label is updated to display the new location depicted by the screensaver. For instance, as illustrated by FIGS. 6J-6K, a right-to-left swipe of contact 608 is detected on touch-sensitive surface 604 while location label 606 is displayed. As a result of detecting the right-to-left swipe, the electronic device replaces display of screensaver B with display of screensaver C, the next screensaver in the screensaver queue, on the screensaver interface 603, as shown in FIG. 6K. In FIG. 6K, screensaver C initially displays location C and sub-location C immediately after the transition (e.g., the first location displayed by the animated video screensaver C is sub-location C at location C). Because location label 606 was displayed when the screensaver transitioned, location label 606 now displays location C and sub-location C at the primary label 616-1 and secondary label 616-2, respectively. As described above, location label 606 will optionally remain displayed for a certain amount of time after it is first displayed, and the screensaver transition and resulting update to the primary location 616-1 and secondary location 616-2 optionally does not affect the amount of time the location label 606 remains displayed. After the location label 606 is displayed for the predetermined amount of time, the location label 606 optionally fades away.

In some embodiments, device 500 is playing music when device 500 enters screensaver mode (or, more generally, is playing music while in the screensaver mode, regardless of whether it was playing music when it entered the screensaver mode). For example, if device 500 is playing music and does not receive a user input after a certain time duration, device 500 optionally enters screensaver mode and displays screensaver interface 603. The screensaver trigger time duration may be set by the device or set by the user and can be any suitable duration, such as 3, 5 or 10 minutes. In some embodiments when device 500 is in the screensaver mode while playing music (e.g., device 500 is playing music when device 500 enters screensaver mode or device 500 is in screensaver mode and the user begins playing music without exiting screensaver mode (for example, by providing a voice command on a remote control device)), device 500 is able to provide music control functionality without exiting the screensaver. For example, FIGS. 6L-6Q illustrate music control functionality while a screensaver is displayed by device 500. In particular, the touch-sensitive surface 604 is optionally partitioned into three regions when the device is displaying a screensaver while playing music (e.g., left region 614-1, middle region 614-2 and right region 614-3). In some embodiments, inputs detected at each of the three regions perform different music control and/or screensaver functions.

Figure 6I:
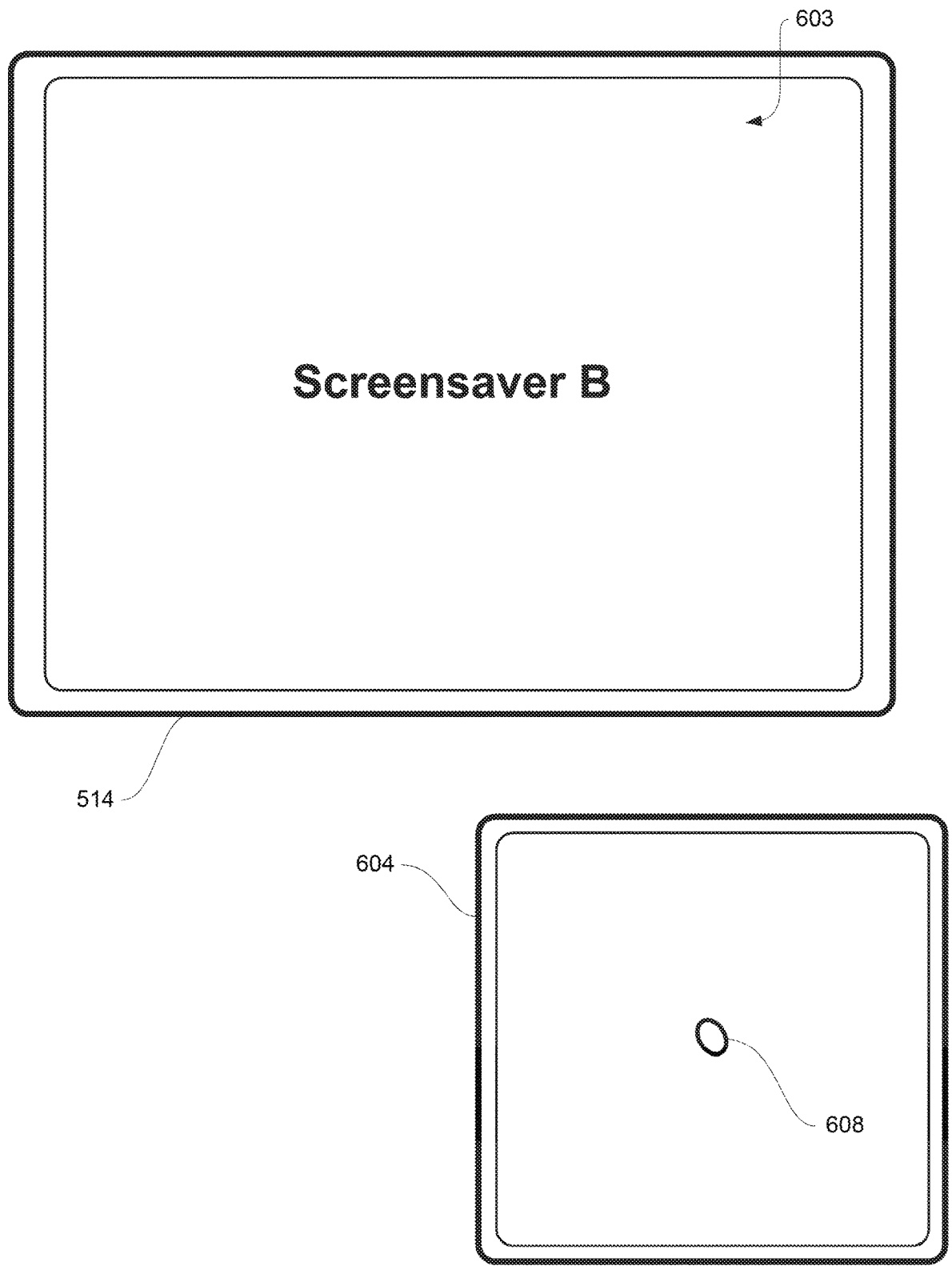
Figure 6J:
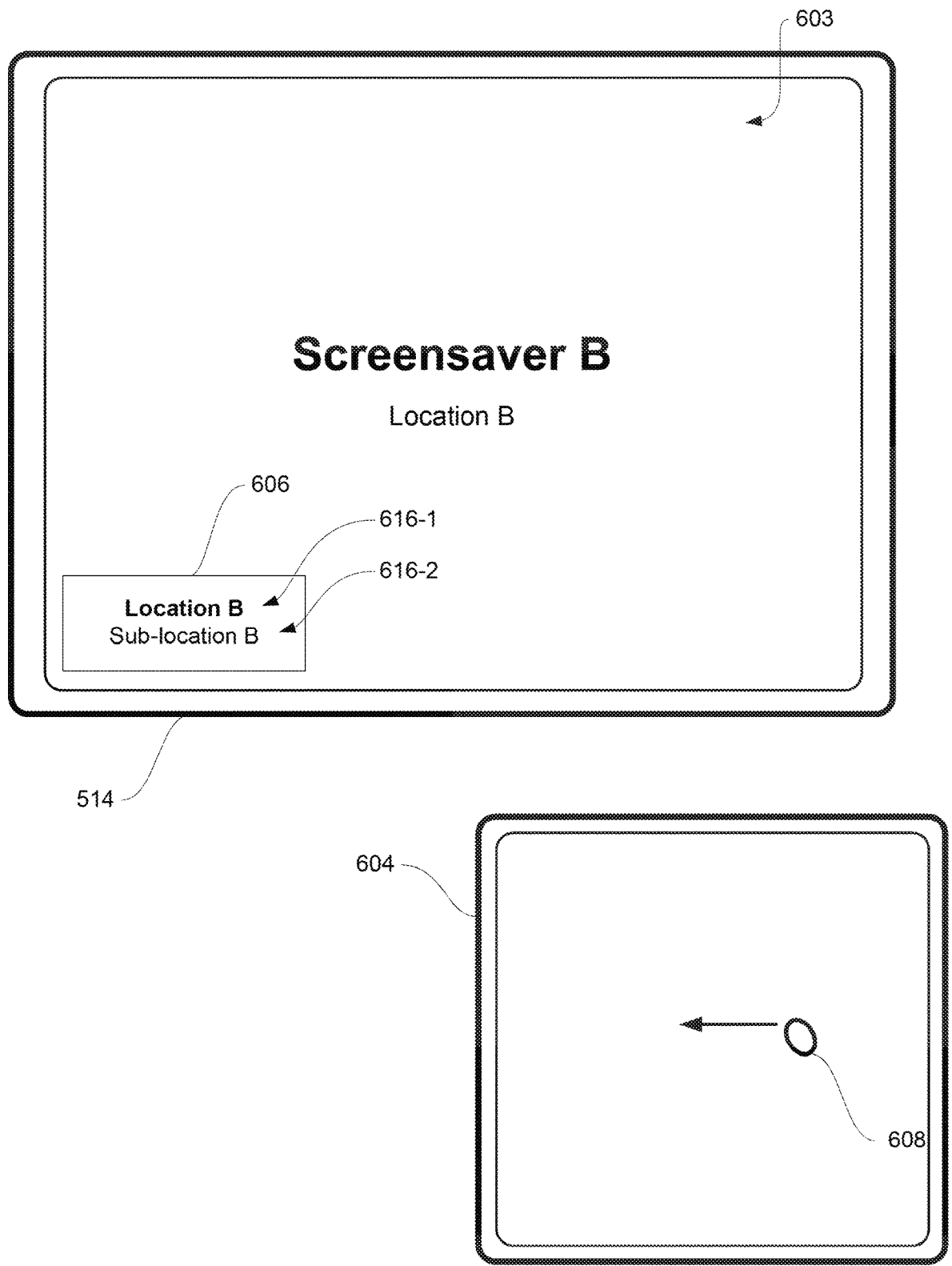
Figure 6K:
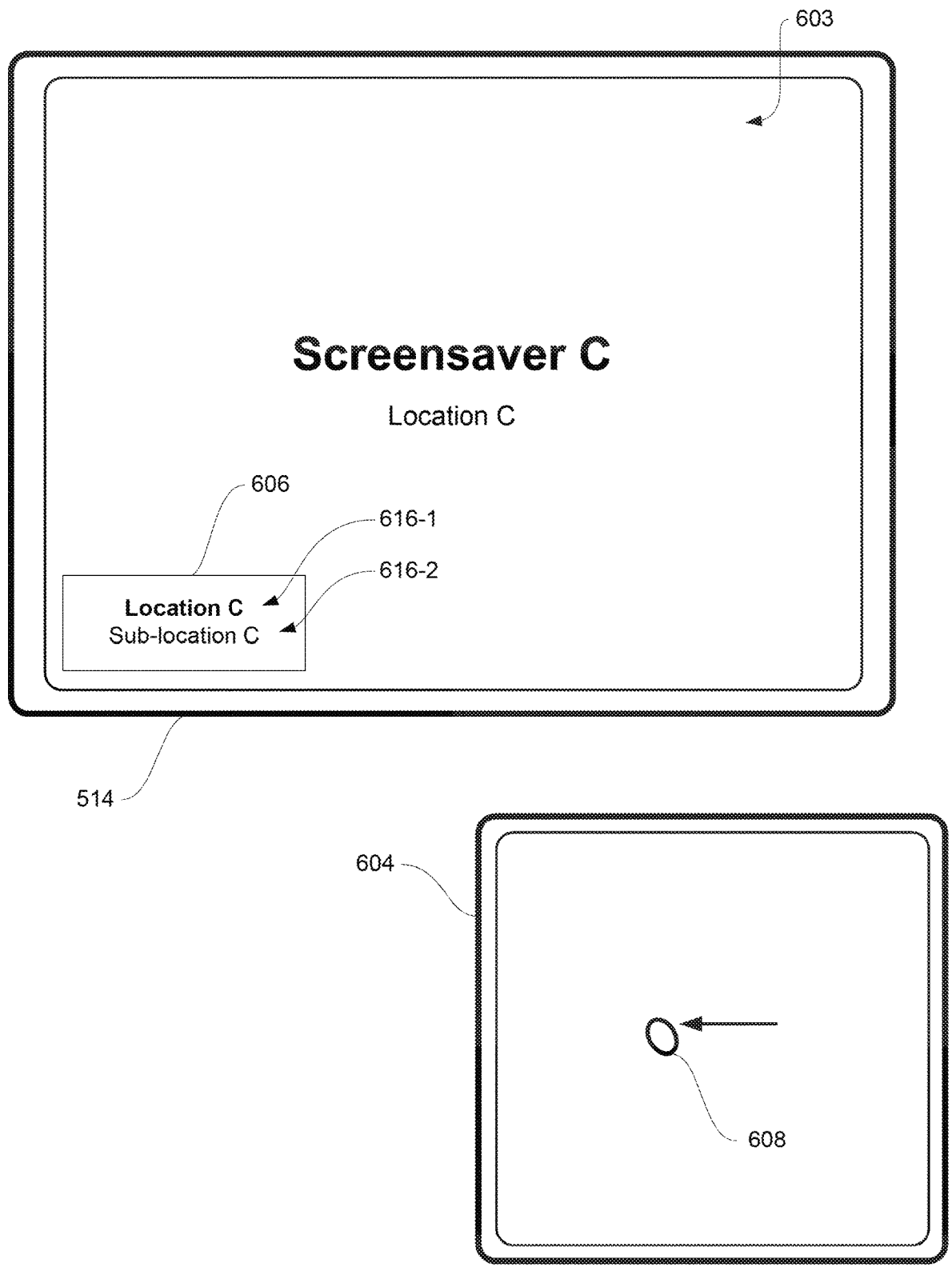
Figure 6L:
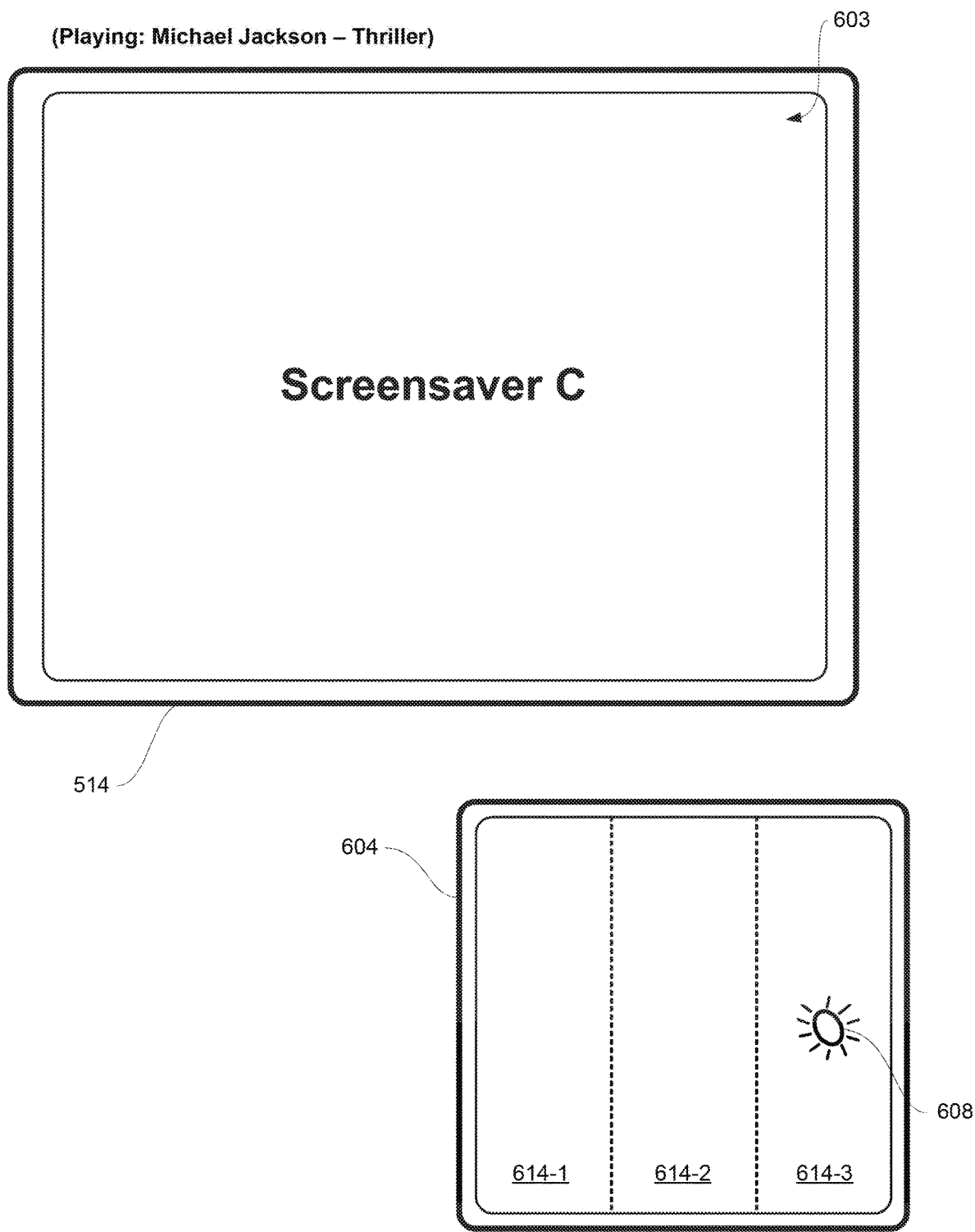

In FIG. 6L, screensaver C is displayed on display 514 while device 500 is playing Thriller by Michael Jackson. The song is optionally one of many songs on a playlist that the device is currently playing. Because a song is playing while displaying a screensaver, the touch-sensitive surface 604 is partitioned into three regions, 614-1 to 614-3, illustrated by the dashed lines. In FIG. 6L, a click on the right region 614-3 of the touch-sensitive surface 604 is detected. As a result, the electronic device plays the next song in the playlist, Longview by Green Day, while continuing to display screensaver C, as shown in FIG. 6M.

In some embodiments, the music that is playing while device 500 is displaying a screensaver transitions automatically (e.g. when the song ends) or manually (in response to a user request). In some embodiments, a music heads-up display (HUD) 610 is displayed when the song being played by device 500 changes in response to a user request, as shown in FIG. 6M, because merely changing the currently playing song may not provide immediate feedback to the user of the change. Thus, displaying a music HUD that displays information about the new song provides visual feedback and acknowledgement to the user that the song has changed. In some embodiments, music HUD 610 is not displayed when the song changes automatically, and is only displayed when the song changes in response to user input.

Figure 6M:
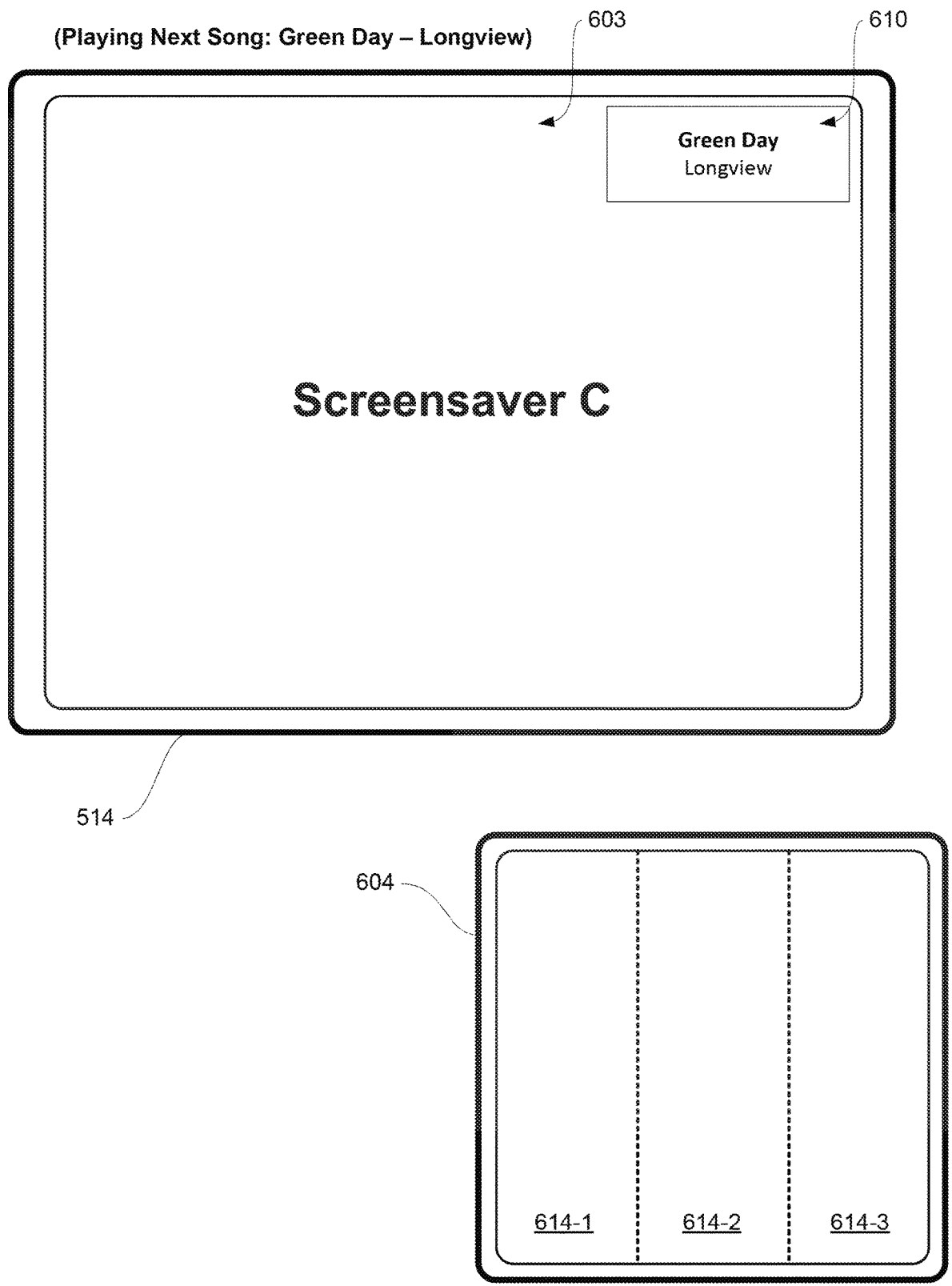

For instance, in FIG. 6M, as a result of a user request to play the next song (e.g., a click on the right region 614-1 of touch-sensitive surface 604) music HUD 610 is displayed overlaid on top of the screensaver at the top-right corner of screensaver interface 603. Although music HUD 610 is displayed in the top-right corner of screensaver interface 603, this is not meant to be limiting and music HUD 610 is optionally displayed anywhere on screensaver interface 603 without departing from the scope of the disclosure. The music HUD 610 optionally displays the name of the artist and the name of the song that begins playing as a result of detecting the click input (as will be described further with reference to method 700). In some embodiments, music HUD 610 includes artwork corresponding to the song that is playing (e.g., album artwork, cover artwork, picture of the artist). For example, in FIG. 6M, the music HUD 610 displays Green Day as the artist name and Longview as the song title (e.g., the song that began playing in response to receiving the request to skip to the next song). In some embodiments, the music HUD 610 is two rows of text. The top row of text displays the artist and the bottom row of text indicates the song title. In some embodiments, the top row is a larger font than the bottom row and/or bolded (e.g., visually emphasized relative to the bottom row).

Figure 6N:
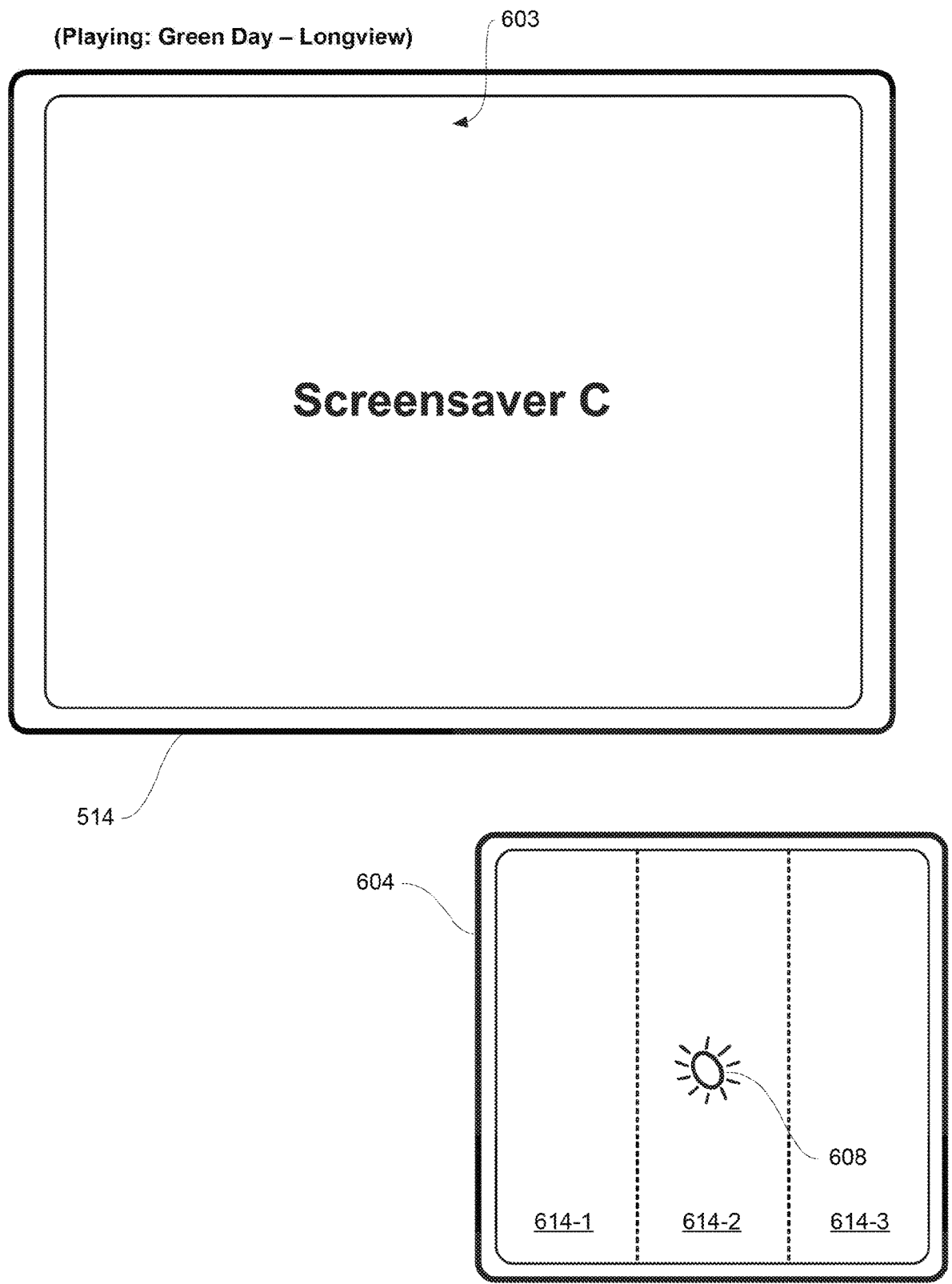

After the music HUD 610 has been displayed on interface 603 for a certain amount of time, the music HUD 610 optionally will fade away and no longer be displayed on interface 603, as shown in FIG. 6N. The song, Longview by Green Day, will continue to be played by the electronic device, and screensaver C will continue to be displayed by the electronic device.

Figure 6O:
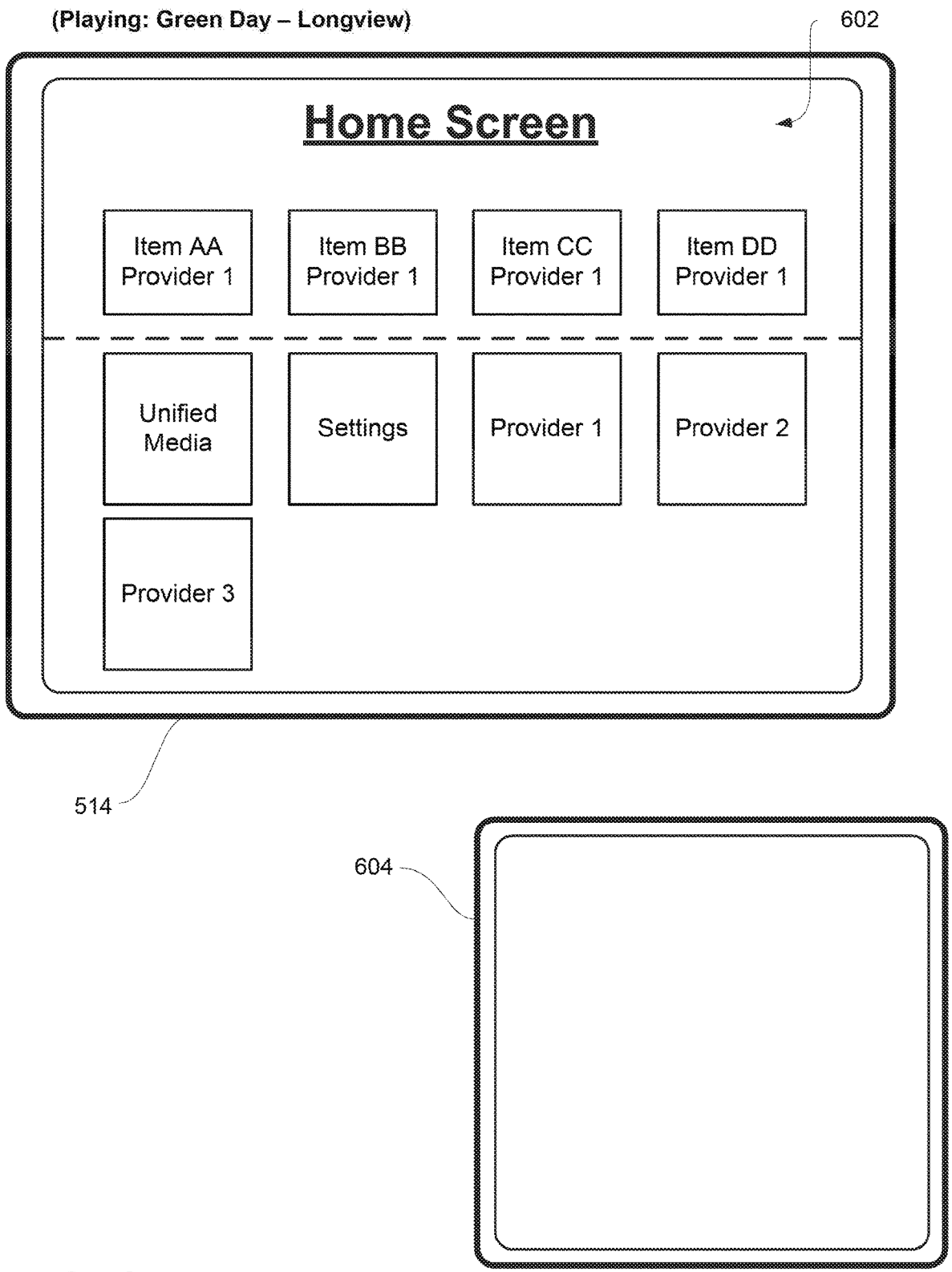

In FIG. 6N, a click on the center region 614-2 of the touch-sensitive surface 604 has been detected while the electronic device is playing Green Day's Longview. As a result, the electronic device will exit the screensaver and display 514 will display the home screen interface 602, as shown in FIG. 6O. The song, Longview by Green Day, will continue to be played by the electronic device.

Figure 6P:
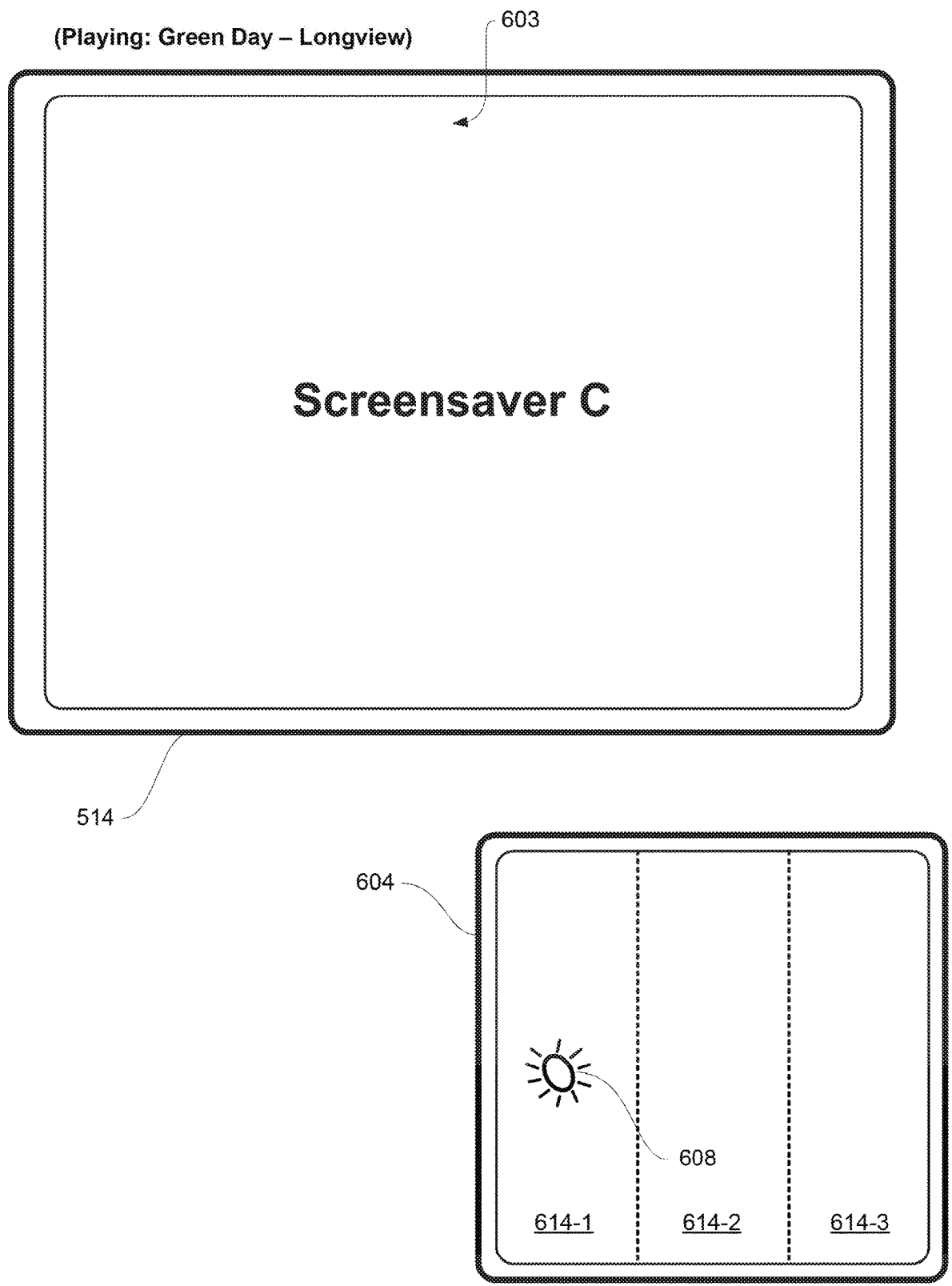

In FIG. 6P, the electronic device is in a state similar to FIG. 6M: the electronic device is displaying screensaver interface 603, with screensaver C as the currently displayed screensaver, and playing Longview by Green Day. In FIG. 6P, a click on the left region 614-1 of the touch-sensitive surface 604 has been detected.

Figure 6Q:
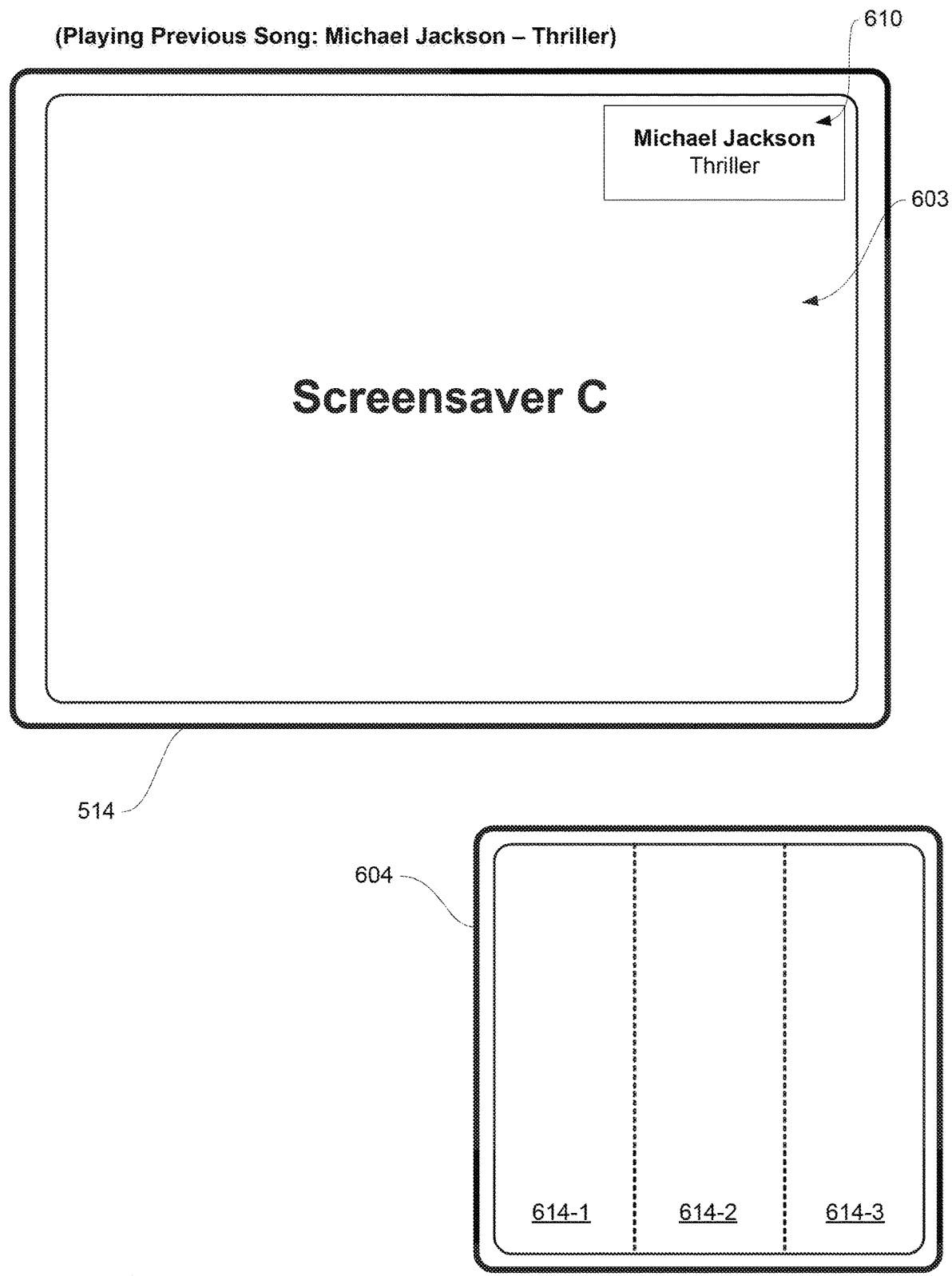

As a result of the click on the left region 614-1 of the touch-sensitive surface 604, the electronic device optionally plays the previous song in the playlist, Thriller by Michael Jackson, while continuing to display screensaver C, as shown in FIG. 6Q. In some embodiments, the electronic device will play the previous song if the playback progress of the song that was playing when the click was received is below a certain threshold (e.g., less than 3, 5, or 10 seconds of the song have been played). In some embodiments, the electronic device will replay the song that was playing when the click was received if the playback progress of the song is above the threshold (e.g., more than 3, 5, or 10 seconds of the song have been played). For example, if the playback progress of Longview by Green Day is above 3 seconds, then the result of a click on the left region 614-1 of the touch-sensitive surface 604 is optionally replaying Longview by Green Day from the beginning of the song. If the playback progress of Longview by Green Day is below 3 seconds, then the result of a click on the left region 614-1 of the touch-sensitive surface 604 is optionally playing the previous song, Thriller by Michael Jackson, as shown in FIG. 6Q. The 3 second playback threshold in this example is meant only to be illustrative and any suitable playback threshold value can be used without departing from the scope of this disclosure.

Referring back to FIG. 6Q, if the result of the click on the left region 614-1 of the touch-sensitive surface 604 causes playback of the previous song (e.g., if the playback progress is below the playback threshold), then the music HUD 610 is displayed, indicating that the currently playing song has changed and displaying the information of the new song. In FIG. 6Q, device 500 is playing Michael Jackson's thriller as a result of the user input, so music HUD 610 displays that the artist is Michael Jackson and the song title is Thriller. However, if the result of the click on the left region 614-1 of the touch-sensitive surface 604 causes the current song to be replayed from the beginning, and if the music HUD 610 was not displayed when the click was detected, then the music HUD 610 is optionally not displayed when playback of the current song is restarted.

Figure 6R:
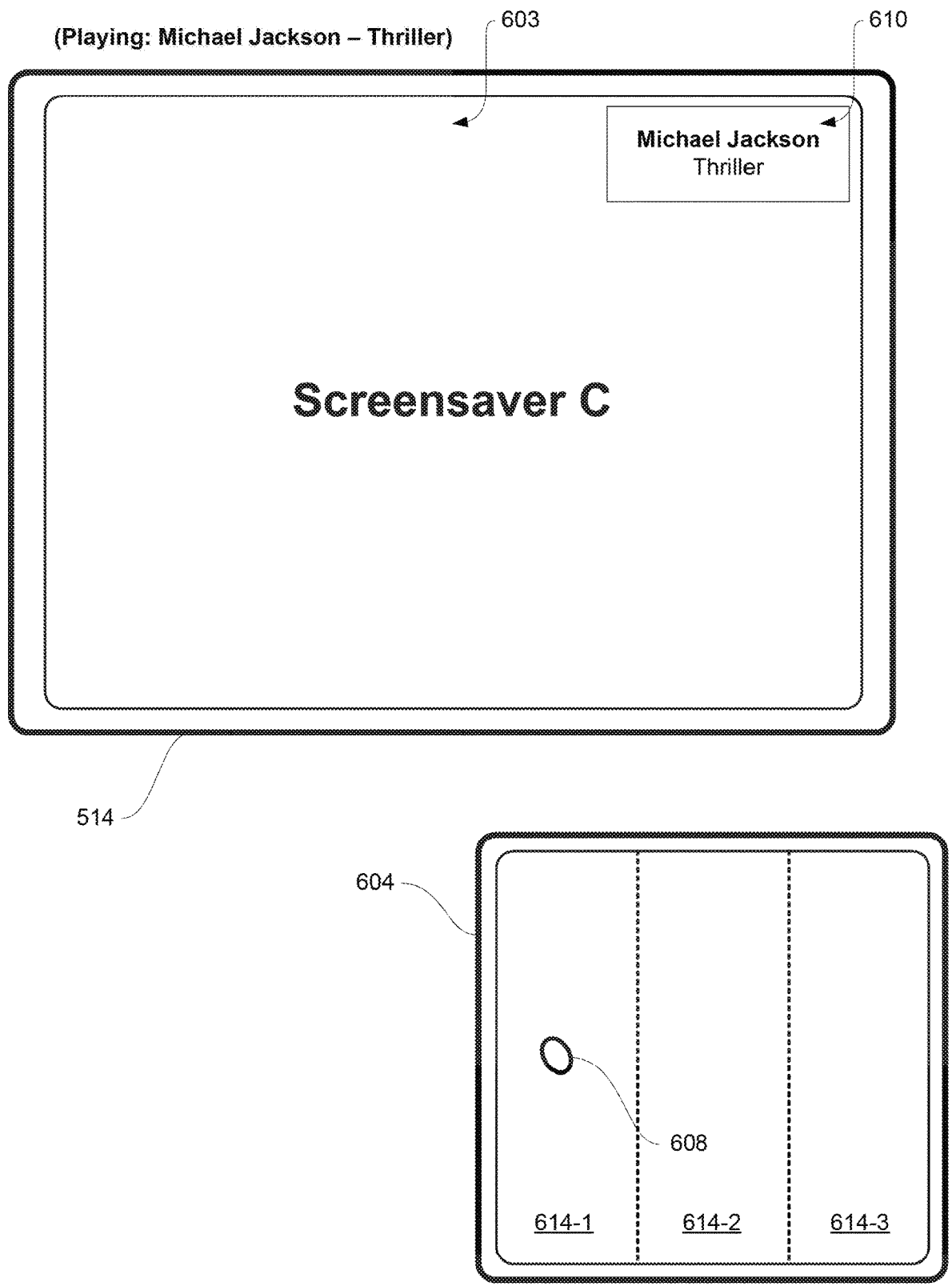
Figure 6S:
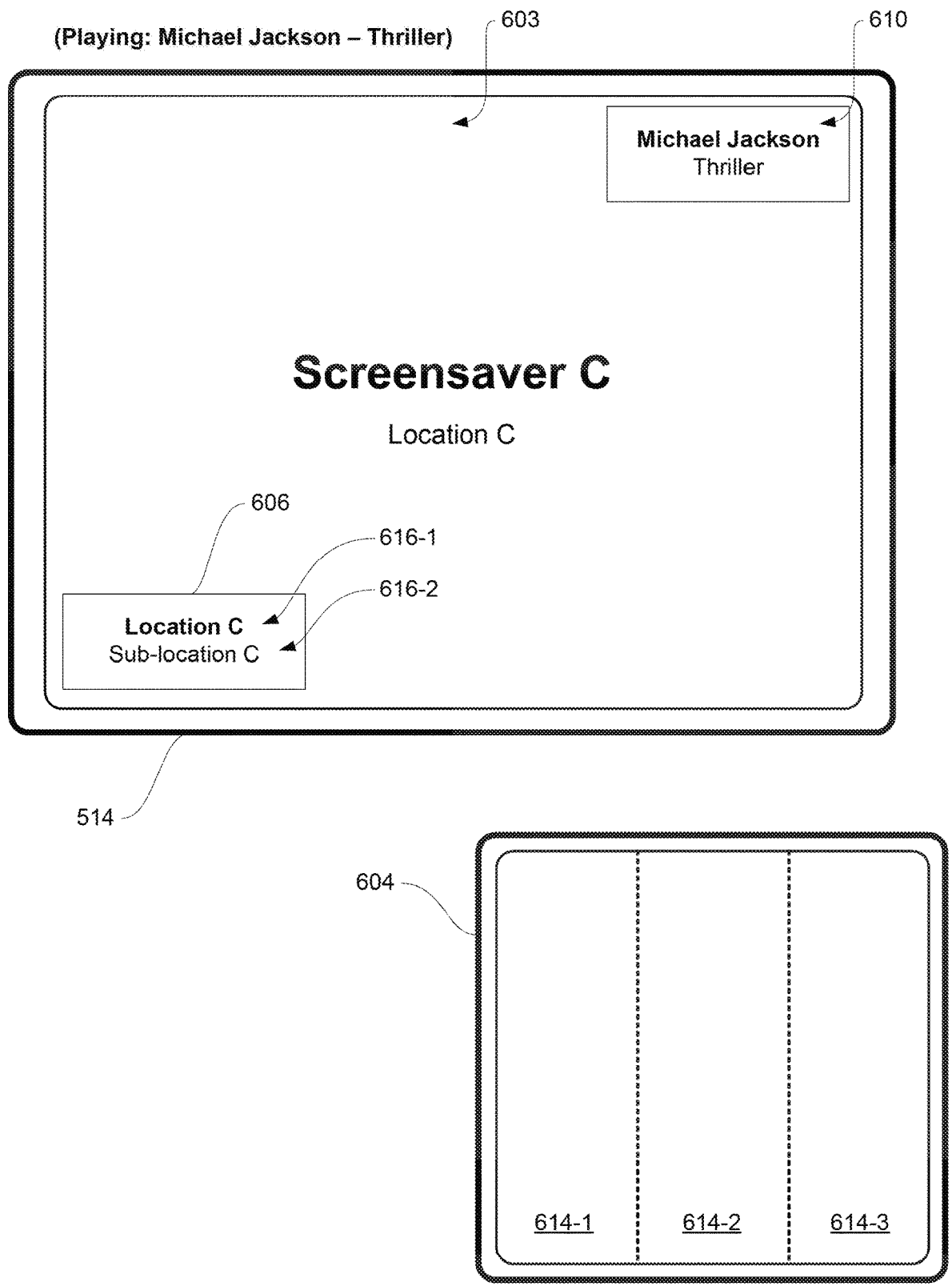

In FIG. 6R, the electronic device is displaying screensaver interface 603 with screensaver C currently displayed. Screensaver interface 603 includes music HUD 610 (e.g., music HUD 610 has not faded away yet) indicating that the electronic device is playing Thriller by Michael Jackson. While music HUD 610 is displayed, a tap of contact 608 is detected on touch-sensitive surface 604, corresponding to a request to view location information. As illustrated in FIG. 6S, the device 500 displays location label 606 as a result of detecting the tap input. As described previously, location label 606 is displayed overlaid on top of the screensaver and includes a primary label 616-1 and secondary label 616-2, corresponding to the primary and secondary locations depicted by the screensaver. In FIG. 6S, location label 606 displays location C and sub-location C, reflecting the location displayed by screensaver C when the location label is displayed. Thus, both music HUD 610 and location label 606 are concurrently displayed on screensaver interface 603. Although both music HUD 610 and location label 606 are concurrently displayed, each overlay optionally maintains its own fade-out timer. In other words, the duration for displaying music HUD 610 is optionally unaffected by the display of location label 606 and vice versa (e.g., the duration of display and/or the time of fade-out for the music HUD 610 and the location label 606 are optionally independent of one another).

Figure 6T:
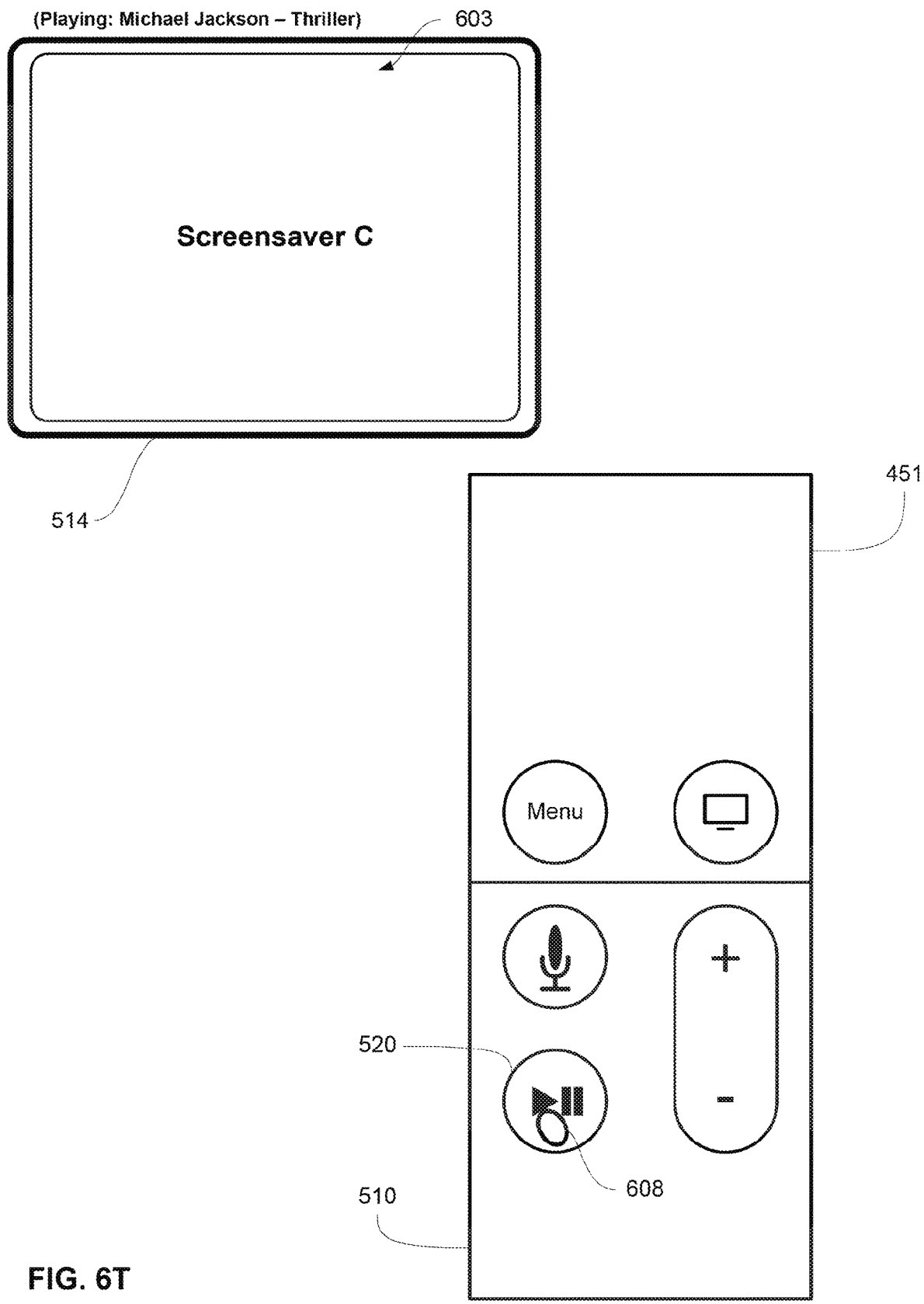
Figure 6U:
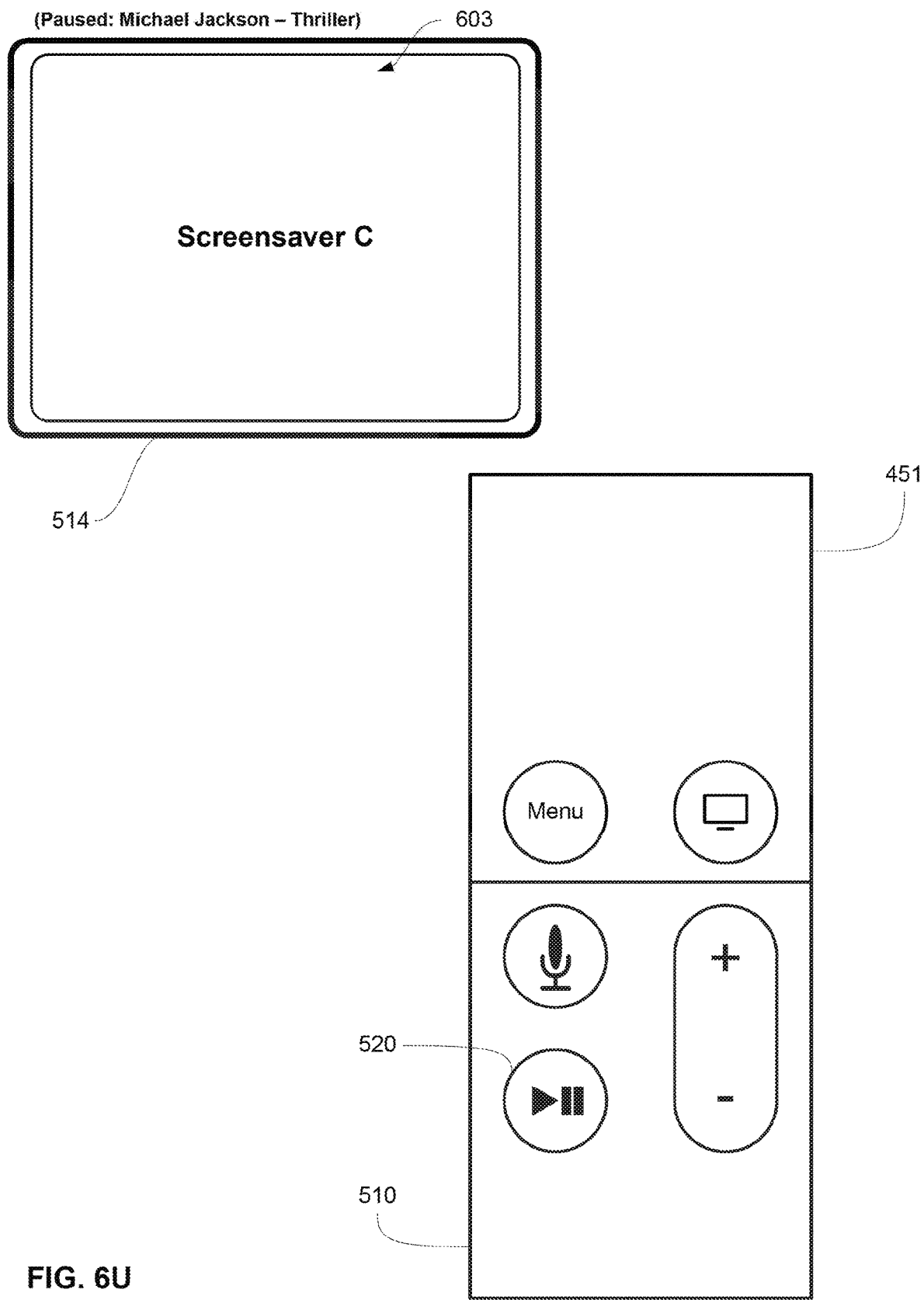
Figure 6V:
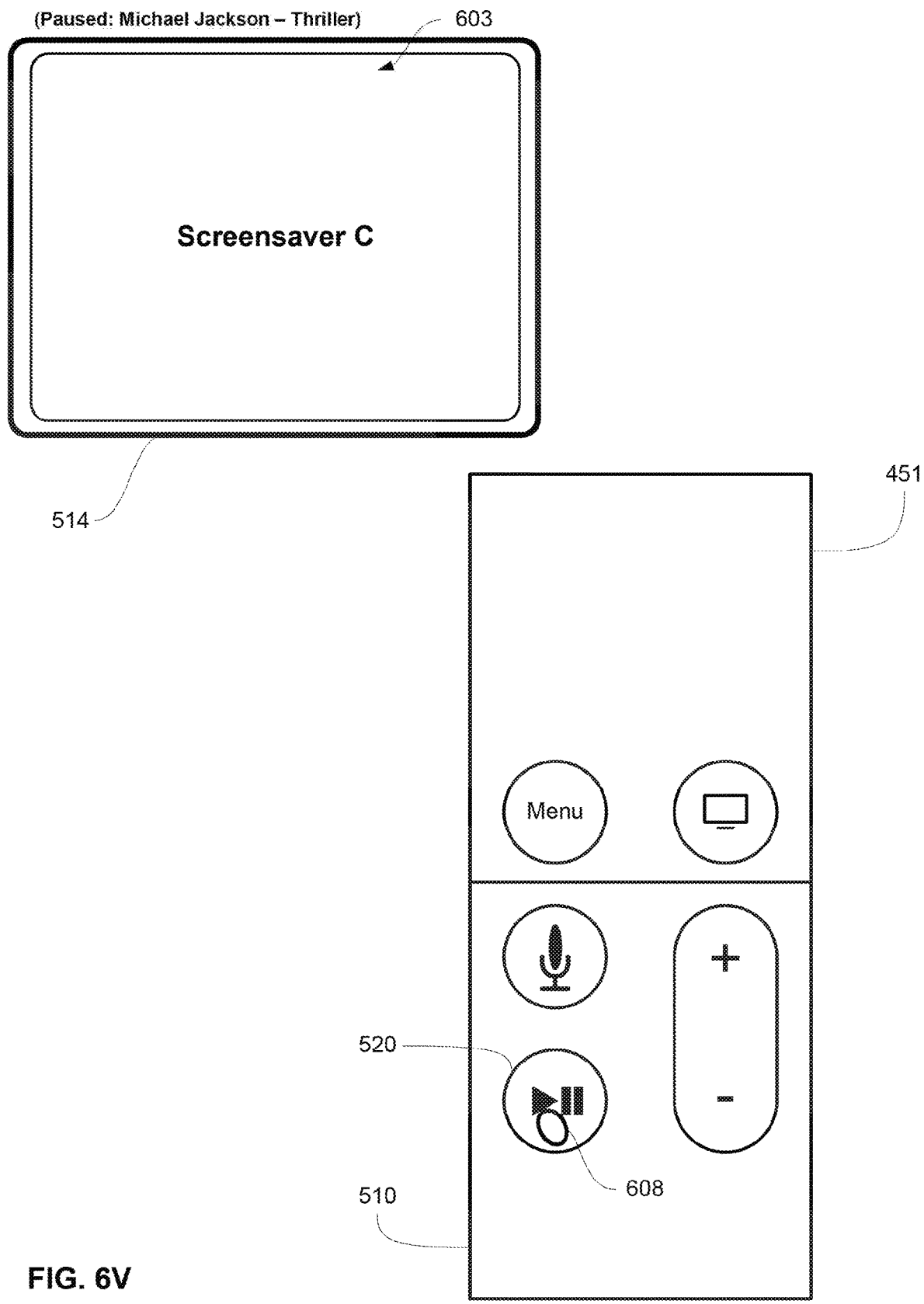
Figure 6W:
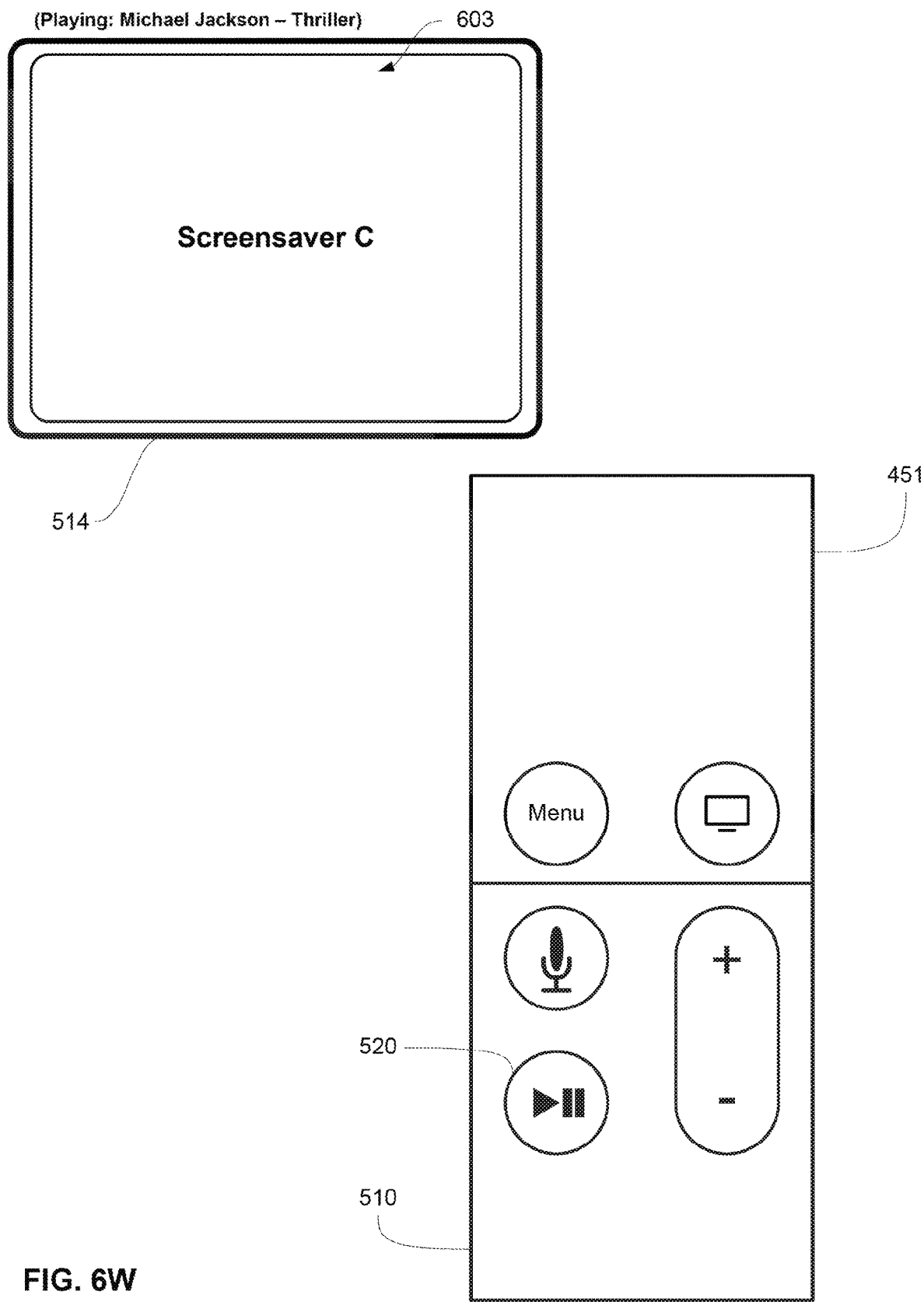
Figure 6X:
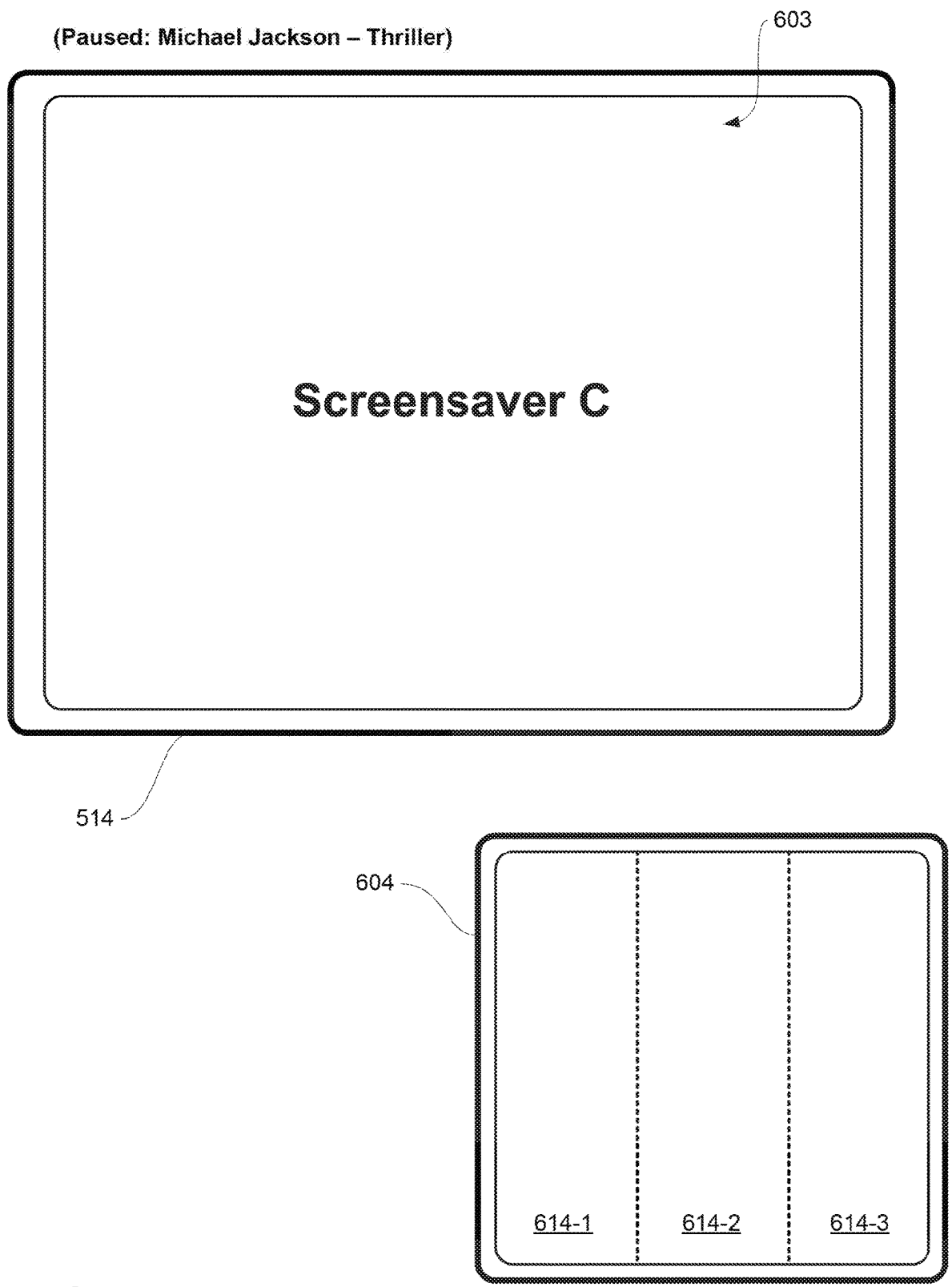
Figure 6Y:
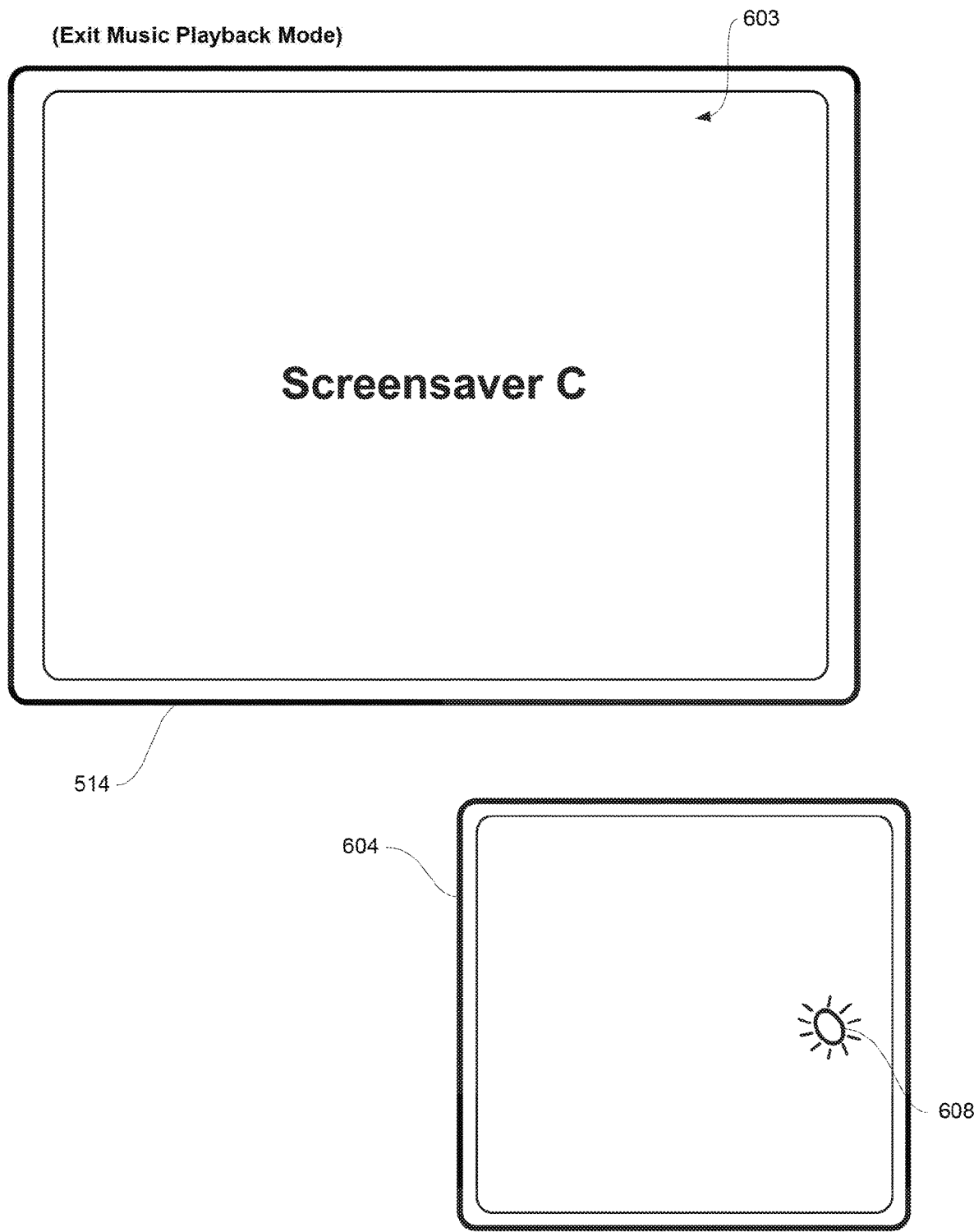
Figure 6Z:
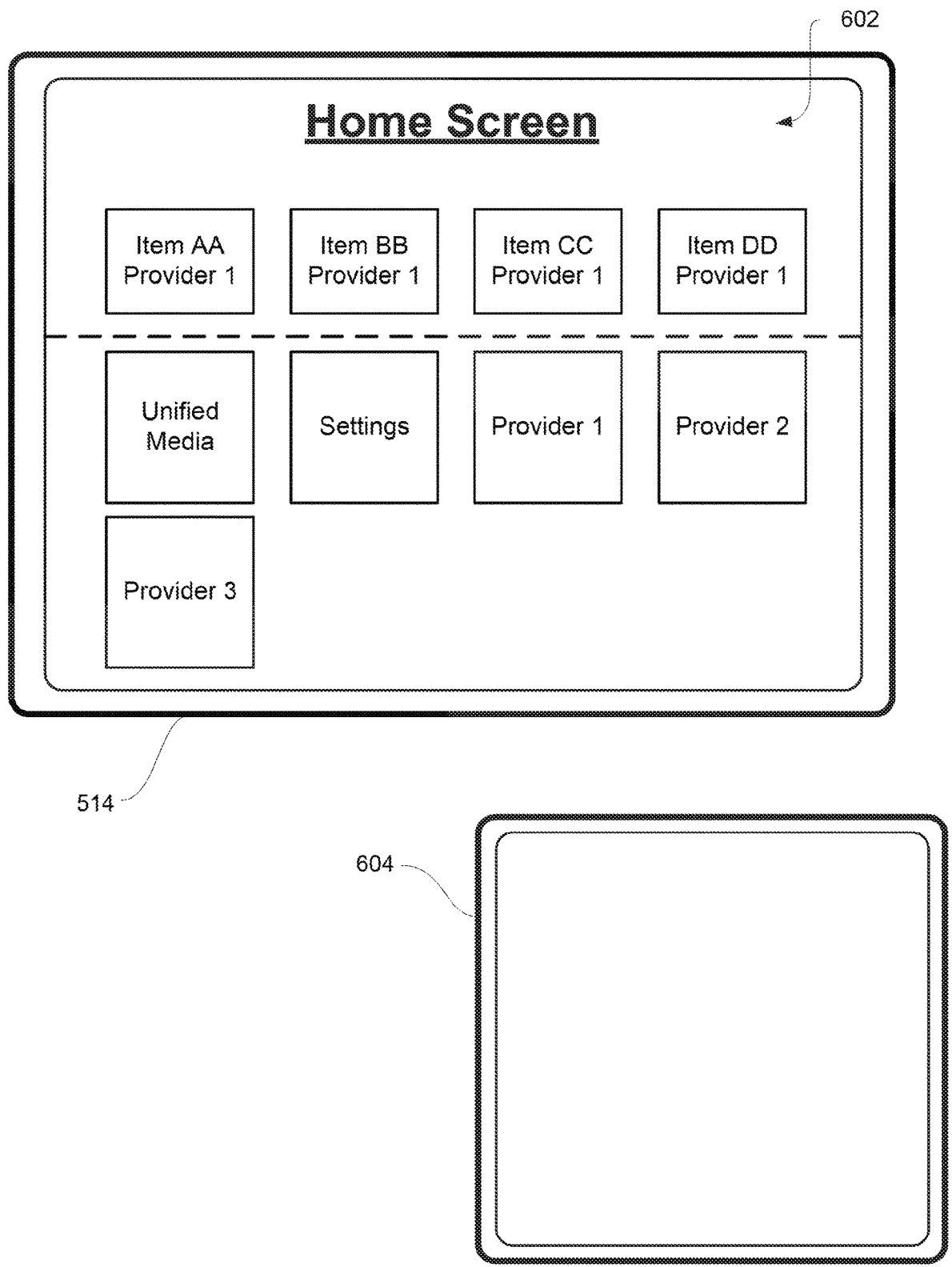
Figure 6A:
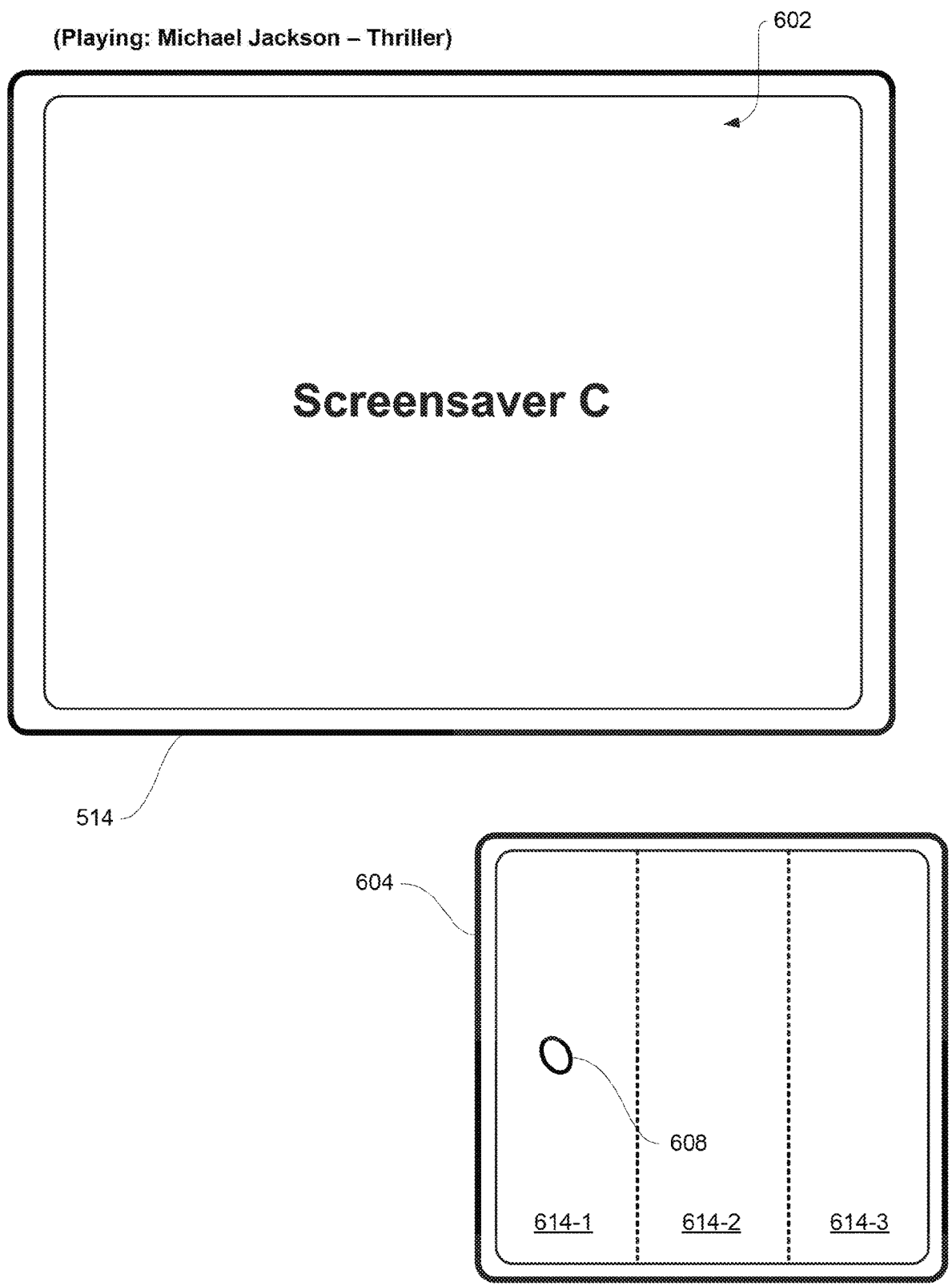
Figure 6B:
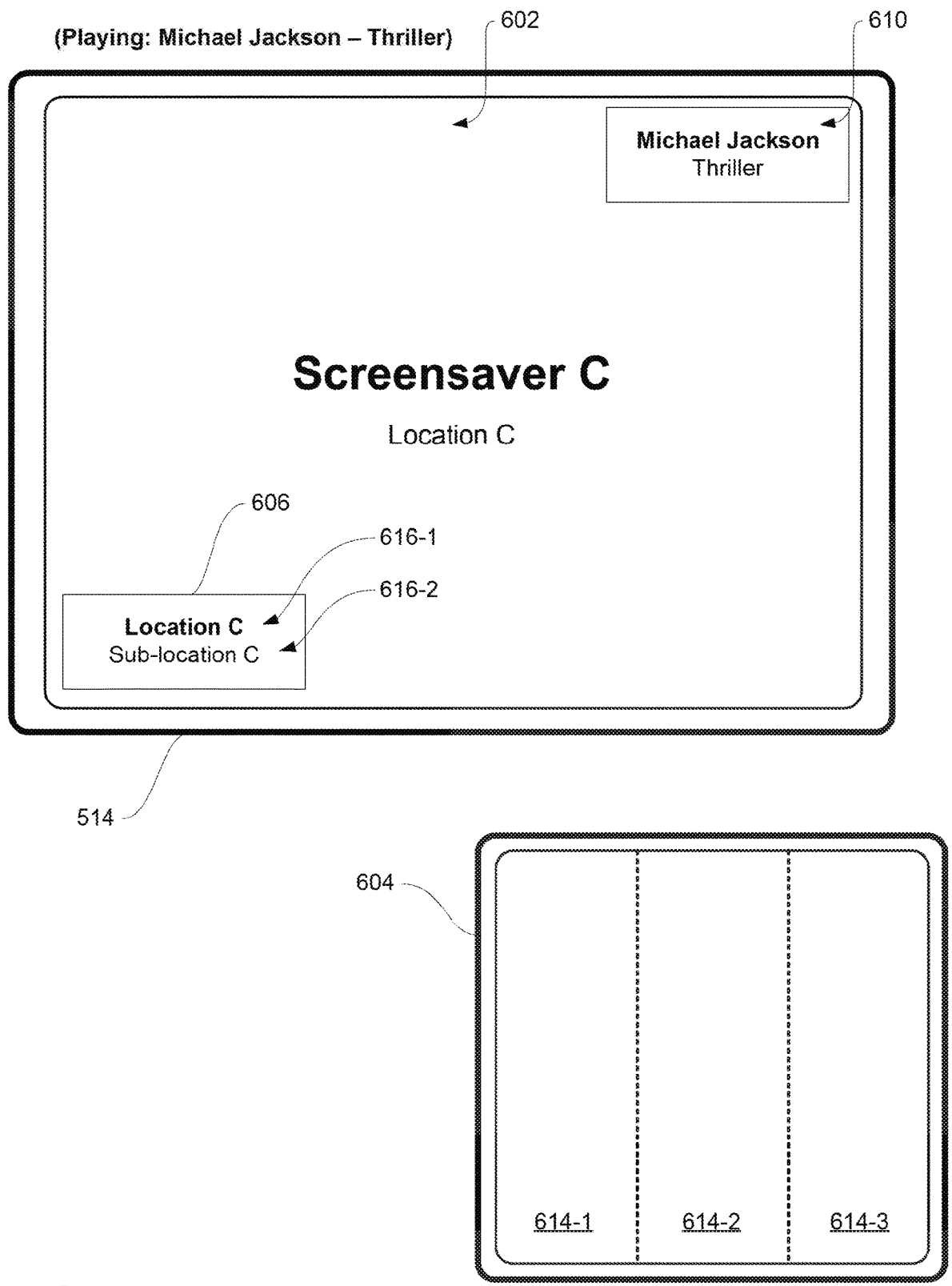
Figure 6C:
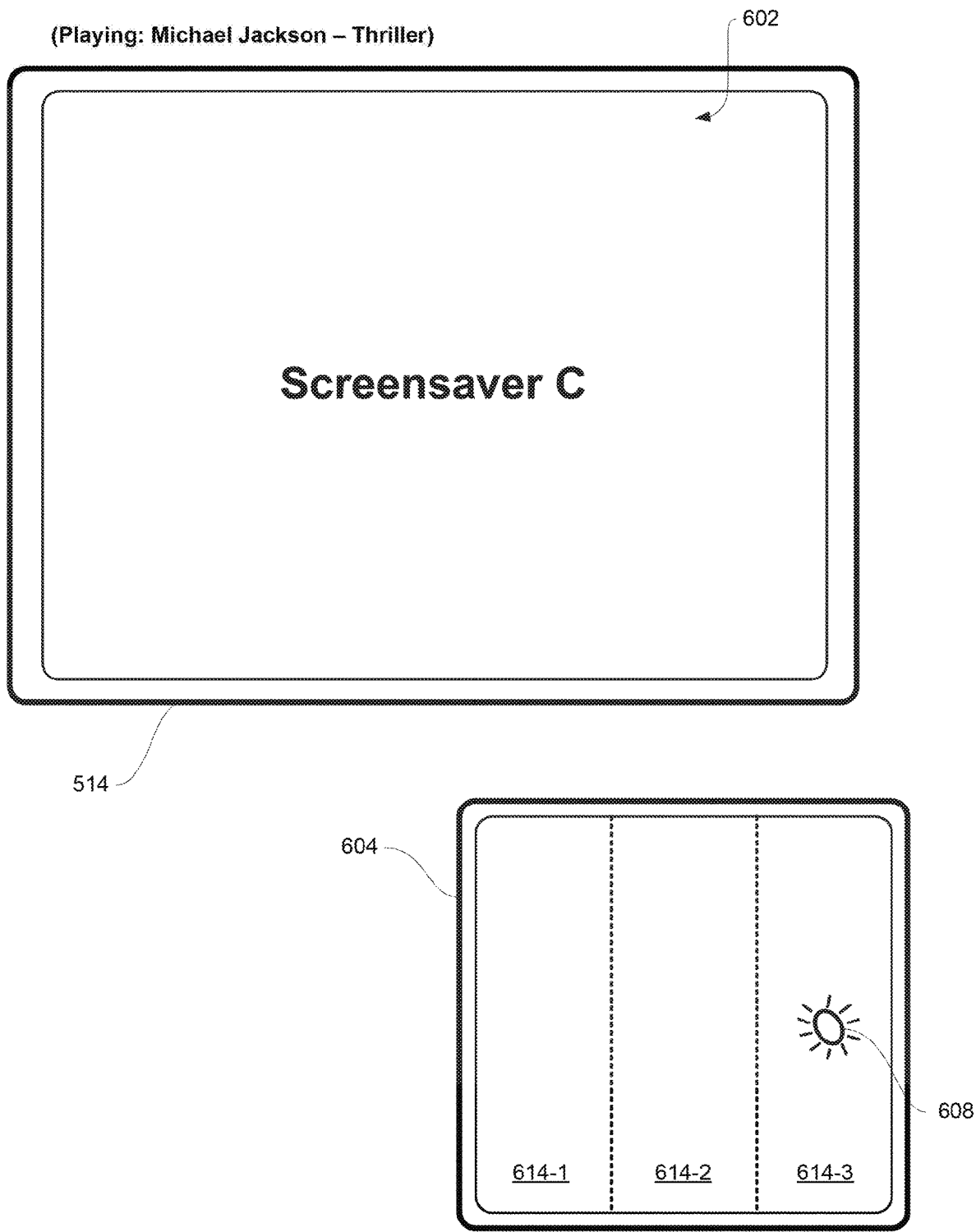
Figure 6D:
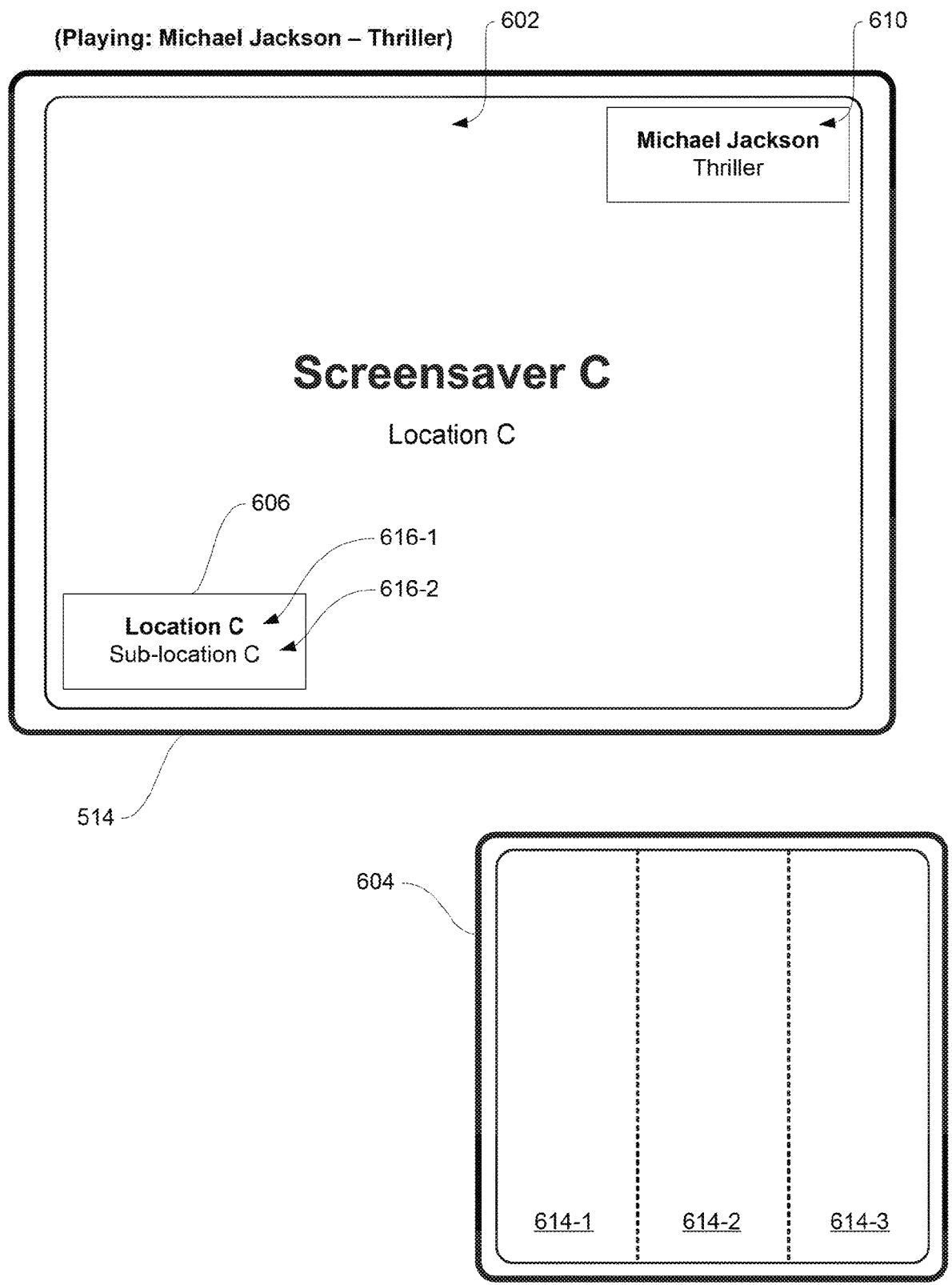

In FIG. 6T, a click input is detected on the play/pause button 520 of remote control 510 while device 500 is displaying screensaver C and playing Michael Jackson's Thriller. As a result of detecting the click input, device 500 pauses playback of the song, as illustrated in 6U. In some embodiments, playback of Thriller is resumable if a click input is detected on the play/pause button 520 of remote control 510 within a threshold time (e.g., 3, 5 or 10 seconds) of pausing Thriller. For example, FIG. 6V illustrates device 500 detecting another click input on the play/pause button 520 of remote control 510 while the device currently has paused playback of Michael Jackson's Thriller. In some embodiments, if playback of the song has not been paused for longer than the certain threshold amount of time, then device 500 will resume playback of the song, as illustrated in FIG. 6W. In some embodiments, if playback of the song has been paused for longer than the threshold amount of time, then device 500 will exit music playback mode. In other words, device 500 has turned off music playback functionality and no longer responds to music control commands. As illustrated by FIGS. 6X-6Z, when device 500 exits music playback mode, the touch-sensitive surface 604 is no longer partitioned into three regions, 614-1 to 614-3.

Thus, any click input detected on the touch-sensitive surface 604 will optionally no longer control music playback, and instead will optionally exit the screensaver and display the home screen.

For instance, in FIG. 6Y, playback of Michael Jackson's Thriller has been paused for longer than the threshold duration and device 500 has exited music playback mode and the touch-sensitive surface 604 is no longer partitioned. Device 500 then detects a click input on the right region of the touch-sensitive surface 604 (e.g., where region 614-3 is located when the device is in music playback mode). However, because device 500 is no longer in music playback mode and touch-sensitive surface 604 is no longer partitioned, the click input no longer performs any music playback functions (e.g., device 500 does not play the next song in the playlist). Instead, the device will exit the screensaver as a result of the click input and display the home screen interface 602, as shown in FIG. 6Z.

In some embodiments, the music HUD and the location label exist on the same display layer. Thus, the display 514 optionally displays both the music HUD and the location label concurrently at all times. In other words, in some embodiments, input detected for displaying the location label (e.g., in any of the manners described previously) causes display of both the location label and the music HUD, and input detected for displaying the music HUD (e.g., in any of the manners described previously) also causes display of both the location label and the music HUD. Similarly, the fade-out times for the music HUD and the location label are optionally the same such that both overlays fade out at the same time.

For example, in FIG. 6AA, device 500 is displaying screensaver C while playing Michael Jackson's Thriller and the touch-sensitive surface 604 is partitioned into three regions, 614-1 to 614-3. In FIG. 6AA, a tap of contact 608 is detected in the left region 614-1 of touch-sensitive surface 604 indicating the user's request to view the location label (as described earlier with respect to FIGS. 6I-6J). As a result, device 500 displays location label 606 and music HUD 610 at the same time, both overlaid over the screensaver, as shown in FIG. 6BB. After displaying location label 606 and music HUD 610 for a duration of time, both overlays fade away at the same time and are no longer displayed, such as shown in FIG. 6CC.

FIGS. 6CC-6DD illustrates another exemplary embodiment of displaying the music HUD 610 and location label 606 in the same layer. In FIG. 6CC, a click on the right region 614-3 of the touch-sensitive surface 604 is detected while screensaver C is displayed on display 514 and device 500 is playing Michael Jackson's Thriller. As a result of detecting the click (e.g., indicating the user's request to play the next song, as described earlier with respect to FIGS. 6L-6M), device 500 plays the next song in the playlist, Green Day's Longview, and displays music HUD 610, as shown in FIG. 6DD. In FIG. 6DD, because the music HUD 610 and location label are in the same layer, location label 606 is displayed concurrently with music HUD 610. After displaying location label 606 and music HUD 610 for a duration of time, both overlays fade away at the same time and are no longer displayed.

Figure 7A:
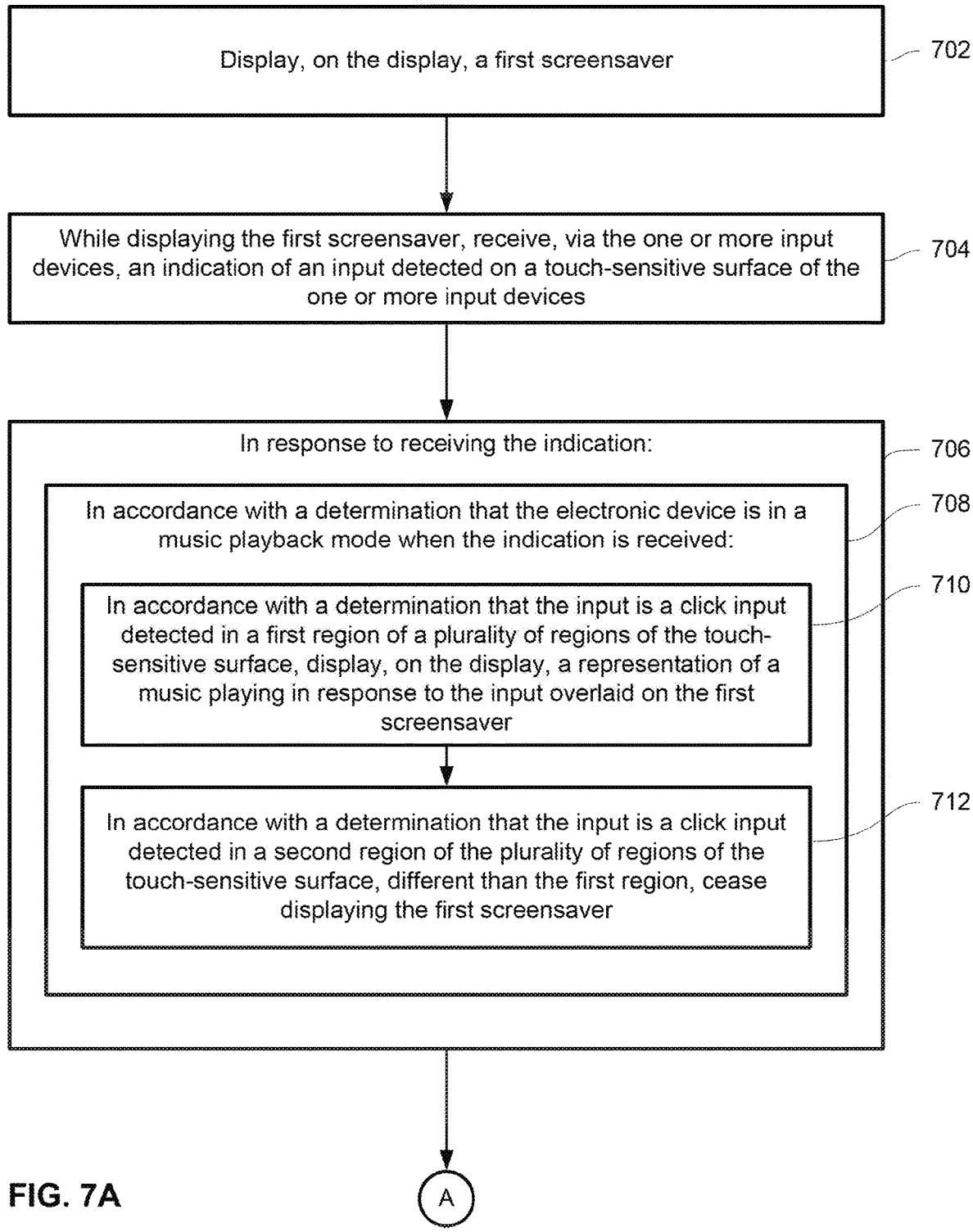
FIGS. 7A-7Q are flow diagrams illustrating a method of facilitating music playback and screensaver control while displaying screensavers in accordance with some embodiments of the disclosure.
Figure 7B:
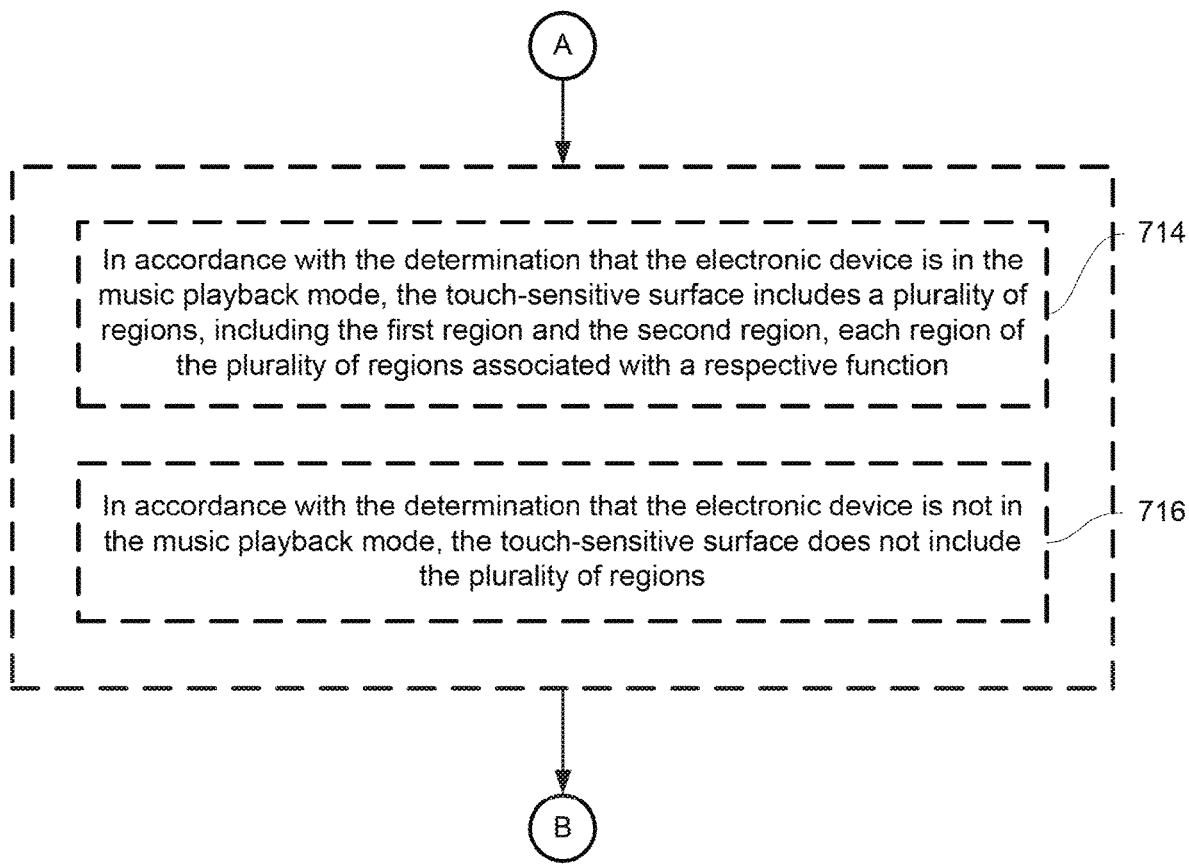
Figure 7C:
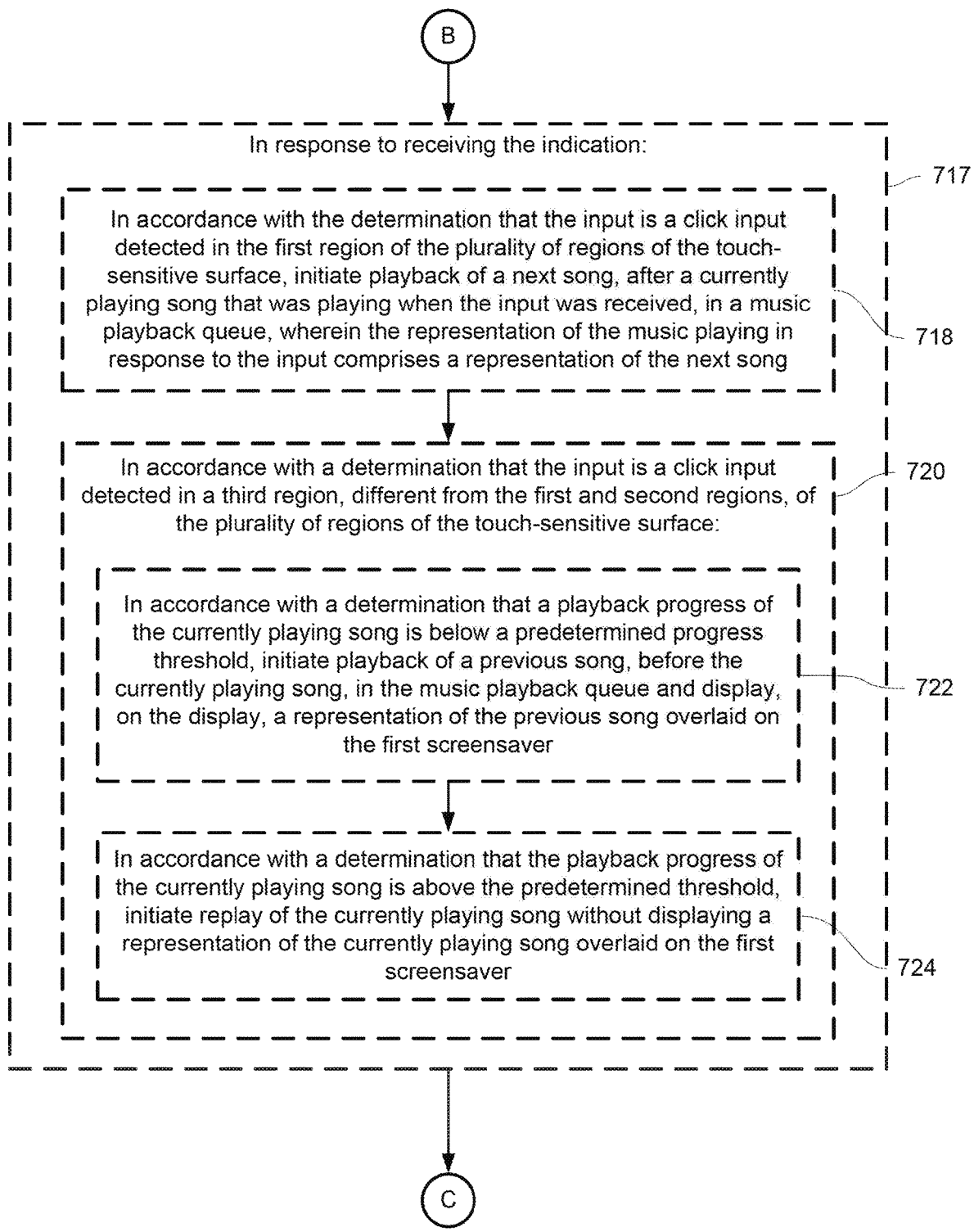
Figure 7D:
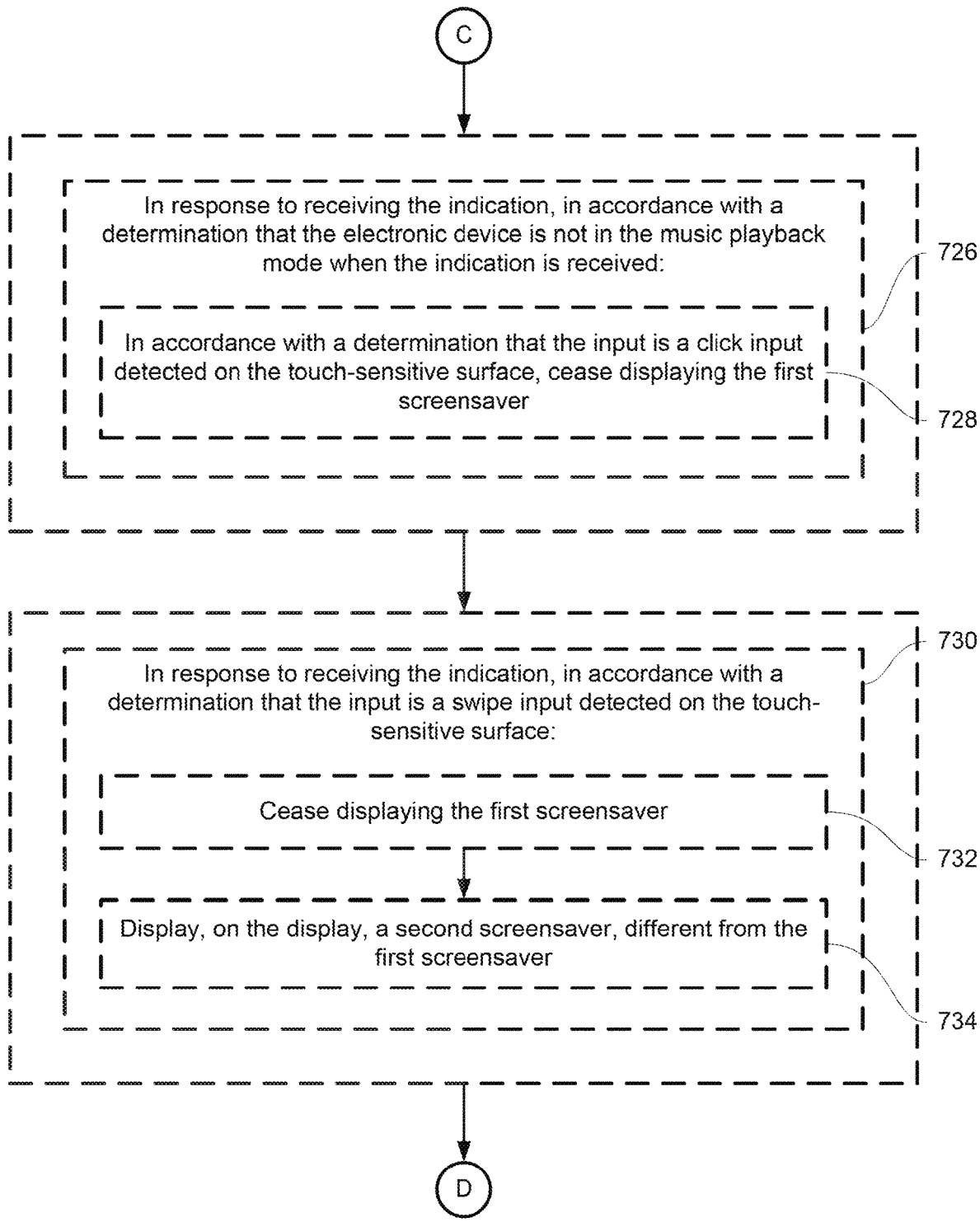
Figure 7E:
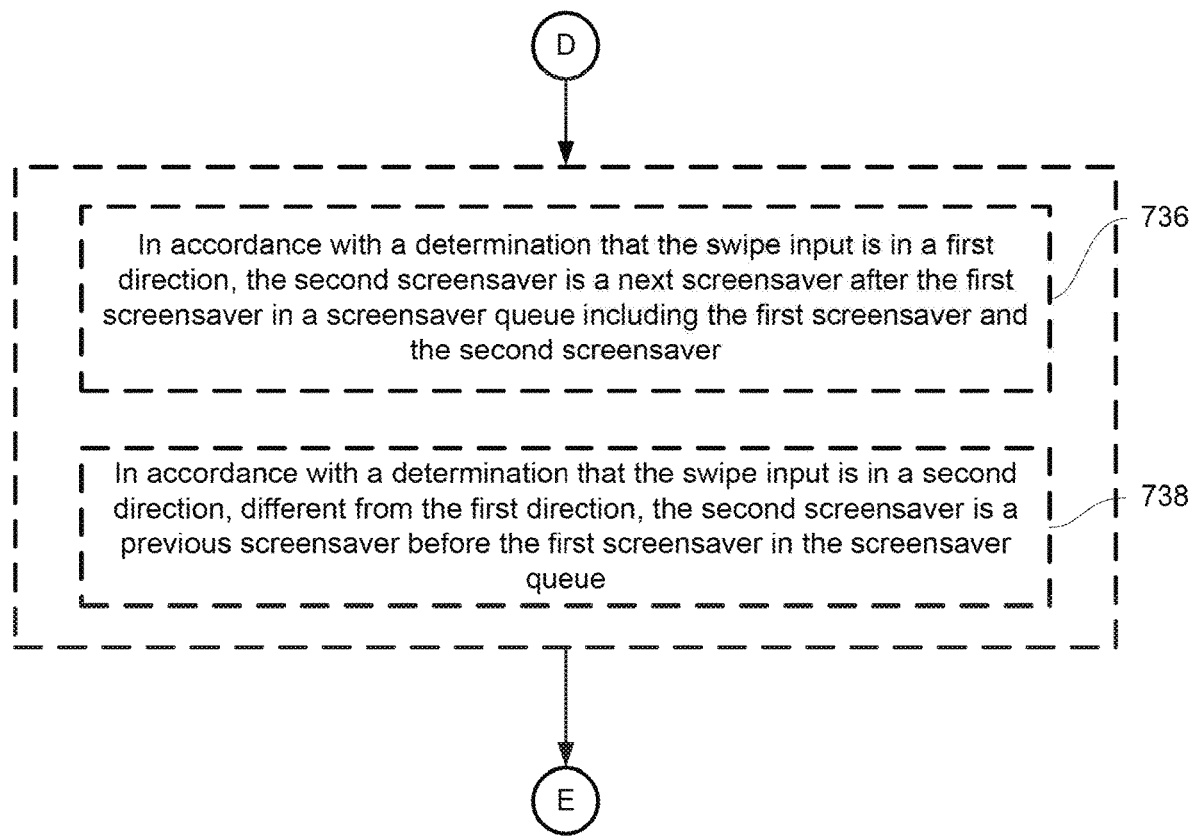
Figure 7F:
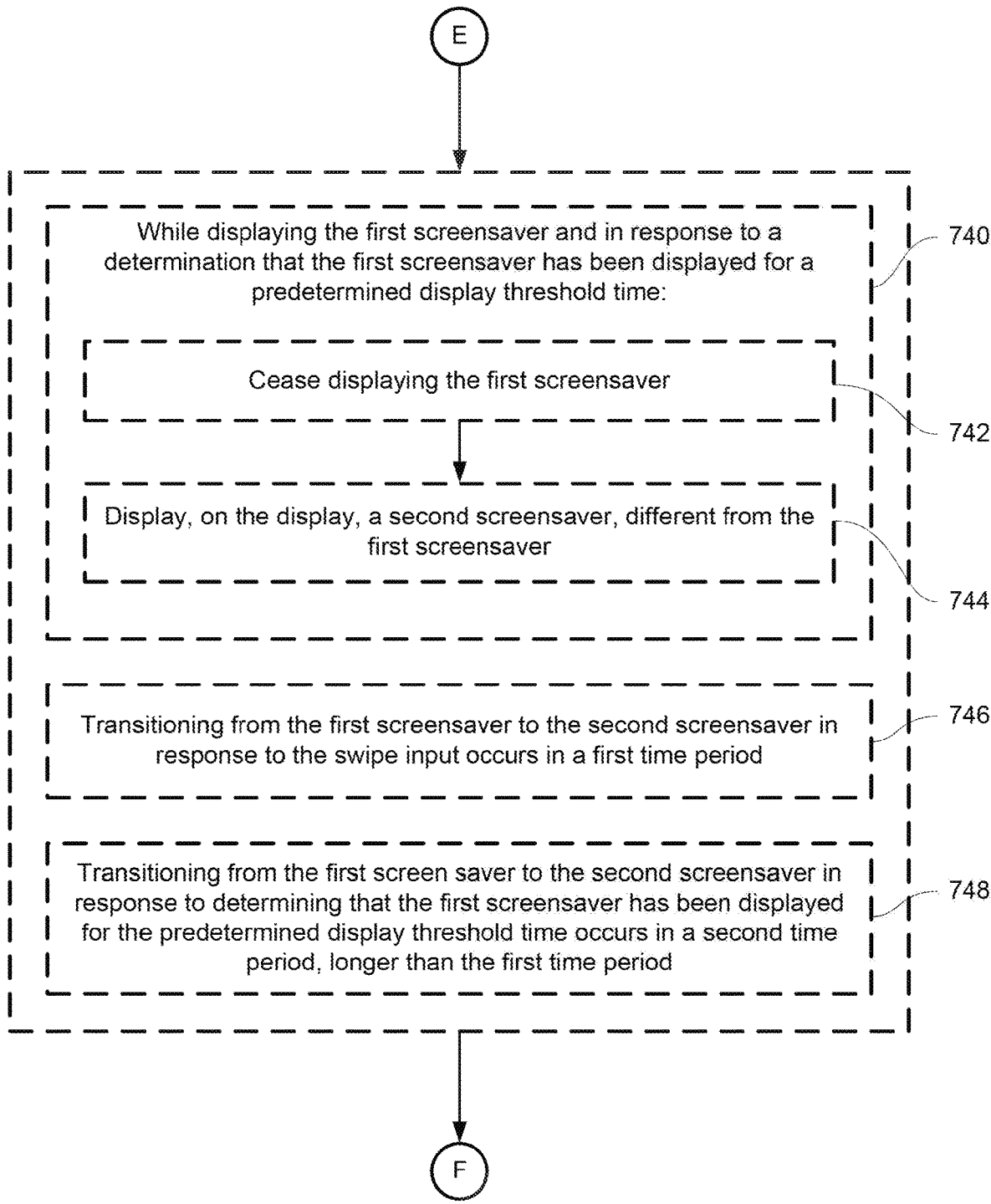
Figure 7G:
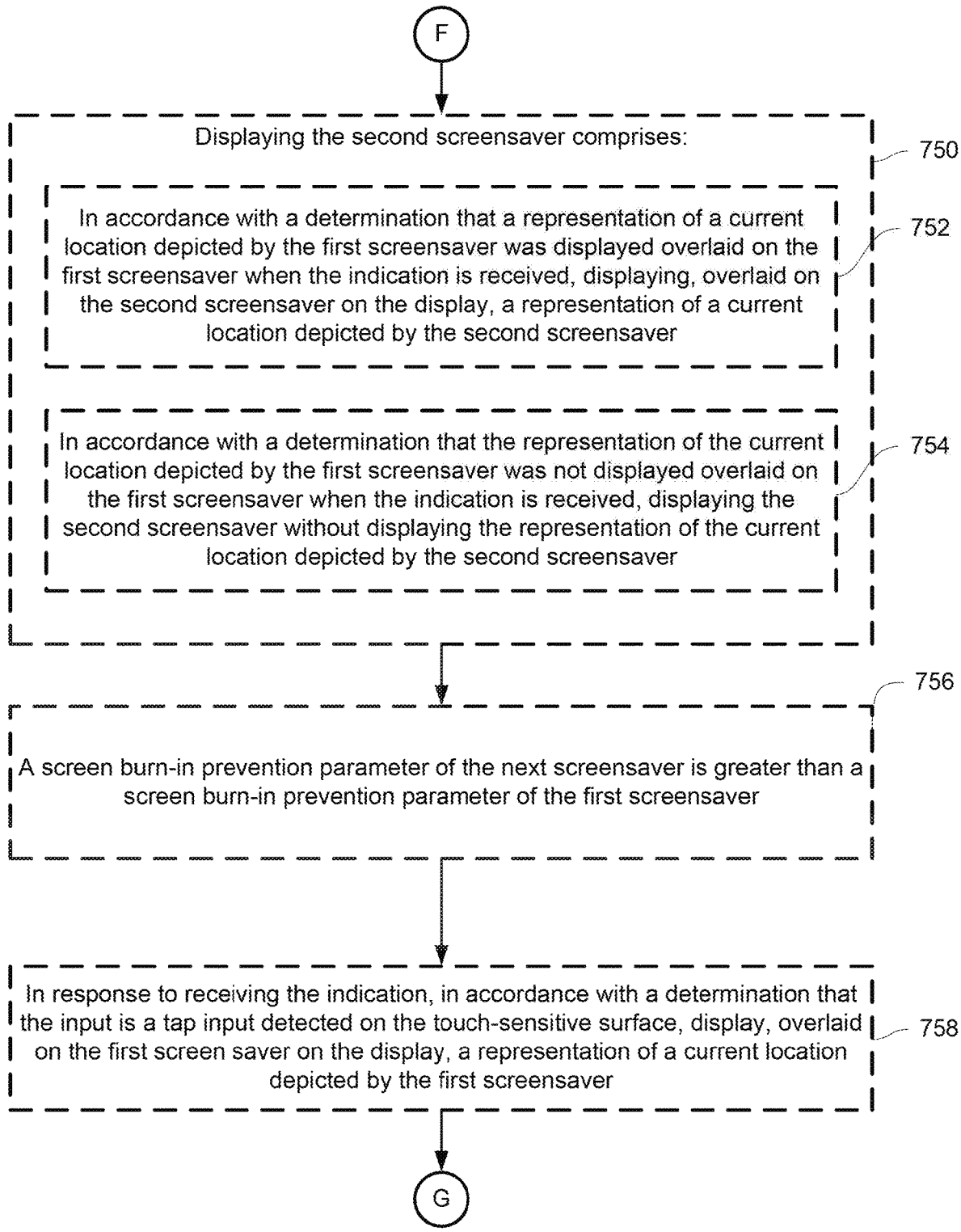
Figure 7H:
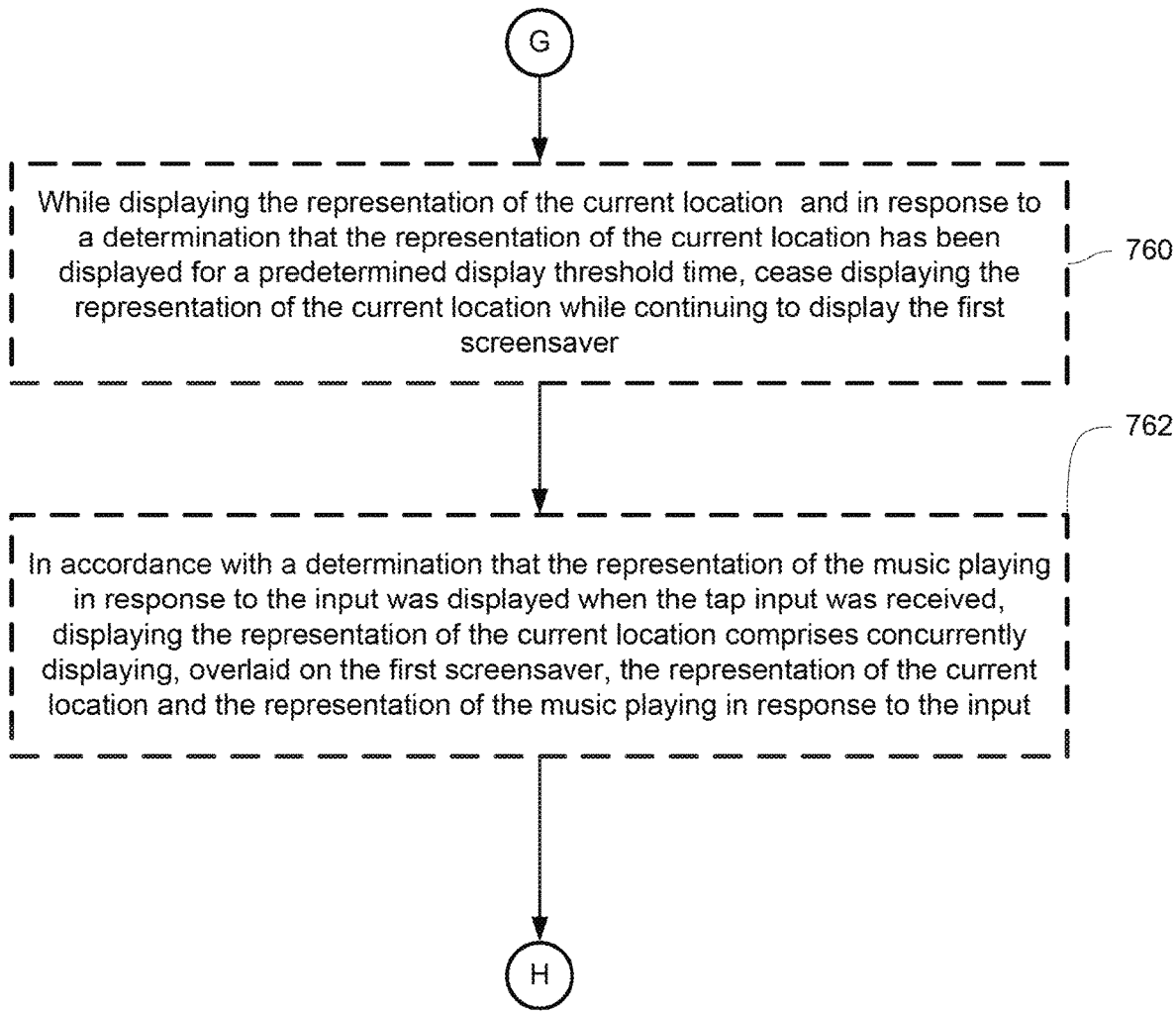
Figure 7I:
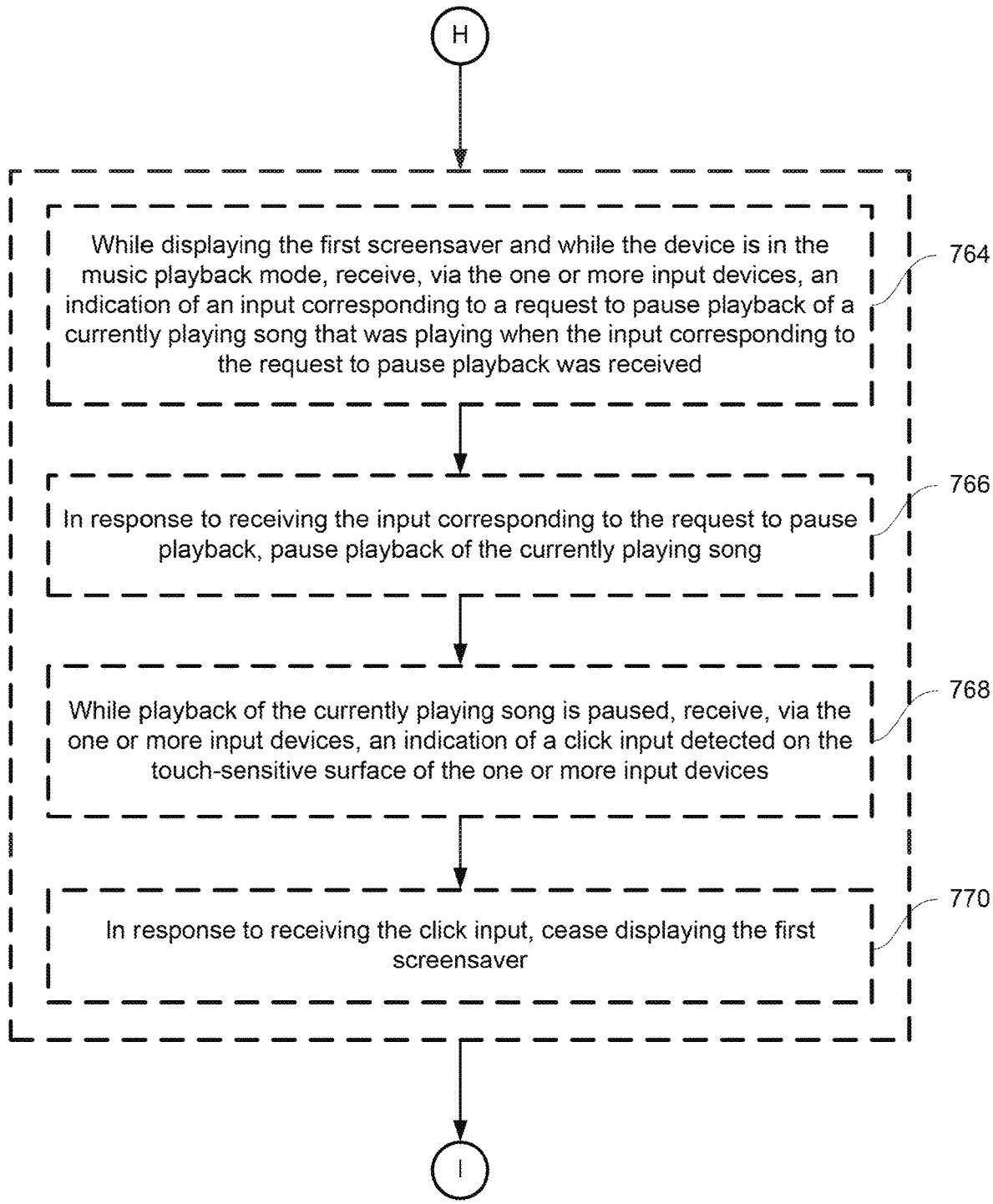
Figure 7J:
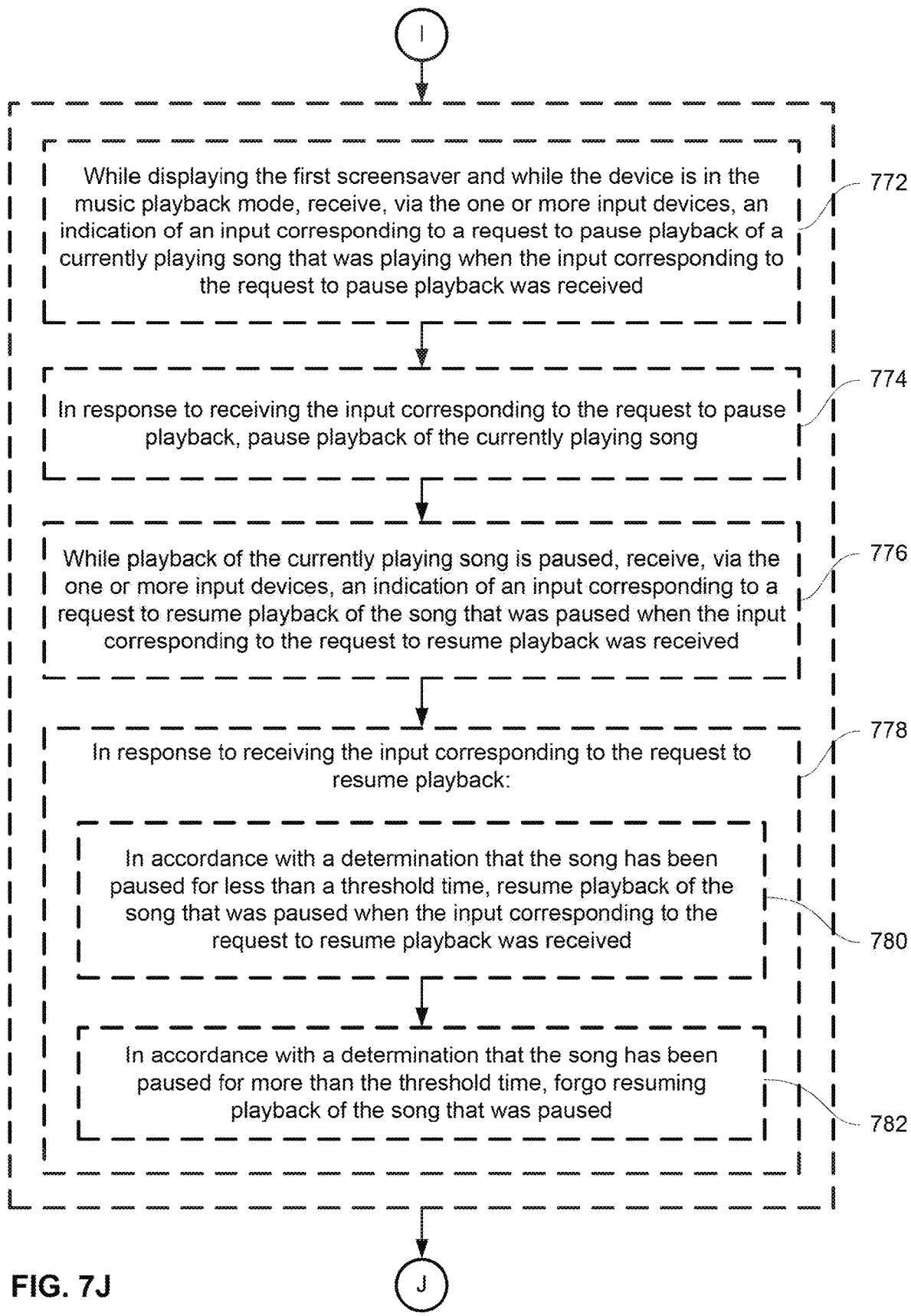
Figure 7K:
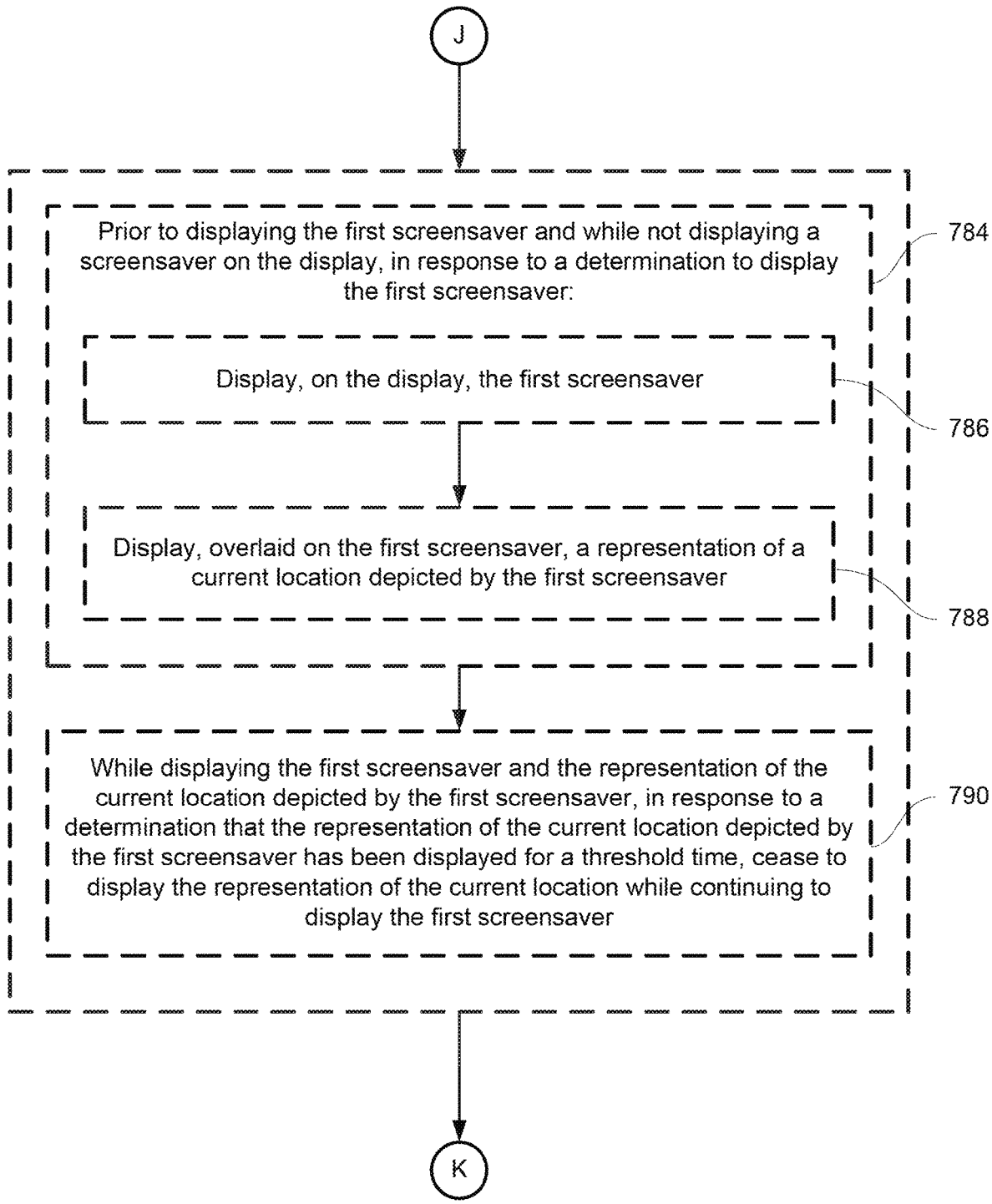
Figure 7L:
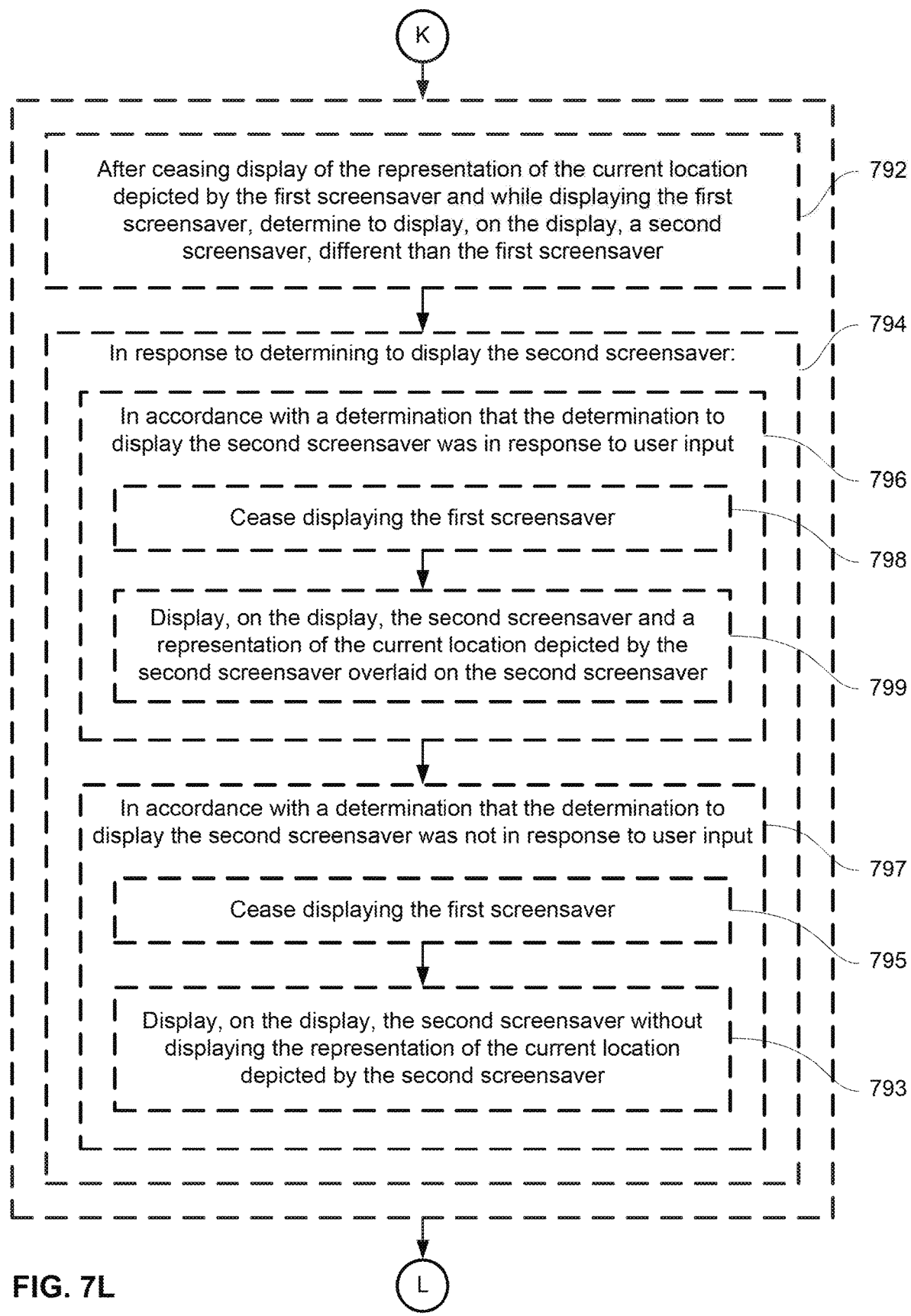
Figure 7M:
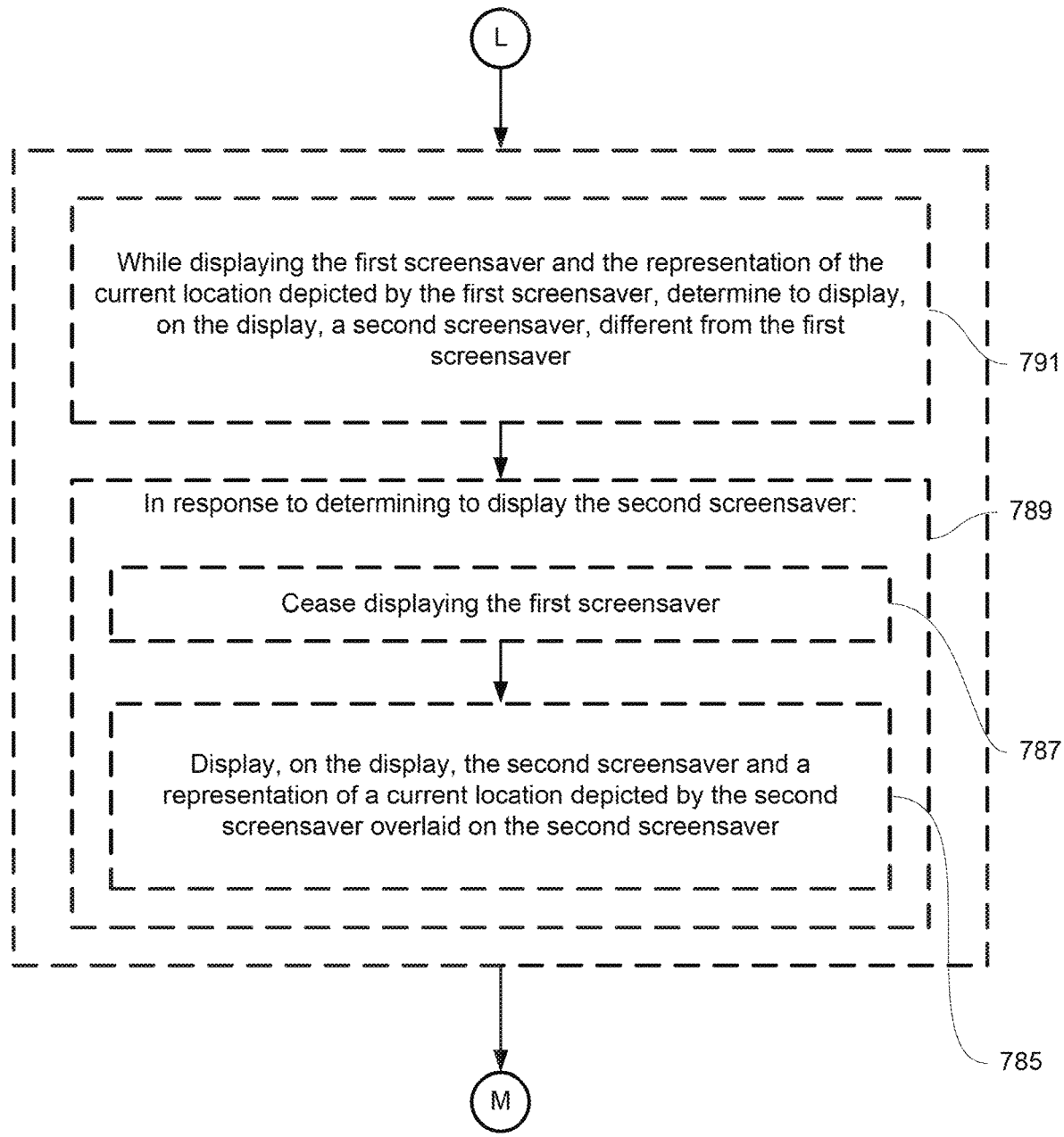
Figure 7N:
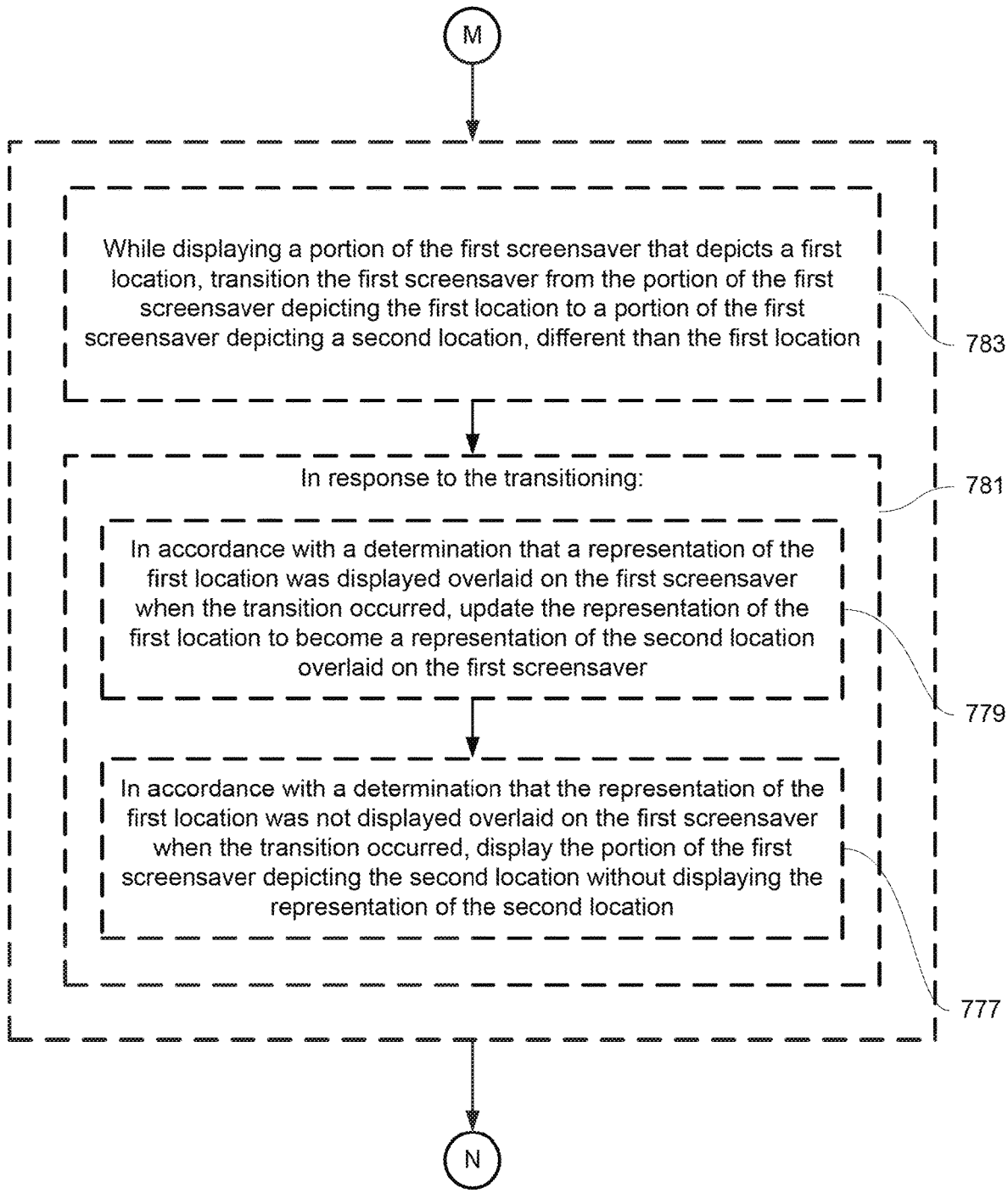
Figure 7O:
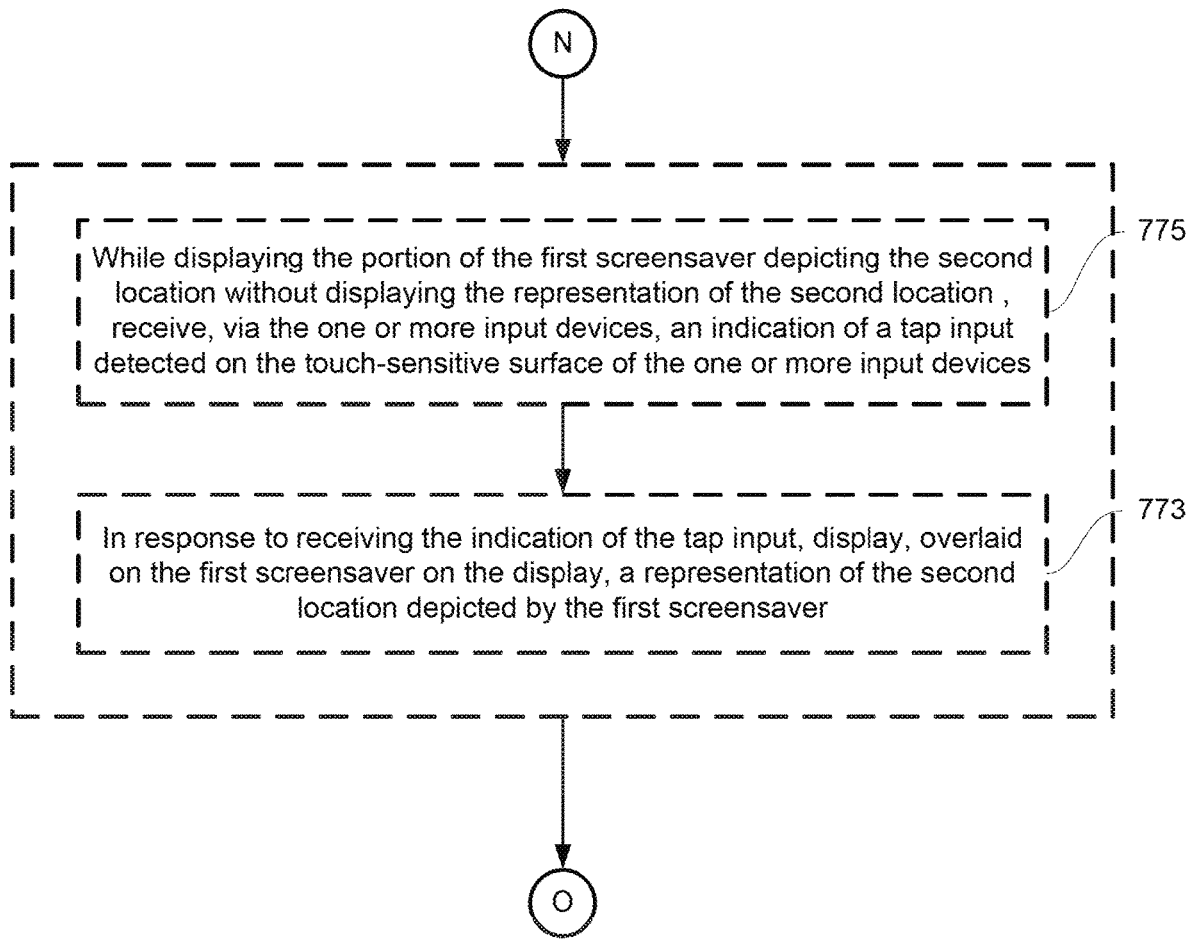
Figure 7P:
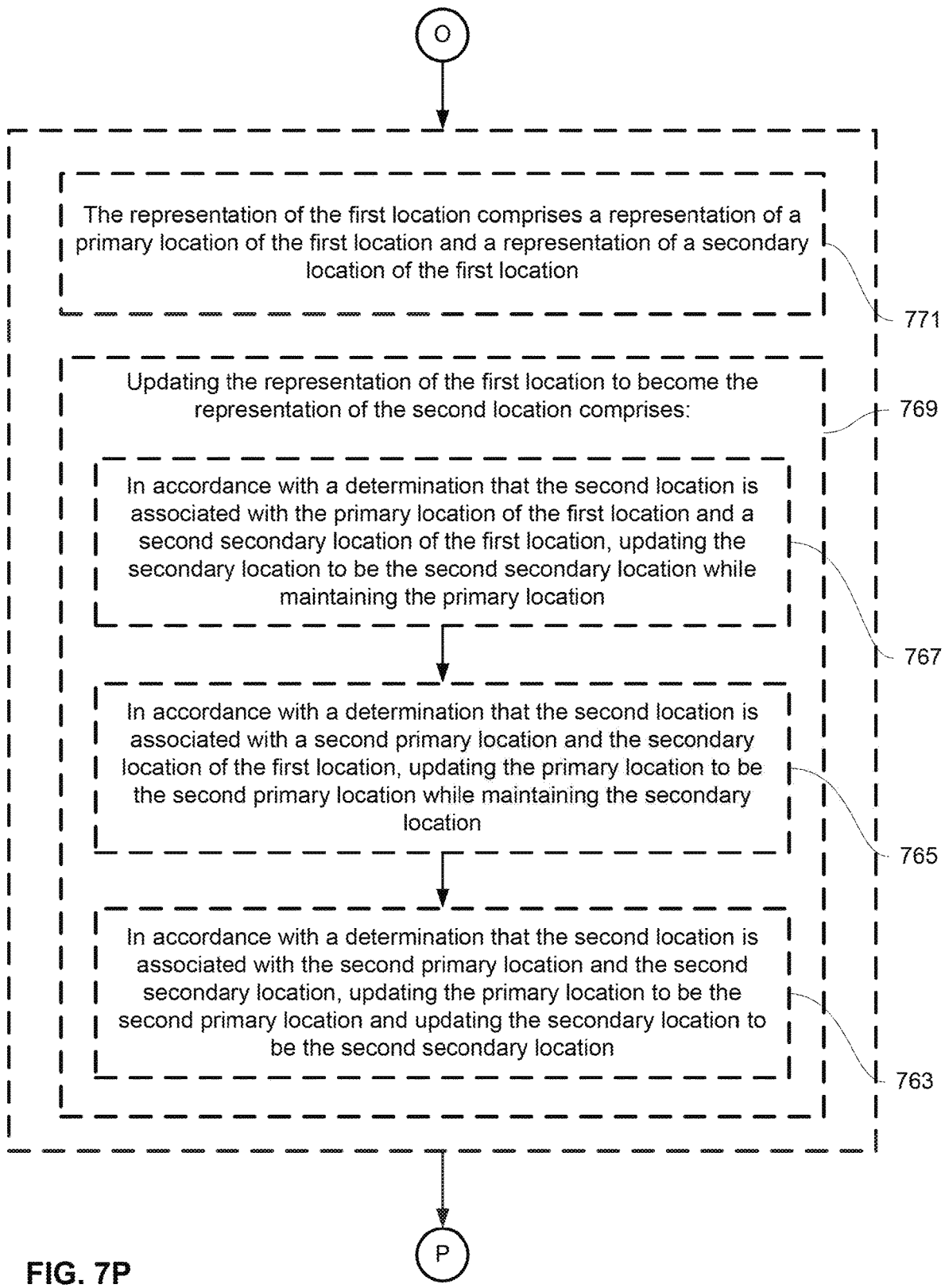
Figure 7Q:
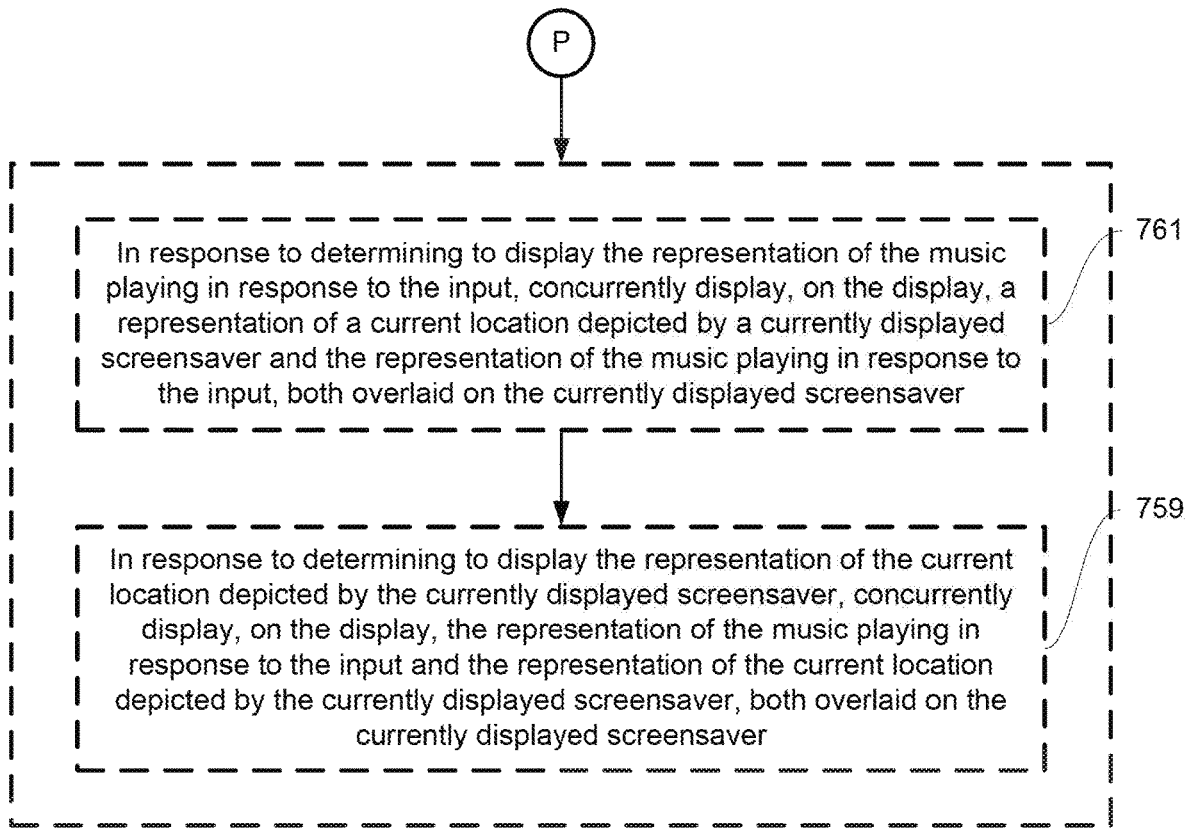

FIGS. 7A-7Q are flow diagrams illustrating a method 700 of facilitating music playback and screensaver control while displaying screensavers in accordance with some embodiments of the disclosure. The method 700 is optionally performed at an electronic device such as device 100, device 300 or device 500 as described above with reference to FIGS. 1A-1B, 2-3 and 5A-5B. Some operations in method 700 are, optionally, combined and/or the order of some operations is, optionally, changed.

As described below, the method 700 provides ways of facilitating music playback and screensaver control while displaying screensavers. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., a set top box, such as device 100, device 300, or device 500) in communication with a display (e.g., a television, such as display 514) and one or more input devices (e.g., a remote control device, separate from the electronic device, such as remote 510, or a smartphone, separate from the electronic device, such as device 511) displays (702), on the display, a first screensaver, such as in FIG. 6B. In some embodiments, the electronic device is a tablet computer, a smartphone, a wearable device, etc., and the display and/or input devices are a touch screen included in those devices. In some embodiments, while displaying the first screensaver, the electronic device receives (704), via the one or more input devices, an indication of an input detected on a touch-sensitive surface of the one or more input devices, such as in FIG. 6G (e.g., a tap, a swipe, a click, a multi-touch input, or any other suitable input or gesture on the touch-sensitive surface).

In some embodiments, in response to receiving the indication (706), in accordance with a determination (708) that the electronic device is in a music playback mode when the indication is received (e.g., while the device is playing music and displaying the screensaver, or while the device is displaying the screensaver and music is paused but a threshold amount of time has not passed such that the device exits music playback mode), in accordance with a determination that the input is a click input detected in a first region of a plurality of regions of the touch-sensitive surface, the electronic device displays (710), on the display, a representation of a music playing in response to the input overlaid on the first screensaver, such as in FIGS. 6L-6M (e.g., display the music HUD). In some embodiments, the music HUD includes the artist name, the song title, the album title, an image of the artist, album artwork, covert art, any other suitable image, or any combination. In some embodiments, the currently playing music is the song that was playing when the click input was received. In some embodiments, the currently playing music is a different song than the song that was playing when the click input was received. For example, upon receipt of a right click, the device optionally begins playback of the next song to the song that was playing when the click input was received and the music HUD will display information about the next song. Upon receipt of a left click, if the playback progress of the song that was playing when the click was received is below a threshold, the device optionally begins playback of the previous song to the song that was playing when the click was received and the music HUD will display information about the previous song. If the playback progress of the song that was playing when the left click was received is above a threshold, the device optionally replays the song that was playing when the click was received, in some embodiments without displaying the music HUD.

In some embodiments, in response to receiving the indication (706), in accordance with a determination (708) that the electronic device is in a music playback mode when the indication is received (e.g., while the device is playing music and displaying the screensaver, or while the device is displaying the screensaver and music is paused but a threshold amount of time has not passed such that the device exits music playback mode), in accordance with a determination that the input is a click input detected in a second region of the plurality of regions of the touch-sensitive surface, different than the first region (e.g., a click in the middle region of the touch-sensitive surface), the electronic device ceases (712) displaying the first screensaver, such as in FIGS. 6N-6O (e.g., exit the screensaver and display the home screen of the electronic device).

The above-described manner of performing different actions based on the region of the touch-sensitive surface in which the input was received (e.g., displaying information about the currently playing song on a click on a first region, or ceasing displaying of the screensaver on a click on a second region) allows the electronic device to provide the user with the ability to, using one touch surface, cause different actions based on the location of the input (e.g., without exiting the screensaver and navigating to a separate app or interface to perform the same action), which simplifies the interaction between the user and the device and enhances the operability of the device and makes the user-device interface more efficient (e.g., by performing different actions with fewer inputs and without exiting the screensaver), which additionally reduces power usage and improves battery life of the device by enabling the user to use the device more quickly and efficiently.

In some embodiments, in accordance with the determination that the electronic device is in the music playback mode (e.g., while the device is displaying the screensaver and playing music or while music is paused but a threshold amount of time has not passed such that the device exits music playback mode), the touch-sensitive surface includes a plurality of regions, including the first region and the second region, each region of the plurality of regions associated with a respective function (714), such as in FIG. 6L (e.g., when in music playback mode, the touch-sensitive surface is optionally partitioned into three regions). For example, the touch-sensitive surface is optionally partitioned into a left, a right, and a middle region, and a click in the right region will initiate playback of the next song, a click in the left region will initiate playback of the previous song or replay the current song, and a click in the middle region will exit the screensaver.

In some embodiments, in accordance with the determination that the electronic device is not in the music playback mode, the touch-sensitive surface does not include the plurality of regions (716), such as in FIG. 6B (e.g., when the device is not in music playback mode, the touch-sensitive surface is optionally not partitioned into regions such that a click detected on the touch-sensitive surface will result in the electronic device performing the same action regardless of where, on the touch-sensitive surface, the click was detected).

The above-described manner of partitioning the touch-sensitive surface into a plurality of regions, each associated with a respective function (e.g., partitioning the touch-sensitive surface into a left, right, and middle region, and a click in the right region will initiate playback of the next song, a click in the left region will initiate playback of the previous song or replay the current song, and a click in the middle region will exit the screensaver) allows the electronic device to provide the user with the ability to, using one touch surface, cause different actions based on the location of the input (e.g., without exiting the screensaver and navigating to a separate app or interface to perform the same action), which simplifies the interaction between the user and the device and enhances the operability of the device and makes the user-device interface more efficient (e.g., by performing different actions with fewer inputs and without exiting the screensaver), which additionally, reduces power usage and improves battery life of the device by enabling the user to use the device more quickly and efficiently.

In some embodiments, in response to receiving the indication (717), in accordance with the determination that the input is a click input detected in the first region of the plurality of regions of the touch-sensitive surface (e.g., a click in the right region of the touch sensitive surface), the electronic device initiates (718) playback of a next song, after a currently playing song that was playing when the input was received, in a music playback queue (e.g., skipping forward to a next song), wherein the representation of the music playing in response to the input comprises a representation of the next song, such as in FIGS. 6L-6M (e.g. the music HUD will display information related to the next song).

In some embodiments, in response to receiving the indication (717), in accordance with a determination (720) that the input is a click input detected in a third region, different from the first and second regions, of the plurality of regions of the touch-sensitive surface (e.g., a click in the left region of the touch sensitive surface), in accordance with a determination that a playback progress of the currently playing song is below a predetermined progress threshold (e.g. the currently playing song has been playing for less than 0.5 seconds, 1 second, 3 seconds, or 5 seconds), the electronic device initiates (722) playback of a previous song, before the currently playing song, in the music playback queue (e.g., skipping back to a previous song) and displays, on the display, a representation of the previous song overlaid on the first screensaver, such as in FIGS. 6P-6Q (e.g., the music HUD will display information related to the previous song).

In some embodiments, in response to receiving the indication (717), in accordance with a determination (720) that the input is a click input detected in a third region, different from the first and second regions, of the plurality of regions of the touch-sensitive surface (e.g., a click in the left region of the touch sensitive surface), in accordance with a determination that the playback progress of the currently playing song is above the predetermined threshold (e.g., the currently playing song has been playing for more than 0.5 seconds, 1 second, 3 seconds, or 5 seconds), the electronic device initiates (724) replay of the currently playing song (e.g., skipping back to the beginning of the current song) without displaying a representation of the currently playing song overlaid on the first screensaver, such as in FIGS. 6P-6Q (in other words, if the music playback does not change to a different song in response to a user input, the music HUD optionally is not displayed).

The above-described manner of selectively displaying the music HUD to situations where different songs begin playing allows the electronic device to efficiently communicate song information, which simplifies the interaction between the user and the device and enhances the operability of the device and makes the user-device interface more efficient (e.g., only showing song information when the song has changed), which additionally reduces power usage and improves battery life of the device by enabling the user to use the device more quickly and efficiently.

In some embodiments, in response to receiving the indication (726) (e.g., a tap, a swipe, a click, a multi-touch input, or any other suitable input or gesture on the touch-sensitive surface), in accordance with a determination that the electronic device is not in the music playback mode when the indication is received (e.g. the device was not playing music when the device entered the screensaver mode, is not currently playing music, or the music has been paused beyond a threshold amount of time such that the device exits music playback mode), in accordance with a determination that the input is a click input detected on the touch-sensitive surface, the electronic device ceases displaying (728) the first screensaver, such as in FIGS. 6Y-6Z (e.g., when the device is not in music playback mode, the touch-sensitive surface is optionally not partitioned into regions and any click input on the touch-sensitive surface optionally exits the screensaver and displays, for example, the user interface that the electronic device was displaying when the screensaver mode was first triggered).

The above-described manner of not partitioning the touch-sensitive surface when not in playback mode (e.g., such that a click input exits the screensaver) allows the electronic device to simplify operation of the touch-sensitive surface when more complicated functionality is not needed (e.g., no music control is needed), which reduces the processing requirements of the device and simplifies the interaction between the user and the device, thus enhancing the operability of the device and makes the user-device interface more efficient, which additionally reduces power usage and improves battery life of the device by enabling the user to use the device more quickly, efficiently, and intuitively.

In some embodiments, in response to receiving the indication (730) (e.g., a tap, a swipe, a click, a multi-touch input, or any other suitable input or gesture on the touch-sensitive surface), in accordance with a determination that the input is a swipe input detected on the touch-sensitive surface, the electronic device ceases (732) displaying the first screensaver and displays (734), on the display, a second screensaver, different from the first screensaver, such as in FIG. 6G (e.g., if the input is a swipe to the left, transitioning to the next screensaver, and if the input is a swipe to the right, transitioning to the previous screensaver). The transition is optionally a fade-out/fade-in, slide-out/slide-in, or any other suitable transition animation.

The above-described manner of controlling the displayed screensaver (e.g., displaying a second screensaver upon receipt of a swipe input on the touch-sensitive surface) allows the electronic device to provide the user with the ability to change the displayed screensaver while preserving the functionality of the screensaver (e.g., without exiting the screensaver), which enhances the interaction between the user and the device (e.g., by displaying different screensavers for the user's enjoyment), which additionally reduces power usage and improves battery life of the device (e.g., by optionally minimizing the processing requirements of the device and staying in low power mode).

In some embodiments, in accordance with a determination that the swipe input is in a first direction, the second screensaver is a next screensaver after the first screensaver in a screensaver queue including the first screensaver and the second screensaver (736), such as in FIG. 6G (e.g., upon receiving a swipe to the left, transitioning to the next screensaver). In some embodiments, in accordance with a determination that the swipe input is in a second direction, different from the first direction, the second screensaver is a previous screensaver before the first screensaver in the screensaver queue (738) (e.g., upon receiving a swipe to the right, transitioning to the previous screensaver).

The above-described manner of controlling which screensaver is displayed based on a direction of the swipe input allows the electronic device to provide the user with the ability to control which screensaver is displayed while preserving the functionality of the screensaver (e.g., without exiting the screensaver), which enhances the interaction between the user and the device (e.g., by displaying different screensavers for the user's enjoyment), which additionally reduces power usage and improves battery life of the device (e.g., by optionally minimizing the processing requirements of the device and staying in low power mode).

In some embodiments, while displaying the first screensaver and in response to a determination (740) that the first screensaver has been displayed for a predetermined display threshold time (e.g., 30 seconds, 1 minute, 2 minutes, 5 minutes, or any other suitable amount of time), the electronic device ceases (742) displaying the first screensaver and displays (744), on the display, a second screensaver, different from the first screensaver, such as in FIG. 6F (e.g., automatically transitioning to the next screensaver, without user input). In some embodiments, the predetermined display threshold time is the total length of the first screensaver (e.g., playback has reached the end of the first screensaver). In some embodiments, transitioning from the first screensaver to the second screensaver in response to the swipe input occurs in a first time period (746), such as in FIG. 6G (e.g., a swipe input causes a fast transition to another screensaver). In some embodiments, the transition is optionally 0.1 seconds, 0.2 seconds, 0.5 seconds, or any other suitable fast transition time. In some embodiments, transitioning from the first screen saver to the second screensaver in response to determining that the first screensaver has been displayed for the predetermined display threshold time occurs in a second time period, longer than the first time period (748), such as in FIG. 6F (e.g., an automatic transition, not as a result of a user input, causes a slower transition of the screensaver). In some embodiments, the transition is optionally 0.5 seconds, 1 second, 2 seconds, or any other suitable slow transition time.

The above-described manner of transitioning between screensavers (e.g., automatically transitioning after a threshold amount of time at a slow transition speed, and transitioning at a faster speed in response to the user requesting to change the screensaver) provides an efficient way of switching screensavers depending on the trigger that caused the screensaver change, (e.g., automatically or as a result of user input), which enhances the interaction between the user and the device (e.g., by transitioning quickly if the user requests it, but transitioning slowly to enhance the aesthetic value of the screensaver and avoid sudden transitions), which additionally reduces power usage and improves battery life of the device.

In some embodiments, displaying (750) the second screensaver comprises in accordance with a determination that a representation of a current location depicted by the first screensaver was displayed overlaid on the first screensaver when the indication is received (e.g., the location label is currently being displayed on the screen when the user performs a swipe input to change the screensaver being displayed), displaying (752), overlaid on the second screensaver on the display, a representation of a current location depicted by the second screensaver, such as in FIGS. 6J-6K (e.g., removing the location label displaying the location of the first screensaver and replacing with a location label displaying information about the second screensaver, or preserving the same location label and updating the content to display the location depicted in the second screensaver, or any other suitable transition mechanism)

In some embodiments, displaying (750) the second screensaver comprises in accordance with a determination that the representation of the current location depicted by the first screensaver was not displayed overlaid on the first screensaver when the indication is received (e.g. the location label was not displayed or was hidden when the user performs a swipe input to change the screensaver being displayed), displaying (754) the second screensaver without displaying the representation of the current location depicted by the second screensaver, such as in FIG. 6G (e.g., display the new screensaver but do not display the location label). In some embodiments, the location label is updated to reflect the location depicted in the second screensaver without displaying the location label.

The above-described manner of updating the location label (e.g., if the location label is displayed when the screensaver changes, the location label is updated to reflect the location displayed by the new screensaver, but if the location label is not displayed, do not display the location label) allows the electronic device to provide the user with updated information about the displayed location depicted by the screensaver, which simplifies the interaction between the user and the device and enhances the operability of the device and makes the user-device more efficient (e.g., by updating the information displayed without requiring further inputs and without having to exit the screensaver), which additionally reduces power usage and improves battery life of the device by enabling the user to use the device more quickly and efficiently.

In some embodiments, a screen burn-in prevention parameter of the next screensaver is greater than a screen burn-in prevention parameter of the first screensaver (756), such as in FIG. 6F (e.g., the screensaver playback queue is optionally arranged such that subsequent screensavers have a better ability to prevent or avoid burn-in of the screen than prior screensavers). Screen burn-in optionally means permanent or temporary discoloration of areas of a display often caused by cumulative non-uniform use of the display pixels. For example, screensavers with a higher screen burn-in prevention score optionally change color or intensity more often, change shapes or move objects around the screen more often, or otherwise avoid driving display pixels with the same signal for extended periods of time. As such, as the device displays more screensavers during its current screensaver session, it displays screensavers with less likelihood of causing burn-in on the display.

The above-described manner of arranging the screensavers in the screensaver queue (e.g., such that the next screensaver has a greater screen burn-in prevention parameter than the previous screensaver) allows the electronic device to display different screensavers while increasingly avoiding screen burn-in, which protects the user's display (e.g., by avoiding or prevent burn-in damage to the display), which additionally reduces waste and improves the useful life of the display, and which additionally enhances the interaction between the user and the device (e.g., by allowing the user to leave the device powered on without risk of causing damage to the display, thus allowing the user to more quickly interact with the device without waiting for the device to power up).

In some embodiments, in response to receiving the indication, in accordance with a determination that the input is a tap input detected on the touch-sensitive surface, the electronic device displays (758), overlaid on the first screen saver on the display, a representation of a current location depicted by the first screensaver, such as in FIGS. 6I-6J (e.g., upon receiving a tap input, display a location label on the display). In some embodiments, the location label describes the location currently being depicted by the screensaver. The location label optionally includes a primary location and a secondary location text. For example, if the screensaver is displaying a landmark, the primary location is optionally the country in which the landmark resides and the secondary location is the name of the landmark or the city of the landmark. The primary location is optionally the continent, country, state, city or any other suitable primary location. The secondary location is optionally the state, city, landmark, or any other suitable specific location.

The above-described manner of displaying the location depicted by the screensaver (e.g., displaying the representation of the location in response to receiving a tap input) allows the electronic device to provide the user with information about the displayed location depicted by the screensaver only when requested (e.g., the location is not displayed when not requested, improving the immersive effect of the screensaver. Upon request, the user receives location information without having to exit the screensaver and navigate to a separate interface to receive the same information), which simplifies the interaction between the user and the device and enhances the operability of the device and makes the user-device interface more efficient (e.g., by only providing information when it is requested, but hiding the information when it is not requested, via fewer inputs and without having to exit the screensaver), which additionally reduces power usage and improves battery life of the device by enabling the user to use the device more quickly and efficiently.

In some embodiments, while displaying the representation of the current location (e.g., displaying a location label describing the location currently being depicted by the screensaver) and in response to a determination that the representation of the current location has been displayed for a predetermined display threshold time (e.g., 1 second, 2 seconds, 5 seconds, 10 seconds, or any other suitable amount of time), the electronic device ceases (760) displaying the representation of the current location while continuing to display the first screensaver, such as in FIGS. 6D-6E (e.g. automatically stop displaying the location label after a certain amount of time after the location label has been displayed). The animation is optionally a fade out, a dissolve, or any other suitable animation.

The above-described manner of displaying the location label (e.g., displaying the location label for a predetermined threshold time and ceasing display after the threshold time) allows the electronic device to provide the user with information related to the location being displayed by the screensaver and removing that information after the user has had an opportunity to view the information (e.g., by ceasing displaying the location label after the threshold time), which simplifies the interaction between the user and the device and enhances the operability of the device and makes the user-device interface more efficient (e.g., by automatically ceasing display of the location label without further user input and without exiting the screensaver), which additionally reduces power usage and improves battery life of the device by enabling the user to use the device more quickly and efficiently.

In some embodiments, in accordance with a determination that the representation of the music playing in response to the input was displayed when the tap input was received (e.g., if the music HUD was displayed when the device received the tap input from the touchpad), displaying the representation of the current location comprises concurrently displaying (762), overlaid on the first screensaver, the representation of the current location and the representation of the music playing in response to the input, such as in FIGS. 6R-6S (e.g., displaying both the music HUD and the location label at the same time). In some embodiments, the music HUD and the location label are displayed in the same areas of the display. In some embodiments, the music HUD and the location are visually separated and displayed in different areas of the display (e.g., the music HUD is displayed in the upper-right portion of the display, and the location label is displayed in the lower-left portion of the display).

The above-described manner of displaying the location label and music HUD (e.g., concurrently displaying the location label with the music HUD) allows the electronic device to provide the user with the ability to view information related to the music playback of the device and the location depicted by the screensaver at the same time (e.g., without exiting the screensaver or waiting for the music HUD to fade away before requesting display of the location label), which simplifies the interaction between the user and the device and enhances the operability of the device and makes the user-device interface more efficient (e.g., by allowing display of both the music HUD and the location label concurrently without waiting for the music HUD to fade out before displaying the location label), which additionally reduces power usage and improves battery life of the device by enabling the user to use the device more quickly and efficiently.

In some embodiments, while displaying the first screensaver and while the device is in the music playback mode (e.g., while the device is playing music), the electronic device receives (764), via the one or more input devices, an indication of an input corresponding to a request to pause playback of a currently playing song that was playing when the input corresponding to the request to pause playback was received, such as in FIG. 6T (e.g., clicking the play/pause button on the remote control when music is playing). In some embodiments, in response to receiving the input corresponding to the request to pause playback, the electronic device pauses (766) playback of the currently playing song, such as in FIG. 6U. In some embodiments, while playback of the currently playing song is paused, the electronic receives (768), via the one or more input devices, an indication of a click input detected on the touch-sensitive surface of the one or more input devices, such as in FIG. 6Y (e.g., receiving a click on the touch-sensitive surface of the remote control). In some embodiments, in response to receiving the click input, the electronic device ceases (770) displaying the first screensaver, such as in FIG. 6Z (e.g., when music is not playing, the touch-sensitive surface is no longer partitioned, there is no longer any music control, and any click input detected on the touch-sensitive surface exits the screensaver).

The above-described manner of exiting the screensaver upon detecting a click when music is not playing allows the electronic device to provide the user with the ability to easily exit the screensaver when no music control is needed, which simplifies the interaction between the user and the device and enhances the operability of the device and makes the user-device interface more efficient, which additionally reduces power usage and improves battery life of the device by enabling the user to use the device more quickly and efficiently.

In some embodiments, while displaying the first screensaver and while the device is in the music playback mode (e.g., while the device is playing music), the electronic device receives (772), via the one or more input devices, an indication of an input corresponding to a request to pause playback of a currently playing song that was playing when the input corresponding to the request to pause playback was received, such as in FIG. 6T (e.g., clicking the play/pause button on the remote control when music is playing). In some embodiments, in response to receiving the input corresponding to the request to pause playback, the electronic device pauses (774) playback of the currently playing song, such as in FIG. 6U. In some embodiments, while playback of the currently playing song is paused, the electronic device receives (776), via the one or more input devices, an indication of an input corresponding to a request to resume playback of the song that was paused when the input corresponding to the request to resume playback was received, such as in FIG. 6V (e.g., clicking the play/pause button on the remote control when music is paused).

In some embodiments, in response to receiving the input (778) corresponding to the request to resume playback, in accordance with a determination that the song has been paused for less than a threshold time, the electronic device resumes (780) playback of the song that was paused when the input corresponding to the request to resume playback was received, such as in FIG. 6W (e.g., if the music has only been paused for 1 second, 2 seconds, 5 seconds, 10 seconds, 30 seconds, 1 minute, or any other suitable threshold time, the device will resume playing the paused music upon a request to play the music). In some embodiments, in response to receiving the input (778) corresponding to the request to resume playback, in accordance with a determination that the song has been paused for more than the threshold time, the electronic device forgoes (782) resuming playback of the song that was paused, such as in FIGS. 6X-6Y (e.g., if the music has been paused for too long, music playback mode will time out and the device will exit music playback mode). In some embodiments, a further request to resume playback will not cause playback of the music, because the device is no longer in music playback mode. The user is optionally able to re-enter music playback mode using other means such as through voice command or exiting the screensaver and restarting music playback mode.

The above-described manner of music control (e.g., pausing the music playback upon a request to pause music, and resuming music playback upon a request to resume music if the music has been paused for less than a threshold amount of time, or exiting the music playback mode when music playback times out and not resuming music playback) allows the electronic device to provide the user with the ability to control the music playback, while eliminating music playback control if the user indicates that he/she no longer wants to play music (e.g., by not resuming music within the threshold time and timing out the music playback mode), which simplifies the interaction between the user and the device and reduces the power usage and improves the battery life of the device by enabling the device to shut down processing functionality that is no longer required.

In some embodiments, prior to displaying (784) the first screensaver and while not displaying a screensaver on the display (e.g., while the device is not displaying a screensaver, but rather is displaying another user interface, such as a home screen or a user interface of an application on the electronic device), in response to a determination to display the first screensaver, such as in FIG. 6A (e.g., in response to user input requesting display of a screensaver, in response to a period (e.g., 3, 5 or 10 minutes) of inactivity at the device that causes display of the screensaver, or any other trigger for displaying a screensaver), the electronic device displays (786), on the display, the first screensaver, such as in FIG. 6B (e.g., the first screensaver upon the device first entering screensaver mode).

In some embodiments, prior to displaying (784) the first screensaver and while not displaying a screensaver on the display (e.g., while the device is not displaying a screensaver, but rather is displaying another user interface, such as a home screen or a user interface of an application on the electronic device), in response to a determination to display the first screensaver, such as in FIG. 6A (e.g., in response to user input requesting display of a screensaver, in response to a period (e.g., 3, 5 or 10 minutes) of inactivity at the device that causes display of the screensaver, or any other trigger for displaying a screensaver), the electronic device displays (788), overlaid on the first screensaver, a representation of a current location depicted by the first screensaver, such as in FIG. 6B (e.g., when the device first enters screensaver mode and displays the first screensaver, the location label will be displayed). The location label optionally has a background color that contrasts with the color of the screensaver to improve visibility of the location label. In some embodiments, the background color of the location label is a gradient based on the distance from the label itself. For example, the background color of the location label optionally fades out from the label to create a smooth transition with the screensaver while preserving visibility of the content area of the label.

In some embodiments, while displaying the first screensaver and the representation of the current location depicted by the first screensaver, in response to a determination that the representation of the current location depicted by the first screensaver has been displayed for a threshold time, the electronic device ceases (790) to display the representation of the current location while continuing to display the first screensaver, such as in FIGS. 6D-6E (e.g., fading the location label away or ceasing to display the location label after it has been displayed for a threshold amount of time). The threshold amount of time is optionally 5 seconds, 10 seconds, 30 seconds, 1 minute, or any other suitable amount of time. Thus, as described above, a location label is optionally displayed when the device first displays a screensaver, and that label optionally ceases to be displayed after a certain time period.

The above-described manner of temporarily displaying the location label when the screensaver is first displayed (e.g., displaying the location label for the first displayed screensaver and fading the location label away after a threshold amount of time) allows the electronic device to provide the user with location information when the device first enters screensaver mode (e.g., the user is most likely to still be near the device and able to receive the displayed information, without having to exit the screensaver and navigate to a separate app or interface to receive location information), which simplifies the interaction between the user and the device and enhances the operability of the device and makes the user-device interface more efficient (e.g., by displaying the location label when the user has the highest probability of seeing it, and removing the label after the user has a chance to read the label to avoid distracting the user from the images on the screensaver), which additionally reduces power usage and improves battery life of the device by enabling the user to use the device more quickly and efficiently.

In some embodiments, after ceasing display of the representation of the current location depicted by the first screensaver and while displaying the first screensaver, the electronic device determines (792) to display, on the display, a second screensaver, different than the first screensaver, such as in FIGS. 6E-6F (e.g., after the location label has faded away or is otherwise no longer displayed, transitioning the screensaver to another screensaver, either automatically or as a result of the user requesting to transition to another screensaver).

In some embodiments, in response to determining (794) to display the second screensaver, such as in FIGS. 6E-6F, in accordance with a determination (796) that the determination to display the second screensaver was in response to user input, such as in FIG. 6G (e.g., if the user requested to transition to the next screensaver, either by swiping to the left or swiping to the right on the touch-sensitive surface of a remote control), the electronic device ceases (798) displaying the first screensaver, such as in FIG. 6G. In some embodiments, in response to determining (794) to display the second screensaver, in accordance with a determination (796) that the determination to display the second screensaver was in response to user input (e.g., if the user requested to transition to the next screensaver, either by swiping to the left or swiping to the right on the touch-sensitive surface of a remote control), the electronic device displays (799), on the display, the second screensaver and a representation of the current location depicted by the second screensaver overlaid on the second screensaver (e.g., optionally while displaying a screensaver without displaying the location label, such as in FIG. 6G, if the transition to the next screensaver is a result of the user's input requesting to transition to the next screensaver, then transition to the next screensaver and simultaneously display the location label associated with the second screensaver, such as in FIG. 6K).

In some embodiments, in response to determining (794) to display the second screensaver, in accordance with a determination (797) that the determination to display the second screensaver was not in response to user input, such as in FIG. 6F (e.g., an automatic transition after displaying the first screensaver for a threshold amount of time), the electronic device ceases (795) displaying the first screensaver, such as in FIG. 6F. In some embodiments, in response to determining (794) to display the second screensaver, such as in FIG. 6F, in accordance with a determination (797) that the determination to display the second screensaver was not in response to user input, such as in FIG. 6F (e.g., an automatic transition after displaying the first screensaver for a threshold amount of time), the electronic device displays (793), on the display, the second screensaver without displaying the representation of the current location depicted by the second screensaver, such as in FIG. 6F (e.g., if the transition was not a result of the user's input, such as by automatic transition, then the location label is not displayed when the second screensaver is displayed).

The above-described manner of displaying or not the location label upon screensaver transitions (e.g., displaying the location label when transitioning to another screensaver as a result of the user's request to transition, and not displaying the location label when transitioning to another screensaver not as a result of the user's request to transition) allows the electronic device to provide the user with location information when it is likely that the user is looking at the screen (e.g., the user has requested to transition to the next screensaver) and not when the user is likely not looking at the screen (e.g., when the screensaver is automatically transitioning and not as a result of a user input), which simplifies the interaction between the user and the device and enhances the operability of the device and makes the user-device interface more efficient (e.g., by only displaying the location label when the user has the highest probability of seeing it), which additionally reduces power usage and improves battery life of the device by enabling the user to use the device more quickly and efficiently.

In some embodiments, while displaying the first screensaver and the representation of the current location depicted by the first screensaver, the electronic device determines (791) to display, on the display, a second screensaver, different from the first screensaver, such as in FIGS. 6J-6K (e.g., the location label is currently being displayed on the screen when the system changes the screensaver being displayed, either in response to user input to display another screensaver or not in response to user input (e.g., automatically transitioning to another screensaver)).

In some embodiments, in response to determining (789) to display the second screensaver, such as in FIG. 6J-6K, the electronic device ceases (787) displaying the first screensaver, such as in FIG. 6K. In some embodiments, in response to determining (789) to display the second screensaver, such as in FIG. 6I-6J, the electronic device displays (785), on the display, the second screensaver and a representation of a current location depicted by the second screensaver overlaid on the second screensaver, such as in FIG. 6K (e.g., transition to displaying the next screensaver, either automatically or in response to a user input requesting transitioning to the next screensaver). The transition is optionally a fade-out/fade-in, slide-out/slide-in, or any other suitable transition animation. Thus, in some embodiments, a location label is displayed with location information of the second screensaver if the location label was displayed when the transition from the first screensaver to the second screensaver occurred. The transition occurs optionally by removing the location label displaying the location of the first screensaver and replacing it with a location label displaying information of the second screensaver, or optionally by preserving the location label and updating the content to display the location depicted in the second screensaver, or any other suitable transition mechanism.

The above-described manner of updating the location label (e.g., if the location label is displayed when the screensaver changes, the location label is updated to reflect the location displayed by the new screensaver) allows the electronic device to provide the user with updated information about the displayed location depicted by the screensaver, which simplifies the interaction between the user and the device and enhances the operability of the device and makes the user-device more efficient (e.g., by updating the information displayed without requiring further inputs and without having to exit the screensaver), which additionally reduces power usage and improves battery life of the device by enabling the user to use the device more quickly and efficiently.

In some embodiments, while displaying a portion of the first screensaver that depicts a first location (e.g. when the screensaver that includes within it depictions of multiple locations (e.g., a screensaver that is a continuous aerial recording from Los Angeles to New York) and is currently displaying a portion of the screensaver that depicts a particular location), the electronic device transitions (783) the first screensaver from the portion of the first screensaver depicting the first location to a portion of the first screensaver depicting a second location, different than the first location, such as in FIGS. 6B-6C (e.g. when the screensaver moves to displaying a different location, such as when the continuous screensaver crossed a border from location A to location B).

In some embodiments, in response to the transitioning (781), such as in FIGS. 6B-6C, in accordance with a determination that a representation of the first location was displayed overlaid on the first screensaver when the transition occurred (e.g., the location label is currently being displayed on the screen when the screensaver displays a different location), the electronic device updates (779) the representation of the first location to become a representation of the second location overlaid on the first screensaver, such as in FIGS. 6B-6C (e.g., removing the location label displaying the first location of the first screensaver and replacing with a location label displaying the new location of the first screensaver, or preserving the same location label and updating the content to display the new location, or any other suitable transition mechanism). In some embodiments, in response to the transitioning (781), such as in FIGS. 6B-6C, in accordance with a determination that the representation of the first location was not displayed overlaid on the first screensaver when the transition occurred (e.g. the location label was not displayed or was hidden when the screensaver displays a different location), the electronic device displays (777) the portion of the first screensaver depicting the second location without displaying the representation of the second location (e.g., if the screensaver transitions from displaying one location to displaying a new location, such as in FIG. 6C, but the location label is not displayed at the time of transition, then display the new location within the same screensaver but do not display the location label, such as in FIG. 6E). In some embodiments, the location label is updated to reflect the new location without displaying the location label.

The above-described manner of updating the location label (e.g., if the location label is displayed when the screensaver displays a new location, the location label is updated to reflect the new location displayed by screensaver, but if the location label is not displayed, do not display the location label) allows the electronic device to provide the user with updated information about the displayed location depicted by the screensaver, which simplifies the interaction between the user and the device and enhances the operability of the device and makes the user-device more efficient (e.g., by updating the information displayed without requiring further inputs and without having to exit the screensaver), which additionally reduces power usage and improves battery life of the device by enabling the user to use the device more quickly and efficiently.

In some embodiments, while displaying the portion of the first screensaver depicting the second location without displaying the representation of the second location (e.g., the location label is not displayed and the screensaver is displaying a new location), the electronic device receives (775), via the one or more input devices, an indication of a tap input detected on the touch-sensitive surface of the one or more input devices, such as in FIG. 6I (e.g., the user has tapped on the touch-sensitive surface, thus requesting display of the location label). In some embodiments, in response to receiving the indication of the tap input, the electronic device displays (773), overlaid on the first screensaver on the display, a representation of the second location depicted by the first screensaver, such as in FIG. 6J (e.g., displaying the location label including information about the new location depicted by the screensaver). The information optionally is updated when the user requests display of the information or optionally updated when the screensaver transitioned to displaying the new location, even if the location label was not displayed at the time.

The above-described manner of displaying a new location depicted by the screensaver (e.g., displaying the representation of the new location in response to receiving a tap input) allows the electronic device to provide the user with information about the new location depicted by the screensaver only when requested (e.g., the location is not displayed when not requested, improving the immersive effect of the screensaver. Upon request, the user receives location information without having to exit the screensaver and navigate to a separate interface to receive the same information), which simplifies the interaction between the user and the device and enhances the operability of the device and makes the user-device more efficient (e.g., by only providing information when it is requested, but hiding the information when it is not requested, via fewer inputs and without having to exit the screensaver), which additionally reduces power usage and improves battery life of the device by enabling the user to use the device more quickly and efficiently.

In some embodiments, the representation of the first location comprises a representation of a primary location of the first location and a representation of a secondary location of the first location (771), such as in FIG. 6B (e.g., the location label optionally includes two labels: a primary location and a secondary location). The primary location is optionally the general name or identifier of the location and the secondary location is optionally the specific name or identifier of the location (e.g., the secondary location is optionally a more specific location descriptor than is the primary location). For example, if the screensaver is displaying a landmark, the primary location is optionally the country in which the landmark resides and the secondary location is the name of the landmark or the city in which the landmark is located. The primary location is optionally the continent, country, state, city or any other suitable primary location. The secondary location is optionally the state, city, landmark, or any other suitable specific location.

In some embodiments, updating the representation (769) of the first location to become the representation of the second location comprises in accordance with a determination that the second location is associated with the primary location of the first location and a second secondary location of the first location, updating the secondary location to be the second secondary location while maintaining the primary location (767), such as in FIGS. 6B-6C (e.g., the screensaver displays a different location within the same primary location, in which case the secondary location is optionally updated to display the updated secondary location and the primary location is not changed). For example, if the screensaver displays San Francisco, Calif., the primary location optionally is California and the secondary location optionally is San Francisco. Then if the screensaver moves to displaying Los Angeles, Calif., the primary location is optionally not changed and remains displaying California and the secondary location is optionally updated to display Los Angeles.

In some embodiments, updating the representation (769) of the first location to become the representation of the second location comprises in accordance with a determination that the second location is associated with a second primary location and the secondary location of the first location, the electronic device updates (765) the primary location to be the second primary location while maintaining the secondary location (e.g., if the screensaver transitions from displaying one primary location to displaying a different primary location, such as in FIG. 6D, but the new location displayed is the same secondary location as the old location, then the primary location is optionally updated to display the updated primary location and the secondary location is not changed, such as in FIG. 6D except that secondary location label 616-2 remains displaying sub-location A-2). For example, if the screensaver displays the French Alps, the primary location optionally is France and the secondary location optionally is Alps. Then if the screensaver moves to displaying the Swiss Alps, the primary location is optionally updated to display Switzerland and the secondary location is optionally not changed and remains displaying Alps.

In some embodiments, updating the representation (769) of the first location to become the representation of the second location comprises in accordance with a determination that the second location is associated with the second primary location and the second secondary location, the electronic device updates (763) the primary location to be the second primary location and updating the secondary location to be the second secondary location, such as in FIGS. 6C-6D (e.g., the screensaver displays a different primary location and different secondary location, in which case both the primary and the secondary locations are optionally updated to display the updated primary and secondary locations). For example, if the screensaver displays San Francisco, Calif., the primary location optionally is California and the secondary location optionally is San Francisco. Then if the screensaver moves to displaying New York City, N.Y., the primary location is optionally updated to display New York and the secondary location is optionally updated to display New York City.

The above-described manner of displaying the location depicted by the screensaver (e.g., displaying a general location and a secondary location and updating either location information independently) allows the electronic device to provide the user with more detailed information about the displayed location depicted by the screensaver (e.g., the general location is updated without updating the secondary location, the secondary location is updated without updating the general location, or both locations are updated simultaneously), which simplifies the interaction between the user and the device and enhances the operability of the device and makes the user-device more efficient (e.g., by providing more information without having to exit the screensaver), which additionally reduces power usage and improves battery life of the device by enabling the user to use the device more quickly and efficiently.

In some embodiments, in response to determining to display the representation of the music playing in response to the input, the electronic device concurrently displays (761), on the display, a representation of a current location depicted by a currently displayed screensaver and the representation of the music playing in response to the input, both overlaid on the currently displayed screensaver, such as in FIGS. 6CC-6DD (e.g., when the device determines to display the music HUD, the location label is also displayed at the same time). The music HUD and location label optionally would cease displaying or fade out at the same time. In some embodiments, in response to determining to display the representation of the current location depicted by the currently displayed screensaver, the electronic device concurrently displays (759), on the display, the representation of the music playing in response to the input and the representation of the current location depicted by the currently displayed screensaver, both overlaid on the currently displayed screensaver, such as in FIGS. 6AA-6BB (e.g., when the device determines to display the location label, the music HUD is also displayed at the same time).

The above-described manner of displaying information (e.g., both the music HUD and the location label whenever either the music HUD or the location label is triggered to be displayed) allows the electronic device to provide the user with more detailed information about the music playback status and the displayed location depicted by the screensaver (e.g., displaying both information without having to exit the screensaver and navigate to a separate interface to receive the same information), which simplifies the interaction between the user and enhances the operability of the device and makes the user-device more efficient (e.g., by providing more information without having to exit the screensaver), which additionally reduces power usage and improves battery life of the device by enabling the user to use the device more quickly and efficiently.

It should be understood that the particular order in which the operations in FIGS. 7A-7Q have been described is merely exemplary and is not intended to indicate that the described order is the only order in which the operations could be performed. One of ordinary skill in the art would recognize various ways to reorder the operations described herein. The operations in the information processing methods described above are, optionally, implemented by running one or more functional modules in an information processing apparatus such as general purpose processors (e.g., as described with respect to FIGS. 1A, 3, 5A) or application specific chips. Further, the operations described above with reference to FIGS. 7A-7Q are, optionally, implemented by components depicted in FIGS. 1A-1B. For example, displaying operations 702 and 710, receiving operation 704 and ceasing operation 712 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from various sources to improve the delivery to users of content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user (e.g., preferred screensavers, disliked screensavers). Accordingly, use of such personal information data enables users to have calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of content delivery services, the present technology can be configured to allow users to select to "opt in" or "opt out" of participation in the collection of personal information data during registration for services or anytime thereafter. In another example, users can select not to provide content taste data for targeted content delivery services. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with a display and one or more input devices:
displaying, on the display, a first screensaver including displaying one or more images on the display;
while displaying the first screensaver, receiving, via the one or more input devices, an indication of an input detected on a touch-sensitive surface of the one or more input devices; and
in response to receiving the indication:
in accordance with a determination that the electronic device is playing music when the indication is received:
in accordance with a determination that the input is a click input detected in a first region of a plurality of regions of the touch-sensitive surface, displaying, overlaid on the first screensaver, a representation of music being played by the electronic device in response to the input, wherein the representation of the music being played by the electronic device is not displayed before the indication of the input is received; and
in accordance with a determination that the input is a click input detected in a second region of the plurality of regions of the touch-sensitive surface, different than the first region, ceasing displaying the first screensaver.

2. The method of claim 1, wherein:
in accordance with the determination that the electronic device is playing music, the touch-sensitive surface includes a plurality of regions, including the first region and the second region, each region of the plurality of regions associated with a respective function, and in accordance with the determination that the electronic device is not playing music, the touch-sensitive surface does not include the plurality of regions.

3. The method of claim 2, further comprising in response to receiving the indication:
in accordance with the determination that the input is a click input detected in the first region of the plurality of regions of the touch-sensitive surface, initiating playback of a next song, after a currently playing song that was playing when the input was received, in a music playback queue, wherein the representation of the music being played by the electronic device in response to the input comprises a representation of the next song; and
in accordance with a determination that the input is a click input detected in a third region, different from the first and second regions, of the plurality of regions of the touch-sensitive surface:
in accordance with a determination that a playback progress of the currently playing song is below a predetermined progress threshold, initiating playback of a previous song, before the currently playing song, in the music playback queue, wherein the representation of the music being played by the electronic device in response to the input comprises a representation of the previous song; and
in accordance with a determination that the playback progress of the currently playing song is above the predetermined progress threshold, initiating replay of the currently playing song without displaying a representation of the currently playing song overlaid on the first screensaver.

4. The method of claim 2, further comprising:
in response to receiving the indication, in accordance with a determination that the electronic device is not playing music when the indication is received:
in accordance with a determination that the input is a click input detected on the touch-sensitive surface, ceasing displaying the first screensaver.

5. The method of claim 1, further comprising:
in response to receiving the indication, in accordance with a determination that the input is a swipe input detected on the touch-sensitive surface:
ceasing displaying the first screensaver; and
displaying, on the display, a second screensaver, different from the first screensaver.

6. The method of claim 5, wherein:
in accordance with a determination that the swipe input is in a first direction, the second screensaver is a next screensaver after the first screensaver in a screensaver queue including the first screensaver and the second screensaver; and
in accordance with a determination that the swipe input is in a second direction, different from the first direction, the second screensaver is a previous screensaver before the first screensaver in the screensaver queue.

7. The method of claim 6, wherein a screen burn-in prevention parameter of the next screensaver is greater than a screen burn-in prevention parameter of the first screensaver.

8. The method of claim 5, further comprising:
while displaying the first screensaver and in response to a determination that the first screensaver has been displayed for a predetermined display threshold time:
ceasing displaying the first screensaver; and
displaying, on the display, a second screensaver, different from the first screensaver, wherein:
transitioning from the first screensaver to the second screensaver in response to the swipe input occurs in a first time period, and
transitioning from the first screensaver to the second screensaver in response to determining that the first screensaver has been displayed for the predetermined display threshold time occurs in a second time period, longer than the first time period.

9. The method of claim 5, wherein displaying the second screensaver comprises:
in accordance with a determination that a representation of a current location depicted by the first screensaver was displayed overlaid on the first screensaver when the indication is received, displaying, overlaid on the second screensaver on the display, a representation of a current location depicted by the second screensaver; and
in accordance with a determination that the representation of the current location depicted by the first screensaver was not displayed overlaid on the first screensaver when the indication is received, displaying the second screensaver without displaying the representation of the current location depicted by the second screensaver.

10. The method of claim 1, further comprising in response to receiving the indication:
in accordance with a determination that the input is a tap input detected on the touch-sensitive surface, displaying, overlaid on the first screensaver on the display, a representation of a current location depicted by the first screensaver.

11. The method of claim 10, further comprising:
while displaying the representation of the current location and in response to a determination that the representation of the current location has been displayed for a predetermined display threshold time, ceasing displaying the representation of the current location while continuing to display the first screensaver.

12. The method of claim 10, wherein:
in accordance with a determination that the representation of the music being played by the electronic device in response to the input was displayed when the tap input was received, displaying the representation of the current location comprises concurrently displaying, overlaid on the first screensaver, the representation of the current location and the representation of the music being played by the electronic device in response to the input.

13. The method of claim 1, further comprising:
while displaying the first screensaver and while the electronic device is playing music, receiving, via the one or more input devices, an indication of an input corresponding to a request to pause playback of a currently playing song that was playing when the input corresponding to the request to pause playback was received;
in response to receiving the input corresponding to the request to pause playback, pausing playback of the currently playing song;
while playback of the currently playing song is paused, receiving, via the one or more input devices, an indication of a click input detected on the touch-sensitive surface of the one or more input devices; and
in response to receiving the click input, ceasing displaying the first screensaver.

14. The method of claim 1, further comprising:
while displaying the first screensaver and while the electronic device is playing music, receiving, via the one or more input devices, an indication of an input corresponding to a request to pause playback of a currently playing song that was playing when the input corresponding to the request to pause playback was received;

in response to receiving the input corresponding to the request to pause playback, pausing playback of the currently playing song;

while playback of the currently playing song is paused, receiving, via the one or more input devices, an indication of an input corresponding to a request to resume playback of the song that was paused when the input corresponding to the request to resume playback was received; and in response to receiving the input corresponding to the request to resume playback:
  in accordance with a determination that the song has been paused for less than a threshold time, resuming playback of the song that was paused when the input corresponding to the request to resume playback was received; and
  in accordance with a determination that the song has been paused for more than the threshold time, forgoing resuming playback of the song that was paused.

15. The method of claim 1, further comprising:
prior to displaying the first screensaver and while not displaying a screensaver on the display, in response to a determination to display the first screensaver:
  displaying, on the display, the first screensaver; and
  displaying, overlaid on the first screensaver, a representation of a current location depicted by the first screensaver; and
while displaying the first screensaver and the representation of the current location depicted by the first screensaver, in response to a determination that the representation of the current location depicted by the first screensaver has been displayed for a threshold time, ceasing to display the representation of the current location while continuing to display the first screensaver.

16. The method of claim 15, further comprising:
after ceasing display of the representation of the current location depicted by the first screensaver and while displaying the first screensaver, determining to display, on the display, a second screensaver, different than the first screensaver; and
in response to determining to display the second screensaver:
  in accordance with a determination that the determination to display the second screensaver was in response to user input:
    ceasing displaying the first screensaver; and
    displaying, on the display, the second screensaver and a representation of the current location depicted by the second screensaver overlaid on the second screensaver; and
  in accordance with a determination that the determination to display the second screensaver was not in response to user input:
    ceasing displaying the first screensaver; and
    displaying, on the display, the second screensaver without displaying the representation of the current location depicted by the second screensaver.

17. The method of claim 15, further comprising:
while displaying the first screensaver and the representation of the current location depicted by the first screensaver, determining to display, on the display, a second screensaver, different from the first screensaver; and
in response to determining to display the second screensaver:
  ceasing displaying the first screensaver; and
  displaying, on the display, the second screensaver and a representation of a current location depicted by the second screensaver overlaid on the second screensaver.

18. The method of claim 1, further comprising:
while displaying a portion of the first screensaver that depicts a first location, transitioning the first screensaver from the portion of the first screensaver depicting the first location to a portion of the first screensaver depicting a second location, different than the first location; and
in response to the transitioning:
  in accordance with a determination that a representation of the first location was displayed overlaid on the first screensaver when the transition occurred, updating the representation of the first location to become a representation of the second location overlaid on the first screensaver; and
  in accordance with a determination that the representation of the first location was not displayed overlaid on the first screensaver when the transition occurred, displaying the portion of the first screensaver depicting the second location without displaying the representation of the second location.

19. The method of claim 18, further comprising:
while displaying the portion of the first screensaver depicting the second location without displaying the representation of the second location, receiving, via the one or more input devices, an indication of a tap input detected on the touch-sensitive surface of the one or more input devices; and
in response to receiving the indication of the tap input, displaying, overlaid on the first screensaver on the display, a representation of the second location depicted by the first screensaver.

20. The method of claim 18, wherein:
the representation of the first location comprises a representation of a primary location of the first location and a representation of a secondary location of the first location; and
updating the representation of the first location to become the representation of the second location comprises:
  in accordance with a determination that the second location is associated with the primary location of the first location and a second secondary location of the first location, updating the secondary location to be the second secondary location while maintaining the primary location;
  in accordance with a determination that the second location is associated with a second primary location and the secondary location of the first location, updating the primary location to be the second primary location while maintaining the secondary location; and
  in accordance with a determination that the second location is associated with the second primary location and the second secondary location, updating the primary location to be the second primary location and updating the secondary location to be the second secondary location.

21. The method of claim 1, further comprising:
in response to determining to display the representation of the music being played by the electronic device in response to the input, concurrently displaying, on the display, a representation of a current location depicted by a currently displayed screensaver and the representation of the music being played by the electronic device in response to the input, both overlaid on the currently displayed screensaver; and
in response to determining to display the representation of the current location depicted by the currently displayed screensaver, concurrently displaying, on the display, the representation of the music being played by the electronic device in response to the input and the representation of the current location depicted by the currently displayed screensaver, both overlaid on the currently displayed screensaver.

22. The method of claim 1, wherein determining that the electronic device is playing music includes a determination that the electronic device is playing a song.

23. The method of claim 1, wherein displaying, overlaid on the first screensaver, the representation of the music being played by the electronic device in response to the input includes maintaining display of the first screensaver on the display.

24. An electronic device, comprising:
one or more processors;
memory; and
one or more programs, wherein the one or more programs are stored in the memory and configured to be executed by the one or more processors, the one or more programs including instructions for:
displaying, on a display, a first screensaver including displaying one or more images on the display;
while displaying the first screensaver, receiving, via one or more input devices, an indication of an input detected on a touch-sensitive surface of the one or more input devices; and
in response to receiving the indication:
in accordance with a determination that the electronic device is playing music when the indication is received:
in accordance with a determination that the input is a click input detected in a first region of a plurality of regions of the touch-sensitive surface, displaying, overlaid on the first screensaver, a representation of music being played by the electronic device in response to the input, wherein the representation of the music being played by the electronic device is not displayed before the indication of the input is received; and
in accordance with a determination that the input is a click input detected in a second region of the plurality of regions of the touch-sensitive surface, different than the first region, ceasing displaying the first screensaver.

25. The electronic device of claim 24, wherein:
in accordance with the determination that the electronic device is playing music, the touch-sensitive surface includes a plurality of regions, including the first region and the second region, each region of the plurality of regions associated with a respective function, and
in accordance with the determination that the electronic device is not playing music, the touch-sensitive surface does not include the plurality of regions.

26. The electronic device of claim 25, the one or more programs further including instructions for in response to receiving the indication:
in accordance with the determination that the input is a click input detected in the first region of the plurality of regions of the touch-sensitive surface, initiating playback of a next song, after a currently playing song that was playing when the input was received, in a music playback queue, wherein the representation of the music being played by the electronic device in response to the input comprises a representation of the next song; and
in accordance with a determination that the input is a click input detected in a third region, different from the first and second regions, of the plurality of regions of the touch-sensitive surface:
in accordance with a determination that a playback progress of the currently playing song is below a predetermined progress threshold, initiating playback of a previous song, before the currently playing song, in the music playback queue, wherein the representation of the music being played by the electronic device in response to the input comprises a representation of the previous song; and
in accordance with a determination that the playback progress of the currently playing song is above the predetermined progress threshold, initiating replay of the currently playing song without displaying a representation of the currently playing song overlaid on the first screensaver.

27. The electronic device of claim 25, the one or more programs further including instructions for:
in response to receiving the indication, in accordance with a determination that the electronic device is not playing music when the indication is received:
in accordance with a determination that the input is a click input detected on the touch-sensitive surface, ceasing displaying the first screensaver.

28. The electronic device of claim 24, the one or more programs further including instructions for:
in response to receiving the indication, in accordance with a determination that the input is a swipe input detected on the touch-sensitive surface:
ceasing displaying the first screensaver; and
displaying, on the display, a second screensaver, different from the first screensaver.

29. The electronic device of claim 28, wherein:
in accordance with a determination that the swipe input is in a first direction, the second screensaver is a next screensaver after the first screensaver in a screensaver queue including the first screensaver and the second screensaver; and
in accordance with a determination that the swipe input is in a second direction, different from the first direction, the second screensaver is a previous screensaver before the first screensaver in the screensaver queue.

30. The electronic device of claim 29, wherein a screen burn-in prevention parameter of the next screensaver is greater than a screen burn-in prevention parameter of the first screensaver.

31. The electronic device of claim 28, the one or more programs further including instructions for:
while displaying the first screensaver and in response to a determination that the first screensaver has been displayed for a predetermined display threshold time:
ceasing displaying the first screensaver; and displaying, on the display, a second screensaver, different from the first screensaver, wherein:
  transitioning from the first screensaver to the second screensaver in response to the swipe input occurs in a first time period, and
  transitioning from the first screensaver to the second screensaver in response to determining that the first screensaver has been displayed for the predetermined display threshold time occurs in a second time period, longer than the first time period.

32. The electronic device of claim 28, wherein displaying the second screensaver comprises:
  in accordance with a determination that a representation of a current location depicted by the first screensaver was displayed overlaid on the first screensaver when the indication is received, displaying, overlaid on the second screensaver on the display, a representation of a current location depicted by the second screensaver; and
  in accordance with a determination that the representation of the current location depicted by the first screensaver was not displayed overlaid on the first screensaver when the indication is received, displaying the second screensaver without displaying the representation of the current location depicted by the second screensaver.

33. The electronic device of claim 24, the one or more programs further including instructions for in response to receiving the indication:
  in accordance with a determination that the input is a tap input detected on the touch-sensitive surface, displaying, overlaid on the first screensaver on the display, a representation of a current location depicted by the first screensaver.

34. The electronic device of claim 33, the one or more programs further including instructions for:
  while displaying the representation of the current location and in response to a determination that the representation of the current location has been displayed for a predetermined display threshold time, ceasing displaying the representation of the current location while continuing to display the first screensaver.

35. The electronic device of claim 33, wherein:
  in accordance with a determination that the representation of the music being played by the electronic device in response to the input was displayed when the tap input was received, displaying the representation of the current location comprises concurrently displaying, overlaid on the first screensaver, the representation of the current location and the representation of the music being played by the electronic device in response to the input.

36. The electronic device of claim 24, the one or more programs further including instructions for:
  while displaying the first screensaver and while the electronic device is playing music, receiving, via the one or more input devices, an indication of an input corresponding to a request to pause playback of a currently playing song that was playing when the input corresponding to the request to pause playback was received;
  in response to receiving the input corresponding to the request to pause playback, pausing playback of the currently playing song;
  while playback of the currently playing song is paused, receiving, via the one or more input devices, an indication of a click input detected on the touch-sensitive surface of the one or more input devices; and
  in response to receiving the click input, ceasing displaying the first screensaver.

37. The electronic device of claim 24, the one or more programs further including instructions for:
  while displaying the first screensaver and while the electronic device is playing music, receiving, via the one or more input devices, an indication of an input corresponding to a request to pause playback of a currently playing song that was playing when the input corresponding to the request to pause playback was received;
  in response to receiving the input corresponding to the request to pause playback, pausing playback of the currently playing song;
  while playback of the currently playing song is paused, receiving, via the one or more input devices, an indication of an input corresponding to a request to resume playback of the song that was paused when the input corresponding to the request to resume playback was received; and
  in response to receiving the input corresponding to the request to resume playback:
    in accordance with a determination that the song has been paused for less than a threshold time, resuming playback of the song that was paused when the input corresponding to the request to resume playback was received; and
    in accordance with a determination that the song has been paused for more than the threshold time, forgoing resuming playback of the song that was paused.

38. The electronic device of claim 24, the one or more programs further including instructions for:
  prior to displaying the first screensaver and while not displaying a screensaver on the display, in response to a determination to display the first screensaver:
    displaying, on the display, the first screensaver; and
    displaying, overlaid on the first screensaver, a representation of a current location depicted by the first screensaver; and
  while displaying the first screensaver and the representation of the current location depicted by the first screensaver, in response to a determination that the representation of the current location depicted by the first screensaver has been displayed for a threshold time, ceasing to display the representation of the current location while continuing to display the first screensaver.

39. The electronic device of claim 38, the one or more programs further including instructions for:
  after ceasing display of the representation of the current location depicted by the first screensaver and while displaying the first screensaver, determining to display, on the display, a second screensaver, different than the first screensaver; and
  in response to determining to display the second screensaver:
    in accordance with a determination that the determination to display the second screensaver was in response to user input:
      ceasing displaying the first screensaver; and
      displaying, on the display, the second screensaver and a representation of the current location depicted by the second screensaver overlaid on the second screensaver; and in accordance with a determination that the determination to display the second screensaver was not in response to user input:
ceasing displaying the first screensaver; and
displaying, on the display, the second screensaver without displaying the representation of the current location depicted by the second screensaver.

40. The electronic device of claim 38, the one or more programs further including instructions for:
while displaying the first screensaver and the representation of the current location depicted by the first screensaver, determining to display, on the display, a second screensaver, different from the first screensaver; and
in response to determining to display the second screensaver:
ceasing displaying the first screensaver; and
displaying, on the display, the second screensaver and a representation of a current location depicted by the second screensaver overlaid on the second screensaver.

41. The electronic device of claim 24, the one or more programs further including instructions for:
while displaying a portion of the first screensaver that depicts a first location, transitioning the first screensaver from the portion of the first screensaver depicting the first location to a portion of the first screensaver depicting a second location, different than the first location; and
in response to the transitioning:
in accordance with a determination that a representation of the first location was displayed overlaid on the first screensaver when the transition occurred, updating the representation of the first location to become a representation of the second location overlaid on the first screensaver; and
in accordance with a determination that the representation of the first location was not displayed overlaid on the first screensaver when the transition occurred, displaying the portion of the first screensaver depicting the second location without displaying the representation of the second location.

42. The electronic device of claim 41, the one or more programs further including instructions for:
while displaying the portion of the first screensaver depicting the second location without displaying the representation of the second location, receiving, via the one or more input devices, an indication of a tap input detected on the touch-sensitive surface of the one or more input devices; and
in response to receiving the indication of the tap input, displaying, overlaid on the first screensaver on the display, a representation of the second location depicted by the first screensaver.

43. The electronic device of claim 41, wherein:
the representation of the first location comprises a representation of a primary location of the first location and a representation of a secondary location of the first location; and
updating the representation of the first location to become the representation of the second location comprises:
in accordance with a determination that the second location is associated with the primary location of the first location and a second secondary location of the first location, updating the secondary location to be the second secondary location while maintaining the primary location;
in accordance with a determination that the second location is associated with a second primary location and the secondary location of the first location, updating the primary location to be the second primary location while maintaining the secondary location; and
in accordance with a determination that the second location is associated with the second primary location and the second secondary location, updating the primary location to be the second primary location and updating the secondary location to be the second secondary location.

44. The electronic device of claim 24, the one or more programs further including instructions for:
in response to determining to display the representation of the music being played by the electronic device in response to the input, concurrently displaying, on the display, a representation of a current location depicted by a currently displayed screensaver and the representation of the music being played by the electronic device in response to the input, both overlaid on the currently displayed screensaver; and
in response to determining to display the representation of the current location depicted by the currently displayed screensaver, concurrently displaying, on the display, the representation of the music being played by the electronic device in response to the input and the representation of the current location depicted by the currently displayed screensaver, both overlaid on the currently displayed screensaver.

45. The electronic device of claim 24, wherein determining that the electronic device is playing music includes a determination that the electronic device is playing a song.

46. The electronic device of claim 24, wherein displaying, overlaid on the first screensaver, the representation of the music being played by the electronic device in response to the input includes maintaining display of the first screensaver on the display.

47. A non-transitory computer readable storage medium storing one or more programs, the one or more programs comprising instructions, which when executed by one or more processors of an electronic device, cause the electronic device to perform a method comprising:
displaying, on a display, a first screensaver including displaying one or more images on the display;
while displaying the first screensaver, receiving, via one or more input devices, an indication of an input detected on a touch-sensitive surface of the one or more input devices; and
in response to receiving the indication:
in accordance with a determination that the electronic device is playing music when the indication is received:
in accordance with a determination that the input is a click input detected in a first region of a plurality of regions of the touch-sensitive surface, displaying, overlaid on the first screensaver, a representation of music being played by the electronic device in response to the input, wherein the representation of the music being played by the electronic device is not displayed before the indication of the input is received; and
in accordance with a determination that the input is a click input detected in a second region of the plurality of regions of the touch-sensitive surface, different than the first region, ceasing displaying the first screensaver.

48. The non-transitory computer readable storage medium of claim 47, wherein:
in accordance with the determination that the electronic device is playing music, the touch-sensitive surface includes a plurality of regions, including the first region and the second region, each region of the plurality of regions associated with a respective function, and
in accordance with the determination that the electronic device is not playing music, the touch-sensitive surface does not include the plurality of regions.

49. The non-transitory computer readable storage medium of claim 48, wherein the method further comprises in response to receiving the indication:
in accordance with the determination that the input is a click input detected in the first region of the plurality of regions of the touch-sensitive surface, initiating playback of a next song, after a currently playing song that was playing when the input was received, in a music playback queue, wherein the representation of the music being played by the electronic device in response to the input comprises a representation of the next song; and
in accordance with a determination that the input is a click input detected in a third region, different from the first and second regions, of the plurality of regions of the touch-sensitive surface:
in accordance with a determination that a playback progress of the currently playing song is below a predetermined progress threshold, initiating playback of a previous song, before the currently playing song, in the music playback queue, wherein the representation of the music being played by the electronic device in response to the input comprises a representation of the previous song; and
in accordance with a determination that the playback progress of the currently playing song is above the predetermined progress threshold, initiating replay of the currently playing song without displaying a representation of the currently playing song overlaid on the first screensaver.

50. The non-transitory computer readable storage medium of claim 48, wherein the method further comprises:
in response to receiving the indication, in accordance with a determination that the electronic device is not playing music when the indication is received:
in accordance with a determination that the input is a click input detected on the touch-sensitive surface, ceasing displaying the first screensaver.

51. The non-transitory computer readable storage medium of claim 47, wherein the method further comprises:
in response to receiving the indication, in accordance with a determination that the input is a swipe input detected on the touch-sensitive surface:
ceasing displaying the first screensaver; and
displaying, on the display, a second screensaver, different from the first screensaver.

52. The non-transitory computer readable storage medium of claim 51, wherein:
in accordance with a determination that the swipe input is in a first direction, the second screensaver is a next screensaver after the first screensaver in a screensaver queue including the first screensaver and the second screensaver; and
in accordance with a determination that the swipe input is in a second direction, different from the first direction, the second screensaver is a previous screensaver before the first screensaver in the screensaver queue.

53. The non-transitory computer readable storage medium of claim 51, wherein the method further comprises:
while displaying the first screensaver and in response to a determination that the first screensaver has been displayed for a predetermined display threshold time:
ceasing displaying the first screensaver; and
displaying, on the display, a second screensaver, different from the first screensaver, wherein:
transitioning from the first screensaver to the second screensaver in response to the swipe input occurs in a first time period, and
transitioning from the first screensaver to the second screensaver in response to determining that the first screensaver has been displayed for the predetermined display threshold time occurs in a second time period, longer than the first time period.

54. The non-transitory computer readable storage medium of claim 51, wherein displaying the second screensaver comprises:
in accordance with a determination that a representation of a current location depicted by the first screensaver was displayed overlaid on the first screensaver when the indication is received, displaying, overlaid on the second screensaver on the display, a representation of a current location depicted by the second screensaver; and
in accordance with a determination that the representation of the current location depicted by the first screensaver was not displayed overlaid on the first screensaver when the indication is received, displaying the second screensaver without displaying the representation of the current location depicted by the second screensaver.

55. The non-transitory computer readable storage medium of claim 52, wherein a screen burn-in prevention parameter of the next screensaver is greater than a screen burn-in prevention parameter of the first screensaver.

56. The non-transitory computer readable storage medium of claim 47, wherein the method further comprises in response to receiving the indication:
in accordance with a determination that the input is a tap input detected on the touch-sensitive surface, displaying, overlaid on the first screensaver on the display, a representation of a current location depicted by the first screensaver.

57. The non-transitory computer readable storage medium of claim 56, wherein the method further comprises:
while displaying the representation of the current location and in response to a determination that the representation of the current location has been displayed for a predetermined display threshold time, ceasing displaying the representation of the current location while continuing to display the first screensaver.

58. The non-transitory computer readable storage medium of claim 56, wherein:
in accordance with a determination that the representation of the music being played by the electronic device in response to the input was displayed when the tap input was received, displaying the representation of the current location comprises concurrently displaying, overlaid on the first screensaver, the representation of the current location and the representation of the music being played by the electronic device in response to the input.

59. The non-transitory computer readable storage medium of claim 47, wherein the method further comprises:
while displaying the first screensaver and while the electronic device is playing music, receiving, via the one or more input devices, an indication of an input corresponding to a request to pause playback of a currently playing song that was playing when the input corresponding to the request to pause playback was received;

in response to receiving the input corresponding to the request to pause playback, pausing playback of the currently playing song;

while playback of the currently playing song is paused, receiving, via the one or more input devices, an indication of a click input detected on the touch-sensitive surface of the one or more input devices; and in response to receiving the click input, ceasing displaying the first screensaver.

60. The non-transitory computer readable storage medium of claim 47, wherein the method further comprises:

while displaying the first screensaver and while the electronic device is playing music, receiving, via the one or more input devices, an indication of an input corresponding to a request to pause playback of a currently playing song that was playing when the input corresponding to the request to pause playback was received;

in response to receiving the input corresponding to the request to pause playback, pausing playback of the currently playing song;

while playback of the currently playing song is paused, receiving, via the one or more input devices, an indication of an input corresponding to a request to resume playback of the song that was paused when the input corresponding to the request to resume playback was received; and in response to receiving the input corresponding to the request to resume playback:

in accordance with a determination that the song has been paused for less than a threshold time, resuming playback of the song that was paused when the input corresponding to the request to resume playback was received; and in accordance with a determination that the song has been paused for more than the threshold time, forgoing resuming playback of the song that was paused.

61. The non-transitory computer readable storage medium of claim 47, wherein the method further comprises:

prior to displaying the first screensaver and while not displaying a screensaver on the display, in response to a determination to display the first screensaver:

displaying, on the display, the first screensaver; and displaying, overlaid on the first screensaver, a representation of a current location depicted by the first screensaver; and while displaying the first screensaver and the representation of the current location depicted by the first screensaver, in response to a determination that the representation of the current location depicted by the first screensaver has been displayed for a threshold time, ceasing to display the representation of the current location while continuing to display the first screensaver.

62. The non-transitory computer readable storage medium of claim 61, wherein the method further comprises:

after ceasing display of the representation of the current location depicted by the first screensaver and while displaying the first screensaver, determining to display, on the display, a second screensaver, different than the first screensaver; and in response to determining to display the second screensaver:

in accordance with a determination that the determination to display the second screensaver was in response to user input:

ceasing displaying the first screensaver; and displaying, on the display, the second screensaver and a representation of the current location depicted by the second screensaver overlaid on the second screensaver; and in accordance with a determination that the determination to display the second screensaver was not in response to user input:

ceasing displaying the first screensaver; and displaying, on the display, the second screensaver without displaying the representation of the current location depicted by the second screensaver.

63. The non-transitory computer readable storage medium of claim 61, wherein the method further comprises:

while displaying the first screensaver and the representation of the current location depicted by the first screensaver, determining to display, on the display, a second screensaver, different from the first screensaver; and in response to determining to display the second screensaver:

ceasing displaying the first screensaver; and displaying, on the display, the second screensaver and a representation of a current location depicted by the second screensaver overlaid on the second screensaver.

64. The non-transitory computer readable storage medium of claim 47, wherein the method further comprises:

while displaying a portion of the first screensaver that depicts a first location, transitioning the first screensaver from the portion of the first screensaver depicting the first location to a portion of the first screensaver depicting a second location, different than the first location; and in response to the transitioning:

in accordance with a determination that a representation of the first location was displayed overlaid on the first screensaver when the transition occurred, updating the representation of the first location to become a representation of the second location overlaid on the first screensaver; and in accordance with a determination that the representation of the first location was not displayed overlaid on the first screensaver when the transition occurred, displaying the portion of the first screensaver depicting the second location without displaying the representation of the second location.

65. The non-transitory computer readable storage medium of claim 64, wherein the method further comprises:

while displaying the portion of the first screensaver depicting the second location without displaying the representation of the second location, receiving, via the one or more input devices, an indication of a tap input detected on the touch-sensitive surface of the one or more input devices; and in response to receiving the indication of the tap input, displaying, overlaid on the first screensaver on the display, a representation of the second location depicted by the first screensaver.

66. The non-transitory computer readable storage medium of claim 64, wherein:
- the representation of the first location comprises a representation of a primary location of the first location and a representation of a secondary location of the first location; and
- updating the representation of the first location to become the representation of the second location comprises:
  - in accordance with a determination that the second location is associated with the primary location of the first location and a second secondary location of the first location, updating the secondary location to be the second secondary location while maintaining the primary location;
  - in accordance with a determination that the second location is associated with a second primary location and the secondary location of the first location, updating the primary location to be the second primary location while maintaining the secondary location; and
  - in accordance with a determination that the second location is associated with the second primary location and the second secondary location, updating the primary location to be the second primary location and updating the secondary location to be the second secondary location.

67. The non-transitory computer readable storage medium of claim 47, wherein the method further comprises:
- in response to determining to display the representation of the music being played by the electronic device in response to the input, concurrently displaying, on the display, a representation of a current location depicted by a currently displayed screensaver and the representation of the music being played by the electronic device in response to the input, both overlaid on the currently displayed screensaver; and
- in response to determining to display the representation of the current location depicted by the currently displayed screensaver, concurrently displaying, on the display, the representation of the music being played by the electronic device in response to the input and the representation of the current location depicted by the currently displayed screensaver, both overlaid on the currently displayed screensaver.

68. The non-transitory computer readable storage medium of claim 47, wherein determining that the electronic device is playing music includes a determination that the electronic device is playing a song.

69. The non-transitory computer readable storage medium of claim 47, wherein displaying, overlaid on the first screensaver, the representation of the music being played by the electronic device in response to the input includes maintaining display of the first screensaver on the display.

* * * * *